US010838407B2

(12) United States Patent
Dey, IV et al.

(10) Patent No.: US 10,838,407 B2
(45) Date of Patent: *Nov. 17, 2020

(54) USER INTERFACE FOR TOOL CONFIGURATION AND DATA CAPTURE

(71) Applicant: Milwaukee Electric Tool Corporation, Brookfield, WI (US)

(72) Inventors: John S. Dey, IV, Milwaukee, WI (US); Alex Huber, Milwaukee, WI (US); Matthew J. Mergener, Mequon, WI (US); Burtrom L. Stampfl, Bristol, WI (US); Stephen Matson, Milwaukee, WI (US); Timothy R. Obermann, Waukesa, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/368,449

(22) Filed: Mar. 28, 2019

(65) Prior Publication Data

US 2019/0219990 A1 Jul. 18, 2019

Related U.S. Application Data

(63) Continuation of application No. 15/155,489, filed on May 16, 2016, now Pat. No. 10,295,990.

(Continued)

(51) Int. Cl.
*G06F 3/0482* (2013.01)
*G05B 19/4155* (2006.01)
(Continued)

(52) U.S. Cl.
CPC .......... *G05B 19/4155* (2013.01); *B25F 5/00* (2013.01); *G06F 3/0482* (2013.01);
(Continued)

(58) Field of Classification Search
CPC ............. G06F 3/04842; G06F 3/04847; G06F 3/0482; G06F 3/04817
See application file for complete search history.

(56) References Cited

U.S. PATENT DOCUMENTS 2,980,218 A   4/1961  Young
3,739,659 A   6/1973  Workman, Jr.
(Continued)

FOREIGN PATENT DOCUMENTS

DE       3803357       8/1989
DE       10029132      1/2002
(Continued)

OTHER PUBLICATIONS

Bosch Connected World Blog, "First European testbed for the Industrial Internet Consortium," Dec. 2, 2015.
(Continued)

*Primary Examiner* — Andrea C Leggett
(74) *Attorney, Agent, or Firm* — Michael Best & Friedrich LLP

(57) ABSTRACT

A programmable power tool and method and systems of programming a power tool using wireless communication. An external device having a processor and a transceiver establishes a communication link with the power tool. The external device receives, with the transceiver, a first mode profile stored on the power tool. The first mode profile is defined by a profile type and a first value associated with a parameter for executing the profile type. The external device displays a control screen including the profile type and the parameter at the first value, and receives a user input. The external device generates, in response to the user input, a second mode profile by modifying the parameter to be at a second value. The external device transmits, with the transceiver, the second mode profile to the power tool.

20 Claims, 28 Drawing Sheets

Related U.S. Application Data

(60) Provisional application No. 62/279,998, filed on Jan. 18, 2016, provisional application No. 62/175,963, filed on Jun. 15, 2015, provisional application No. 62/163,228, filed on May 18, 2015.

(51) Int. Cl.
*G06F 3/0484* (2013.01)
*G06F 3/0481* (2013.01)
*H04L 29/08* (2006.01)
*B25F 5/00* (2006.01)

(52) U.S. Cl.
CPC ...... *G06F 3/04817* (2013.01); *G06F 3/04842* (2013.01); *G06F 3/04847* (2013.01); *H04L 67/125* (2013.01); *B25D 2216/00* (2013.01); *B25D 2250/221* (2013.01); *G05B 2219/39438* (2013.01)

(56) References Cited

U.S. PATENT DOCUMENTS

| | | | |
|---|---|---|---|
| 3,882,305 A | 5/1975 | Johnstone |
| 3,965,778 A | 6/1976 | Aspers et al. |
| 4,545,106 A | 10/1985 | Juengel |
| 4,680,862 A | 7/1987 | Wieland et al. |
| 4,685,050 A | 8/1987 | Polzer et al. |
| 4,854,786 A | 8/1989 | Alexander et al. |
| 4,881,435 A | 11/1989 | Hansson |
| 5,154,242 A | 10/1992 | Soshin et al. |
| 5,188,188 A | 2/1993 | Mars |
| 5,203,242 A | 4/1993 | Hansson |
| 5,277,261 A | 1/1994 | Sakoh |
| 5,315,501 A | 5/1994 | Whitehouse |
| 5,526,460 A | 6/1996 | DeFrancesco et al. |
| 5,592,396 A | 1/1997 | Tambini et al. |
| 5,903,462 A | 5/1999 | Wagner et al. |
| 5,942,975 A | 8/1999 | Sørensen |
| 6,005,489 A | 12/1999 | Siegle et al. |
| 6,055,484 A | 4/2000 | Lysaght |
| 6,123,241 A | 9/2000 | Walter et al. |
| 6,157,313 A | 12/2000 | Emmermann |
| 6,161,629 A | 12/2000 | Hohmann et al. |
| 6,279,668 B1 | 8/2001 | Mercer |
| 6,349,266 B1 | 2/2002 | Lysaght et al. |
| 6,390,205 B2 | 5/2002 | Wallgren et al. |
| 6,405,598 B1 | 6/2002 | Bareggi |
| 6,424,799 B1 | 7/2002 | Gilmore |
| 6,431,425 B1 | 8/2002 | Moorman et al. |
| 6,469,615 B1 | 10/2002 | Kady et al. |
| 6,508,313 B1 | 1/2003 | Carney et al. |
| 6,520,270 B2 | 2/2003 | Wissmach et al. |
| 6,522,949 B1 | 2/2003 | Ikeda et al. |
| 6,598,684 B2 | 7/2003 | Watanabe |
| 6,668,212 B2 | 12/2003 | Colangelo, II et al. |
| 6,675,196 B1 | 1/2004 | Kronz |
| 6,768,994 B1 | 1/2004 | Howard et al. |
| 6,687,567 B2 | 2/2004 | Watanabe |
| 6,784,801 B2 | 8/2004 | Watanabe et al. |
| 6,834,730 B2 | 12/2004 | Gass et al. |
| 6,836,614 B2 | 12/2004 | Gilmore |
| 6,848,516 B2 | 2/2005 | Giardino |
| 6,872,121 B2 | 3/2005 | Wiener et al. |
| 6,913,087 B1 | 7/2005 | Brotto et al. |
| 6,923,285 B1 | 8/2005 | Rossow et al. |
| 6,938,689 B2 | 9/2005 | Farrant et al. |
| 6,945,337 B2 | 9/2005 | Kawai et al. |
| 6,954,048 B2 | 10/2005 | Cho |
| 6,968,908 B2 | 11/2005 | Tokunaga et al. |
| 6,978,846 B2 | 12/2005 | Kawai et al. |
| 6,981,311 B2 | 1/2006 | Seith et al. |
| 6,992,585 B2 | 1/2006 | Saleh et al. |
| 7,034,711 B2 | 4/2006 | Sakatani et al. |
| 7,035,710 B2 | 4/2006 | Balling |
| 7,035,898 B1 | 4/2006 | Baker |
| 7,036,605 B2 | 5/2006 | Suzuki et al. |
| 7,036,703 B2 | 5/2006 | Grazioli et al. |
| 7,062,998 B2 | 6/2006 | Hohmann et al. |
| 7,064,502 B2 | 6/2006 | Garcia et al. |
| 7,086,483 B2 | 8/2006 | Arimura et al. |
| 7,102,303 B2 | 9/2006 | Brotto et al. |
| 7,112,934 B2 | 9/2006 | Gilmore |
| 7,116,969 B2 | 10/2006 | Park |
| 7,123,149 B2 | 10/2006 | Nowak et al. |
| 7,137,541 B2 | 11/2006 | Baskar et al. |
| 7,211,972 B2 | 5/2007 | Garcia et al. |
| 7,218,227 B2 | 5/2007 | Davis et al. |
| 7,243,440 B2 | 7/2007 | DeKeyser |
| 7,298,240 B2 | 11/2007 | Lamar |
| 7,314,097 B2 | 1/2008 | Jenner et al. |
| 7,328,086 B2 | 2/2008 | Perry et al. |
| 7,328,757 B2 | 2/2008 | Davies |
| 7,330,129 B2 | 2/2008 | Crowell et al. |
| 7,343,764 B2 | 3/2008 | Solfronk |
| 7,346,406 B2 | 3/2008 | Brotto et al. |
| 7,346,422 B2 | 3/2008 | Tsuchiya et al. |
| 7,359,762 B2 | 4/2008 | Etter et al. |
| 7,383,882 B2 | 6/2008 | Lerche et al. |
| 7,419,013 B2 | 9/2008 | Sainomoto et al. |
| 7,428,934 B2 | 9/2008 | Arimura |
| 7,437,204 B2 | 10/2008 | Lev-Ami et al. |
| 7,328,752 B2 | 12/2008 | Gass et al. |
| 7,464,769 B2 | 12/2008 | Nakazawa et al. |
| 7,501,778 B2 | 3/2009 | Hashimoto et al. |
| 7,540,334 B2 | 6/2009 | Gass et al. |
| 7,613,590 B2 | 11/2009 | Brown |
| 7,646,155 B2 | 1/2010 | Woods et al. |
| RE41,160 E | 3/2010 | Gilmore et al. |
| RE41,185 E | 3/2010 | Gilmore et al. |
| 7,690,569 B2 | 4/2010 | Swanson et al. |
| 7,750,811 B2 | 7/2010 | Puzio et al. |
| 7,772,850 B2 | 8/2010 | Bertness |
| 7,784,104 B2 | 8/2010 | Innami et al. |
| 7,787,981 B2 | 8/2010 | Austin et al. |
| 7,795,829 B2 | 9/2010 | Seiler et al. |
| 7,809,495 B2 | 10/2010 | Leufen |
| 7,817,062 B1 | 10/2010 | Li et al. |
| 7,823,458 B2 | 11/2010 | Kibblewhite et al. |
| 7,834,566 B2 | 11/2010 | Woods et al. |
| 7,850,071 B2 | 12/2010 | Sakamoto et al. |
| 7,868,591 B2 | 1/2011 | Phillips et al. |
| 7,898,403 B2 | 3/2011 | Ritter et al. |
| 7,900,524 B2 | 3/2011 | Calloway et al. |
| 7,911,379 B2 | 3/2011 | Cameron |
| 7,928,673 B2 | 4/2011 | Woods et al. |
| 7,928,845 B1 | 4/2011 | LaRosa |
| 7,931,096 B2 | 4/2011 | Saha |
| 7,942,084 B2 | 5/2011 | Wilson, Jr. et al. |
| 7,942,211 B2 | 5/2011 | Scrimshaw et al. |
| 7,953,965 B2 | 5/2011 | Qin et al. |
| 7,982,624 B2 | 7/2011 | Richter et al. |
| 8,004,397 B2 | 8/2011 | Forrest et al. |
| 8,004,664 B2 | 8/2011 | Etter et al. |
| 8,005,647 B2 | 8/2011 | Armstrong et al. |
| 8,044,796 B1 | 10/2011 | Carr, Sr. |
| 8,049,636 B2 | 11/2011 | Buckingham et al. |
| 8,074,731 B2 | 12/2011 | Iwata et al. |
| 8,161,613 B2 | 4/2012 | Schuele et al. |
| 8,169,298 B2 | 5/2012 | Wiesner et al. |
| 8,171,828 B2 | 5/2012 | Duvan et al. |
| 8,179,069 B2 | 5/2012 | Matsunaga et al. |
| 8,210,275 B2 | 7/2012 | Suzuki et al. |
| 8,255,358 B2 | 8/2012 | Ballew et al. |
| 8,260,452 B2 | 9/2012 | Austin et al. |
| 8,264,374 B2 | 9/2012 | Obatake et al. |
| 8,281,871 B2 | 10/2012 | Cutler et al. |
| 8,286,723 B2 | 10/2012 | Puzio et al. |
| 8,294,424 B2 | 10/2012 | Bucur |
| 8,306,836 B2 | 11/2012 | Nichols et al. |
| 8,310,206 B2 | 11/2012 | Bucur |
| 8,316,958 B2 | 11/2012 | Schell et al. |
| 8,324,845 B2 | 12/2012 | Suzuki et al. |
| 8,330,426 B2 | 12/2012 | Suzuki et al. |
| 8,344,879 B2 | 1/2013 | Harmon et al. |

(56) References Cited

U.S. PATENT DOCUMENTS

| | | |
|---|---|---|
| 8,351,982 B2 | 1/2013 | Rofougaran |
| 8,360,166 B2 | 1/2013 | Iimura et al. |
| 8,406,697 B2 | 3/2013 | Arimura et al. |
| 8,412,179 B2 | 4/2013 | Gerold et al. |
| 8,438,955 B2 | 5/2013 | Wilson, Jr. et al. |
| 8,464,808 B2 | 6/2013 | Leü |
| 8,485,049 B2 | 7/2013 | Yokoyama et al. |
| 8,576,095 B2 | 11/2013 | Harmon et al. |
| 8,611,250 B2 | 12/2013 | Chen et al. |
| 8,627,900 B2 | 1/2014 | Oomori et al. |
| 8,645,176 B2 | 2/2014 | Walton et al. |
| 8,657,482 B2 | 2/2014 | Malackowski et al. |
| 8,666,936 B2 | 3/2014 | Wallace |
| 8,678,106 B2 | 3/2014 | Matsunaga et al. |
| 8,818,617 B2 | 8/2014 | Miller et al. |
| 8,823,322 B2 | 9/2014 | Noda et al. |
| 8,890,449 B2 | 11/2014 | Suzuki et al. |
| 8,919,456 B2 | 12/2014 | Ng et al. |
| 8,954,222 B2 | 2/2015 | Costantino |
| 8,954,227 B2 | 2/2015 | Bertosa et al. |
| 8,965,841 B2 | 2/2015 | Wallace |
| 8,981,680 B2 | 3/2015 | Suda et al. |
| 8,996,237 B2 | 3/2015 | Bertosa et al. |
| 9,002,572 B2 | 4/2015 | Lipscomb et al. |
| 9,030,145 B2 | 5/2015 | Brennenstuhl et al. |
| 9,031,585 B2 | 5/2015 | Kahle et al. |
| 9,038,743 B2 | 5/2015 | Aoki |
| 9,061,392 B2 | 6/2015 | Forgues et al. |
| 9,063,558 B2 | 6/2015 | Fukumura |
| 9,111,234 B2 | 8/2015 | Wallace et al. |
| 9,114,519 B2 | 8/2015 | Iwata et al. |
| 9,126,317 B2 | 9/2015 | Lawton et al. |
| 9,144,875 B2 | 9/2015 | Schlesak et al. |
| 9,194,917 B2 | 11/2015 | Brochhaus |
| 9,216,505 B2 | 12/2015 | Rejman et al. |
| 9,232,614 B2 | 1/2016 | Hiroi |
| 9,233,457 B2 | 1/2016 | Wanek et al. |
| 9,242,356 B2 | 1/2016 | King et al. |
| 9,256,988 B2 | 2/2016 | Wenger et al. |
| 9,257,865 B2 | 2/2016 | Huggins et al. |
| 9,281,770 B2 | 3/2016 | Wood et al. |
| 2001/0052416 A1 | 12/2001 | Wissmach et al. |
| 2002/0033267 A1 | 3/2002 | Schweizer et al. |
| 2003/0121677 A1 | 7/2003 | Watanabe et al. |
| 2004/0182587 A1 | 9/2004 | May et al. |
| 2005/0035659 A1 | 2/2005 | Hahn et al. |
| 2006/0009879 A1 | 1/2006 | Lynch et al. |
| 2006/0076385 A1 | 4/2006 | Etter et al. |
| 2007/0252675 A1 | 11/2007 | Lamar |
| 2008/0084334 A1 | 4/2008 | Ballew |
| 2008/0086320 A1 | 4/2008 | Ballew et al. |
| 2008/0086323 A1 | 4/2008 | Petrie et al. |
| 2008/0086349 A1 | 4/2008 | Petrie |
| 2008/0086427 A1 | 4/2008 | Wallace |
| 2008/0086428 A1 | 4/2008 | Wallace |
| 2008/0086685 A1 | 4/2008 | Janky et al. |
| 2008/0252446 A1 | 10/2008 | Dammertz |
| 2009/0250364 A1 | 10/2009 | Gerold et al. |
| 2009/0251330 A1 | 10/2009 | Gerold et al. |
| 2009/0273436 A1 | 11/2009 | Gluck et al. |
| 2010/0084150 A1 | 4/2010 | Suzuki et al. |
| 2010/0096151 A1 | 4/2010 | Östling |
| 2010/0116519 A1 | 5/2010 | Gareis |
| 2010/0154599 A1 | 6/2010 | Gareis |
| 2010/0176766 A1 | 7/2010 | Brandner et al. |
| 2010/0181964 A1 | 7/2010 | Huggins et al. |
| 2011/0056716 A1 | 3/2011 | Jönsson et al. |
| 2011/0067895 A1 | 3/2011 | Nobe et al. |
| 2011/0073343 A1 | 3/2011 | Sawano et al. |
| 2011/0121782 A1 | 5/2011 | Marsh et al. |
| 2011/0162858 A1 | 7/2011 | Coste |
| 2011/0309931 A1 | 12/2011 | Rose |
| 2012/0111589 A1 | 5/2012 | Schmidt et al. |
| 2012/0166847 A1 | 6/2012 | Noda et al. |
| 2012/0167721 A1 | 7/2012 | Fluhrer |
| 2012/0168189 A1 | 7/2012 | Eckert |
| 2012/0199372 A1 | 8/2012 | Nishikawa et al. |
| 2012/0267134 A1 | 10/2012 | Matthias et al. |
| 2012/0279736 A1 | 11/2012 | Tanimoto et al. |
| 2012/0292070 A1 | 11/2012 | Ito et al. |
| 2012/0312570 A1 | 12/2012 | Wanek et al. |
| 2012/0325507 A1 | 12/2012 | Fluhrer et al. |
| 2013/0024245 A1 | 1/2013 | Nichols et al. |
| 2013/0062086 A1 | 3/2013 | Ito et al. |
| 2013/0071815 A1 | 3/2013 | Hudson et al. |
| 2013/0076271 A1 | 3/2013 | Suda et al. |
| 2013/0087355 A1 | 4/2013 | Oomori et al. |
| 2013/0109375 A1* | 5/2013 | Zeiler ............... H04W 12/1206 455/426.1 |
| 2013/0118767 A1 | 5/2013 | Cannaliato et al. |
| 2013/0126202 A1 | 5/2013 | Oomori et al. |
| 2013/0133907 A1 | 5/2013 | Chen et al. |
| 2013/0133911 A1 | 5/2013 | Ishikawa et al. |
| 2013/0138465 A1 | 5/2013 | Kahle et al. |
| 2013/0138606 A1 | 5/2013 | Kahle et al. |
| 2013/0153250 A1 | 6/2013 | Eckert |
| 2013/0187587 A1 | 7/2013 | Knight et al. |
| 2013/0188058 A1 | 7/2013 | Nguyen et al. |
| 2013/0191417 A1 | 7/2013 | Petrie et al. |
| 2013/0204753 A1 | 8/2013 | Wallace |
| 2013/0255980 A1 | 10/2013 | Linehan et al. |
| 2013/0304545 A1 | 11/2013 | Ballew et al. |
| 2013/0327552 A1 | 12/2013 | Lovelass et al. |
| 2013/0333910 A1 | 12/2013 | Tanimoto et al. |
| 2014/0006295 A1 | 1/2014 | Zeiler et al. |
| 2014/0008093 A1 | 1/2014 | Patel et al. |
| 2014/0015389 A1 | 1/2014 | Vatterott et al. |
| 2014/0069672 A1 | 3/2014 | Mashiko et al. |
| 2014/0070924 A1 | 3/2014 | Wenger et al. |
| 2014/0107853 A1 | 4/2014 | Ashinghurst et al. |
| 2014/0122143 A1 | 5/2014 | Fletcher et al. |
| 2014/0151079 A1 | 6/2014 | Furui et al. |
| 2014/0158389 A1 | 6/2014 | Ito et al. |
| 2014/0159662 A1 | 6/2014 | Furui et al. |
| 2014/0159919 A1 | 6/2014 | Furui et al. |
| 2014/0159920 A1 | 6/2014 | Furui et al. |
| 2014/0166324 A1 | 6/2014 | Puzio et al. |
| 2014/0184397 A1 | 7/2014 | Volpert |
| 2014/0266024 A1 | 9/2014 | Chinnadurai et al. |
| 2014/0284070 A1 | 9/2014 | Ng et al. |
| 2014/0292245 A1 | 10/2014 | Suzuki et al. |
| 2014/0324194 A1 | 10/2014 | Larsson et al. |
| 2014/0331829 A1 | 11/2014 | King et al. |
| 2014/0331830 A1 | 11/2014 | King et al. |
| 2014/0334270 A1 | 11/2014 | Kusakawa |
| 2014/0336810 A1 | 11/2014 | Li et al. |
| 2014/0336955 A1 | 11/2014 | Li et al. |
| 2014/0350716 A1 | 11/2014 | Fly et al. |
| 2014/0365259 A1 | 12/2014 | Delplace et al. |
| 2014/0367134 A1* | 12/2014 | Phillips ............... B25B 23/147 173/176 |
| 2014/0379136 A1 | 12/2014 | Schlegel et al. |
| 2015/0000944 A1 | 1/2015 | Duesselberg et al. |
| 2015/0002089 A1 | 1/2015 | Rejman et al. |
| 2015/0042247 A1 | 2/2015 | Kusakawa |
| 2015/0122524 A1 | 5/2015 | Papp |
| 2015/0127205 A1 | 5/2015 | Brochhaus |
| 2015/0135306 A1 | 5/2015 | Winkler et al. |
| 2015/0135907 A1 | 5/2015 | Hirabayashi et al. |
| 2015/0137721 A1 | 5/2015 | Yamamoto et al. |
| 2015/0151415 A1 | 6/2015 | Saitou et al. |
| 2015/0158157 A1 | 6/2015 | Hirabayashi et al. |
| 2015/0158170 A1 | 6/2015 | Nitsche et al. |
| 2015/0162646 A1 | 6/2015 | Kawase et al. |
| 2015/0171654 A1 | 6/2015 | Horie et al. |
| 2015/0179036 A1 | 6/2015 | Heine et al. |
| 2015/0191096 A1 | 7/2015 | Becker et al. |
| 2015/0340921 A1 | 11/2015 | Suda et al. |

(56) References Cited

U.S. PATENT DOCUMENTS

2016/0311094 A1    10/2016   Mergener et al.
2017/0008159 A1     1/2017   Boeck et al.

FOREIGN PATENT DOCUMENTS

| DE | 10029138 | 1/2002 |
|---|---|---|
| DE | 10309703 | 9/2004 |
| DE | 202006014606 | 1/2007 |
| EP | 2147750 | 1/2010 |
| JP | H10151578 | 6/1998 |
| JP | 2000176850 | 6/2000 |
| JP | 2001260042 | 9/2001 |
| JP | 2004072563 | 3/2004 |
| JP | 2004322262 | 11/2004 |
| JP | 3670189 | 7/2005 |
| JP | 2006123080 | 5/2006 |
| JP | 4359018 | 11/2009 |
| WO | WO1997023986 | 7/1997 |
| WO | WO2002030624 | 4/2002 |
| WO | WO2007090258 | 8/2007 |
| WO | WO2013116303 | 8/2013 |

OTHER PUBLICATIONS

Bosch Press Release <http://www.bosch-presse.de/presseforum/details.htm?bdID=7083&locale> Feb. 12, 2015.
Mannarino, Dewalt Tool Connect, available as early as May 27, 2015.
Track and Trace Testbed <http://www.iiconsortiurn.org/track-and-trace.htm> May 25, 2015.

\* cited by examiner

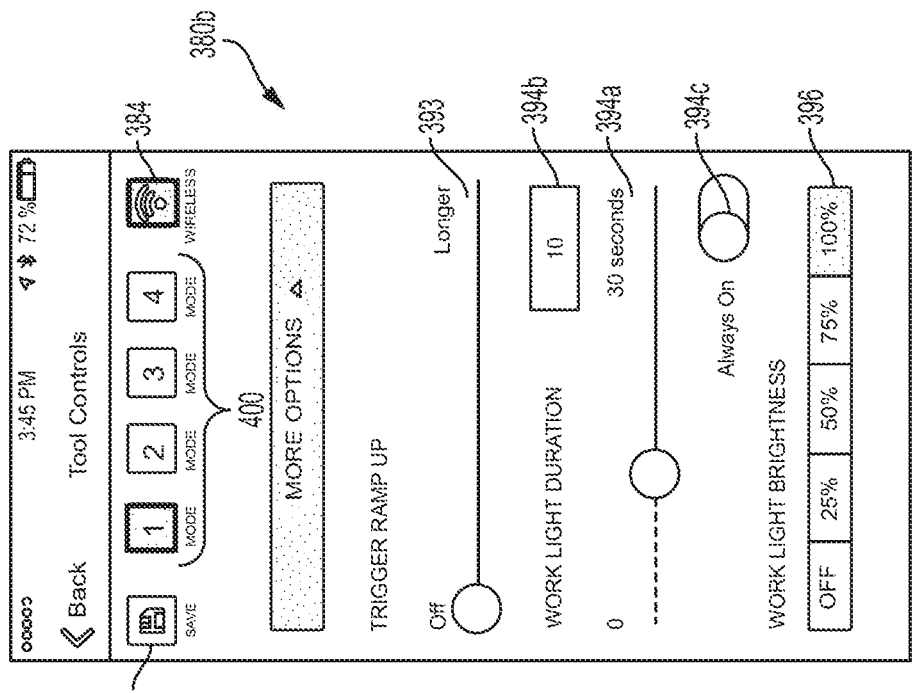
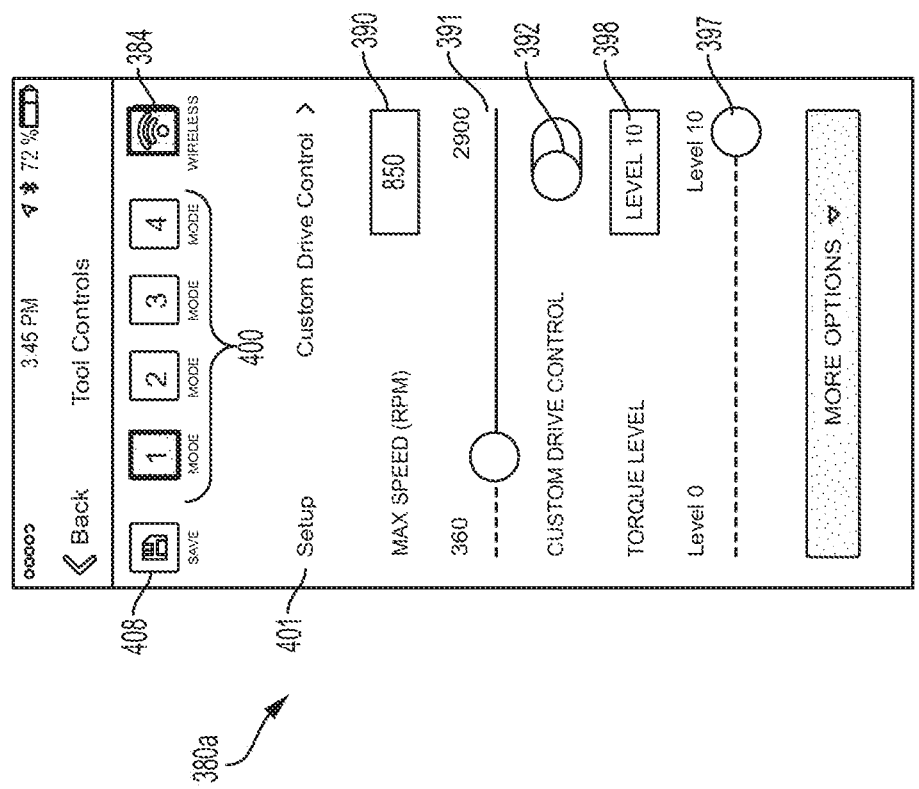
FIG. 8B
FIG. 8A

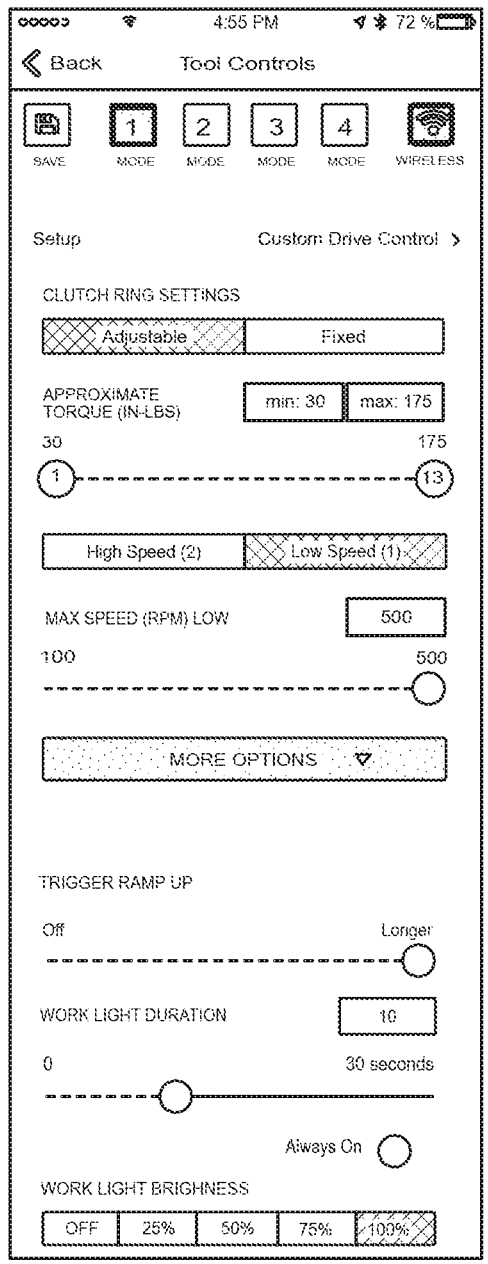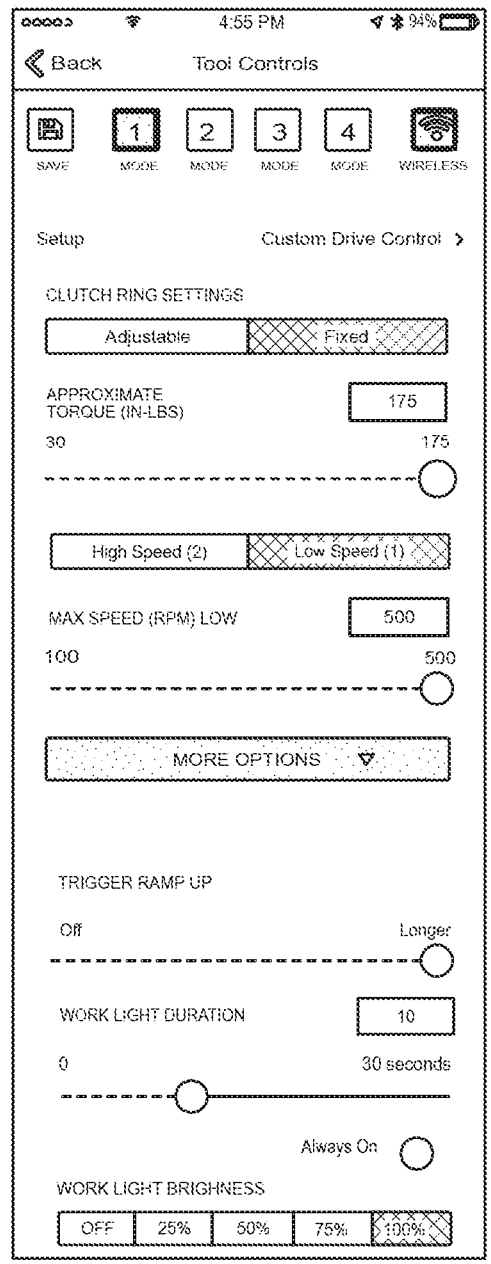
FIG. 17A
FIG. 17B

USER INTERFACE FOR TOOL CONFIGURATION AND DATA CAPTURE

RELATED APPLICATIONS

This application is a continuation of U.S. application Ser. No. 15/155,489, filed on May 16, 2016, now U.S. Pat. No. 10,295,990, which claims priority to U.S. Provisional Patent Application No. 62/279,998, filed on Jan. 18, 2016; U.S. Provisional Patent Application No. 62/175,963, filed on Jun. 15, 2015; and U.S. Provisional Patent Application No. 62/163,228, filed on May 18, 2015, the entire contents of which are hereby incorporated by reference.

FIELD OF THE INVENTION

The present invention relates to power tools that communicate with an external device.

SUMMARY

In one embodiment, a method of programming a power tool is provided. The method includes establishing, with a transceiver, a communication link between a power tool and an external device, the external device having the transceiver and an electronic processor. The transceiver receives a first mode profile stored on the power tool, the first mode profile being defined by a profile type and a first value associated with a parameter for executing the profile type. A control screen is displayed at the external device, the control screen including the profile type and the parameter at the first value. The method further includes receiving a user input at the external device and generating, in response to the user input, a second mode profile by modifying the parameter to be at a second value. The method also includes transmitting, with the transceiver, the second mode profile to the power tool.

In another embodiment, another method of programming a power tool is provided. The method includes establishing, with a transceiver, a communication link between a power tool and an external device, the power tool including the transceiver, a memory, and an electronic processor. The transceiver transmits a first mode profile stored on the memory, the first mode profile being defined by a first profile type and a first value associated with a parameter for executing the first profile type. The transceiver further receives a second mode profile from the external device, the second mode profile being defined by the first profile type and a second value associated with the parameter for executing the first profile type. The method further includes overwriting in the memory, with the electronic processor, the first mode profile with the second mode profile. The method also includes operating, with the electronic processor, the power tool according to the second mode profile.

In another embodiment, a power tool is provided. The power tool includes a motor; a wireless communication controller, a memory, and an electronic processor coupled to the motor, the memory, and the wireless communication controller. The wireless communication controller includes a transceiver and is configured to establish a communication link between the power tool and an external device. The memory is configured to store a mode profile for operating the motor. The electronic processor is configured to transmit, with the transceiver, a first mode profile stored on the memory, and to receive, with the transceiver, a second mode profile from the external device. The first mode profile is defined by a first profile type and a first value associated with a parameter for executing the first profile type. The second mode profile is defined by the first profile type and a second value associated with the parameter for executing the first profile type. The electronic processor is further configured to overwrite, on the memory, the first mode profile with the second mode profile, and to control the motor to operate according to the second mode profile

BRIEF DESCRIPTION OF THE DRAWINGS

FIGS. 6-11 illustrate exemplary screenshots of a user interface of an external device of the communication system.

FIGS. 17A-B illustrate further exemplary screenshots of the user interface of the external device of the communication system.

DETAILED DESCRIPTION

Figure 1:
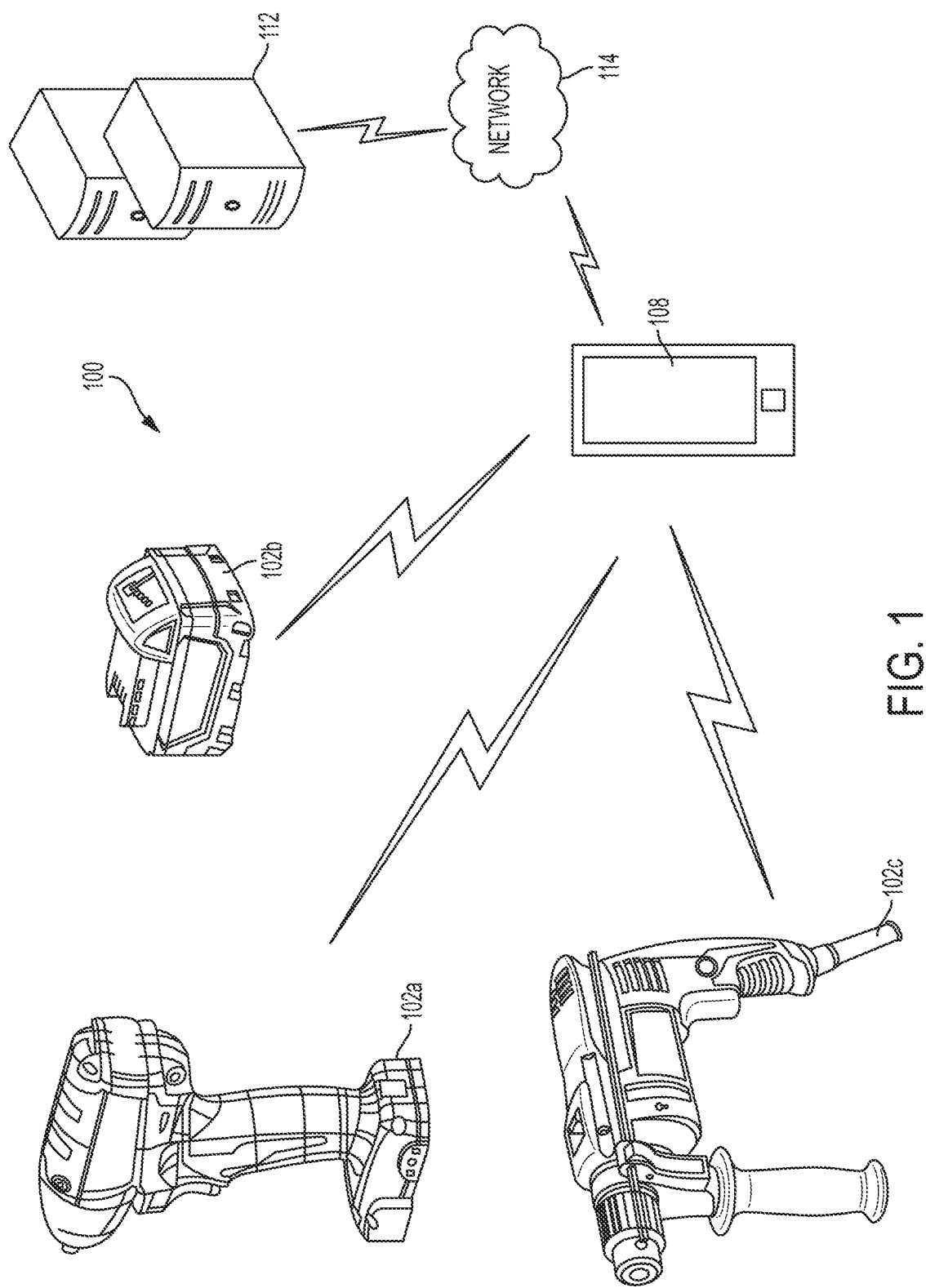
FIG. 1 illustrates a communication system according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

FIG. 1 illustrates a communication system 100. The communication system 100 includes power tool devices 102 and an external device 108. Each power tool device 102 (e.g., battery powered impact driver 102a, power tool battery pack 102b, and mains-powered hammer drill 102c) and the external device 108 can communicate wirelessly while they are within a communication range of each other. Each power tool device 102 may communicate power tool status, power tool operation statistics, power tool identification, stored power tool usage information, power tool maintenance data, and the like. Therefore, using the external device 108, a user can access stored power tool usage or power tool maintenance data. With this tool data, a user can determine how the power tool device 102 has been used, whether maintenance is recommended or has been performed in the past, and identify malfunctioning components or other reasons for certain performance issues. The external device 108 can also transmit data to the power tool device 102 for power tool configuration, firmware updates, or to send commands (e.g., turn on a work light). The external device 108 also allows a user to set operational parameters, safety parameters, select tool modes, and the like for the power tool 102.

The external device 108 may be, for example, a smart phone (as illustrated), a laptop computer, a tablet computer, a personal digital assistant (PDA), or another electronic device capable of communicating wirelessly with the power tool device 102 and providing a user interface. The external device 108 generates the user interface and allows a user to access and interact with tool information. The external device 108 can receive user inputs to determine operational parameters, enable or disable features, and the like. The user interface of the external device 108 provides an easy-to-use interface for the user to control and customize operation of the power tool.

The external device 108 includes a communication interface that is compatible with a wireless communication interface or module of the power tool device 102. The communication interface of the external device 108 may include a wireless communication controller (e.g., a Bluetooth® module), or a similar component. The external device 108, therefore, grants the user access to data related to the power tool device 102, and provides a user interface such that the user can interact with the a processor of the power tool device 102.

In addition, as shown in FIG. 1, the external device 108 can also share the information obtained from the power tool device 102 with a remote server 112 connected by a network 114. The remote server 112 may be used to store the data obtained from the external device 108, provide additional functionality and services to the user, or a combination thereof. In one embodiment, storing the information on the remote server 112 allows a user to access the information from a plurality of different locations. In another embodiment, the remote server 112 may collect information from various users regarding their power tool devices and provide statistics or statistical measures to the user based on information obtained from the different power tools. For example, the remote server 112 may provide statistics regarding the experienced efficiency of the power tool device 102, typical usage of the power tool device 102, and other relevant characteristics and/or measures of the power tool device 102. The network 114 may include various networking elements (routers, hubs, switches, cellular towers, wired connections, wireless connections, etc.) for connecting to, for example, the Internet, a cellular data network, a local network, or a combination thereof. In some embodiments, the power tool device 102 may be configured to communicate directly with the server 112 through an additional wireless communication interface or with the same wireless communication interface that the power tool device 102 uses to communicate with the external device 108.

The power tool device 102 is configured to perform one or more specific tasks (e.g., drilling, cutting, fastening, pressing, lubricant application, sanding, heating, grinding, bending, forming, impacting, polishing, lighting, etc.). For example, an impact wrench is associated with the task of generating a rotational output (e.g., to drive a bit), while a reciprocating saw is associated with the task of generating a reciprocating output motion (e.g., for pushing and pulling a saw blade). The task(s) associated with a particular tool may also be referred to as the primary function(s) of the tool.

Figure 2:
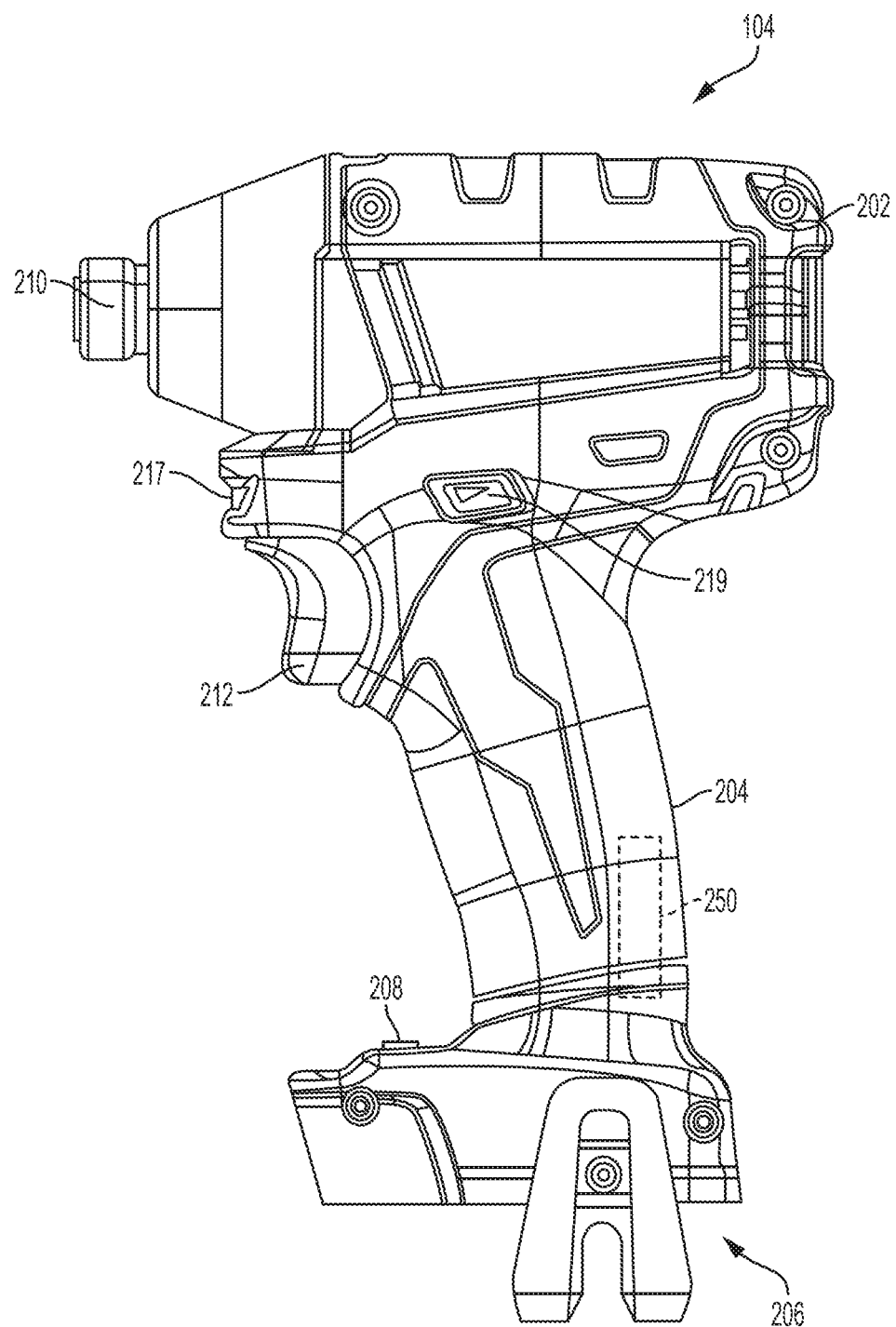
FIG. 2 illustrates a power tool of the communication system.

The particular power tool devices 102 illustrated and described herein (e.g., an impact driver) are merely representative. Other embodiments of the communication system 100 include a variety of types of power tools 102 (e.g., a power drill, a hammer drill, a pipe cutter, a sander, a nailer, a grease gun, etc.). FIG. 2 illustrates an example of the power tool devices 102, an impact driver 104 (herein power tool 104). The power tool 104 is representative of various types of power tools that operate within system 100. Accordingly, the description with respect to the power tool 104 in the system 100 is similarly applicable to other types of power tools. As shown in FIG. 2, the power tool 104 includes an upper main body 202, a handle 204, a battery pack receiving portion 206, mode pad 208, an output drive device or mechanism 210, a trigger 212, a work light 217, and forward/reverse selector 219. The housing of the power tool 104 (e.g., the main body 202 and the handle 204) are composed of a durable and light-weight plastic material. The drive device 210 is composed of a metal (e.g., steel). The drive device 210 on the power tool 104 is a socket. However, each power tool 104 may have a different drive device 210 specifically designed for the task (or primary function) associated with the power tool 104. For example, the drive device for a power drill may include a bit driver, while the drive device for a pipe cutter may include a blade. The battery pack receiving portion 206 is configured to receive and couple to the battery pack (e.g., 102*b* of FIG. 1) that provides power to the power tool 104. The battery pack receiving portion 206 includes a connecting structure to engage a mechanism that secures the battery pack and a terminal block to electrically connect the battery pack to the power tool 104. The mode pad 208 allows a user to select a mode of the power tool 104 and indicates to the user the currently selected mode of the power tool 104, which are described in greater detail below.

Figure 3A:
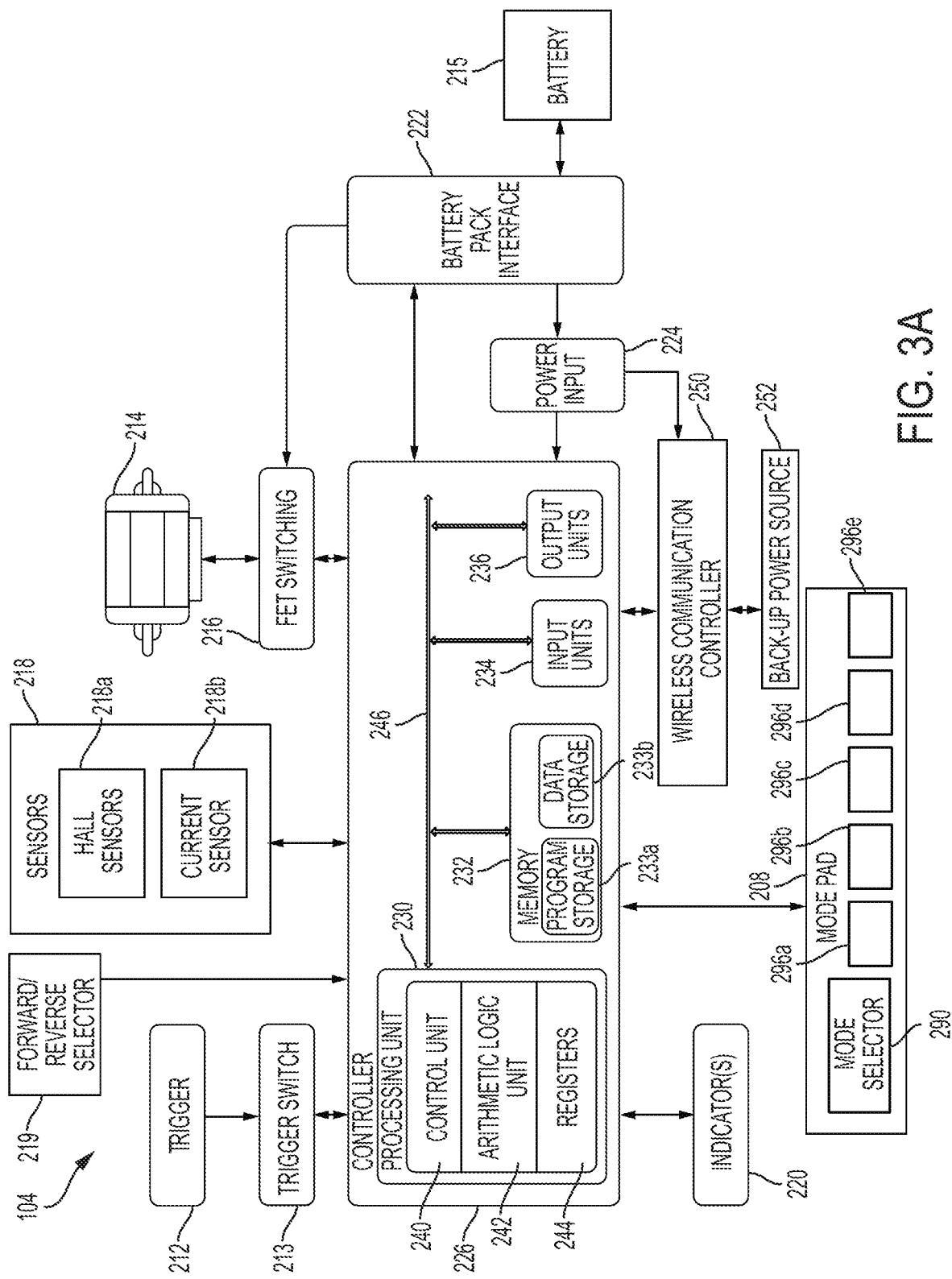
FIGS. 3A-B illustrate a schematic diagram of the power tool.

As shown in FIG. 3A, the power tool 104 also includes a motor 214. The motor 214 actuates the drive device 210 and allows the drive device 210 to perform the particular task. A primary power source (e.g., a battery pack) 215 couples to the power tool 104 and provides electrical power to energize the motor 214. The motor 214 is energized based on the position of the trigger 212. When the trigger 212 is depressed the motor 214 is energized, and when the trigger 212 is released, the motor 214 is de-energized. In the illustrated embodiment, the trigger 212 extends partially down a length of the handle 204; however, in other embodiments the trigger 212 extends down the entire length of the handle 204 or may be positioned elsewhere on the power tool 104. The trigger 212 is moveably coupled to the handle 204 such that the trigger 212 moves with respect to the tool housing. The trigger 212 is coupled to a push rod, which is engageable with a trigger switch 213 (see FIG. 3A). The trigger 212 moves in a first direction towards the handle 204 when the trigger 212 is depressed by the user. The trigger 212 is biased (e.g., with a spring) such that it moves in a second direction away from the handle 204, when the trigger 212 is released by the user. When the trigger 212 is depressed by the user, the push rod activates the trigger switch 213, and when the trigger 212 is released by the user, the trigger switch 213 is deactivated. In other embodiments, the trigger 212 is coupled to an electrical trigger switch 213. In such embodiments, the trigger switch 213 may include, for example, a transistor. Additionally, for such electronic embodiments, the trigger 212 may not include a push rod to activate the mechanical switch. Rather, the electrical trigger switch 213 may be activated by, for example, a position sensor (e.g., a Hall-Effect sensor) that relays information about the relative position of the trigger 212 to the tool housing or electrical trigger switch 213. The trigger switch 213 outputs a signal indicative of the position of the trigger 212. In some instances, the signal is binary and indicates either that the trigger 212 is depressed or released. In other instances, the signal indicates the position of the trigger 212 with more precision. For example, the trigger switch 213 may output an analog signal that various from 0 to 5 volts depending on the extent that the trigger 212 is depressed. For example, 0 V output indicates that the trigger 212 is released, 1 V output indicates that the trigger 212 is 20% depressed, 2 V output indicates that the trigger 212 is 40% depressed, 3 V output indicates that the trigger 212 is 60% depressed 4 V output indicates that the trigger 212 is 80% depressed, and 5 V indicates that the trigger 212 is 100% depressed. The signal output by the trigger switch 213 may be analog or digital.

As also shown in FIG. 3A, the power tool 104 also includes a switching network 216, sensors 218, indicators 220, the battery pack interface 222, a power input unit 224, a controller 226, a wireless communication controller 250, and a back-up power source 252. The back-up power source 252 includes, in some embodiments, a coin cell battery (FIG. 4) or another similar small replaceable power source. The battery pack interface 222 is coupled to the controller 226 and couples to the battery pack 215. The battery pack interface 222 includes a combination of mechanical (e.g., the battery pack receiving portion 206) and electrical components configured to and operable for interfacing (e.g., mechanically, electrically, and communicatively connecting) the power tool 104 with a battery pack 215. The battery pack interface 222 is coupled to the power input unit 224. The battery pack interface 222 transmits the power received from the battery pack 215 to the power input unit 224. The power input unit 224 includes active and/or passive components (e.g., voltage step-down controllers, voltage converters, rectifiers, filters, etc.) to regulate or control the power received through the battery pack interface 222 and to the wireless communication controller 250 and controller 226.

The switching network 216 enables the controller 226 to control the operation of the motor 214. Generally, when the trigger 212 is depressed as indicated by an output of the trigger switch 213, electrical current is supplied from the battery pack interface 222 to the motor 214, via the switching network 216. When the trigger 212 is not depressed, electrical current is not supplied from the battery pack interface 222 to the motor 214. In some embodiments, the amount of trigger pull detected by the trigger switch 213 is related to or corresponds to a desired speed of rotation of the motor 214. In other embodiments, the amount of trigger pull detected by the trigger switch 213 is related to or corresponds to a desired torque.

In response to the controller 226 receiving the activation signal from the trigger switch 213, the controller 226 activates the switching network 216 to provide power to the motor 214. The switching network 216 controls the amount of current available to the motor 214 and thereby controls the speed and torque output of the motor 214. The switching network 216 may include numerous FETs, bipolar transistors, or other types of electrical switches. For instance, the switching network 216 may include a six-FET bridge that receives pulse-width modulated (PWM) signals from the controller 226 to drive the motor 214.

The sensors 218 are coupled to the controller 226 and communicate to the controller 226 various signals indicative of different parameters of the power tool 104 or the motor 214. The sensors 218 include Hall sensors 218*a*, current sensors 218*b*, among other sensors, such as, for example, one or more voltage sensors, one or more temperature sensors, and one or more torque sensors. Each Hall sensor 218*a* outputs motor feedback information to the controller 226, such as an indication (e.g., a pulse) when a magnet of the motor's rotor rotates across the face of that Hall sensor. Based on the motor feedback information from the Hall sensors 218*a*, the controller 226 can determine the position, velocity, and acceleration of the rotor. In response to the motor feedback information and the signals from the trigger switch 213, the controller 226 transmits control signals to control the switching network 216 to drive the motor 126. For instance, by selectively enabling and disabling the FETs of the switching network 216, power received via the battery pack interface 222 is selectively applied to stator coils of the motor 214 to cause rotation of its rotor. The motor feedback information is used by the controller 226 to ensure proper timing of control signals to the switching network 216 and, in some instances, to provide closed-loop feedback to control the speed of the motor 214 to be at a desired level.

The indicators 220 are also coupled to the controller 226 and receive control signals from the controller 226 to turn on and off or otherwise convey information based on different states of the power tool 104. The indicators 220 include, for example, one or more light-emitting diodes ("LED"), or a display screen. The indicators 220 can be configured to display conditions of, or information associated with, the power tool 104. For example, the indicators 220 are configured to indicate measured electrical characteristics of the power tool 104, the status of the power tool 104, the mode of the power tool (discussed below), etc. The indicators 220 may also include elements to convey information to a user through audible or tactile outputs.

As described above, the controller 226 is electrically and/or communicatively connected to a variety of modules or components of the power tool 104. In some embodiments, the controller 226 includes a plurality of electrical and electronic components that provide power, operational control, and protection to the components and modules within the controller 226 and/or power tool 104. For example, the controller 226 includes, among other things, a processing unit 230 (e.g., a microprocessor, a microcontroller, or another suitable programmable device), a memory 232, input units 234, and output units 236. The processing unit 230 (herein, electronic processor 230) includes, among other things, a control unit 240, an arithmetic logic unit ("ALU") 242, and a plurality of registers 244 (shown as a group of registers in FIG. 3A). In some embodiments, the controller 226 is implemented partially or entirely on a semiconductor (e.g., a field-programmable gate array ["FPGA"] semiconductor) chip, such as a chip developed through a register transfer level ("RTL") design process.

The memory 232 includes, for example, a program storage area 233a and a data storage area 233b. The program storage area 233a and the data storage area 233b can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The electronic processor 230 is connected to the memory 232 and executes software instructions that are capable of being stored in a RAM of the memory 232 (e.g., during execution), a ROM of the memory 232 (e.g., on a generally permanent basis), or another non-transitory computer readable medium such as another memory or a disc. Software included in the implementation of the power tool 104 can be stored in the memory 232 of the controller 226. The software includes, for example, firmware, one or more applications, program data, filters, rules, one or more program modules, and other executable instructions. The controller 226 is configured to retrieve from memory 232 and execute, among other things, instructions related to the control processes and methods described herein. The controller 226 is also configured to store power tool information on the memory 232 including operational data, information identifying the type of tool, a unique identifier for the particular tool, and other information relevant to operating or maintaining the power tool 104. The tool usage information, such as current levels, motor speed, motor acceleration, motor direction, number of impacts, may be captured or inferred from data output by the sensors 218. Such power tool information may then be accessed by a user with the external device 108. In other constructions, the controller 226 includes additional, fewer, or different components.

The wireless communication controller 250 is coupled to the controller 226. In the illustrated embodiment, the wireless communication controller 250 is located near the foot of the power tool 104 (see FIG. 2) to save space and ensure that the magnetic activity of the motor 214 does not affect the wireless communication between the power tool 104 and the external device 108. As a particular example, in some embodiments, the wireless communication controller 250 is positioned under the mode pad 208.

Figure 3B:
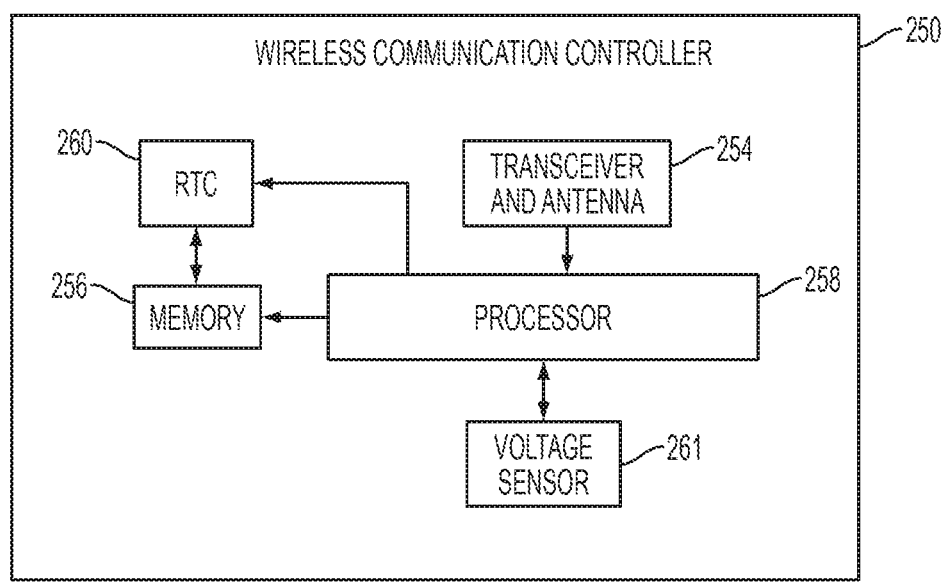

As shown in FIG. 3B, the wireless communication controller 250 includes a radio transceiver and antenna 254, a memory 256, a processor 258, and a real-time clock 260. The radio transceiver and antenna 254 operate together to send and receive wireless messages to and from the external device 108 and the processor 258. The memory 256 can store instructions to be implemented by the processor 258 and/or may store data related to communications between the power tool 104 and the external device 108 or the like. The processor 258 for the wireless communication controller 250 controls wireless communications between the power tool 104 and the external device 108. For example, the processor 258 associated with the wireless communication controller 250 buffers incoming and/or outgoing data, communicates with the controller 226, and determines the communication protocol and/or settings to use in wireless communications.

In the illustrated embodiment, the wireless communication controller 250 is a Bluetooth® controller. The Bluetooth® controller communicates with the external device 108 employing the Bluetooth® protocol. Therefore, in the illustrated embodiment, the external device 108 and the power tool 104 are within a communication range (i.e., in proximity) of each other while they exchange data. In other embodiments, the wireless communication controller 250 communicates using other protocols (e.g., Wi-Fi, cellular protocols, a proprietary protocol, etc.) over a different type of wireless network. For example, the wireless communication controller 250 may be configured to communicate via Wi-Fi through a wide area network such as the Internet or a local area network, or to communicate through a piconet (e.g., using infrared or NFC communications). The communication via the wireless communication controller 250 may be encrypted to protect the data exchanged between the power tool 104 and the external device/network 108 from third parties.

The wireless communication controller 250 is configured to receive data from the power tool controller 226 and relay the information to the external device 108 via the transceiver and antenna 254. In a similar manner, the wireless communication controller 250 is configured to receive information (e.g., configuration and programming information) from the external device 108 via the transceiver and antenna 254 and relay the information to the power tool controller 226.

The RTC 260 increments and keeps time independently of the other power tool components. The RTC 260 receives power from the battery pack 215 when the battery pack 215 is connected to the power tool 104 and receives power from the back-up power source 252 when the battery pack 215 is not connected to the power tool 104. Having the RTC 260 as an independently powered clock enables time stamping of operational data (stored in memory 232 for later export) and a security feature whereby a lockout time is set by a user and the tool is locked-out when the time of the RTC 260 exceeds the set lockout time.

The processor 258 for the wireless communication controller 250 switches between operating in a connectable (e.g., full power) state and operating in an advertisement state. In the illustrated embodiment, the wireless communication controller 250 switches between operating in the connectable state and the advertisement state based on whether the battery pack 215 is connected to the power tool 104 and whether the battery pack 215 holds sufficient power to operate the wireless communication controller 250 in the connectable state. When the battery pack 215 is connected to the power tool 104 and holds sufficient charge (i.e., the voltage of the battery pack 215 is above a threshold), the wireless communication controller 250 is powered by the battery pack 215 and operates in the connectable state. When the battery pack 215 is not connected to the power tool 104, the wireless communication controller 250 receives power from the back-up power source 252 and the power tool 104 operates in the advertisement state.

When the wireless communication controller 250 operates in the advertisement state, the power tool 104 identifies itself to the external device 108, but data exchange between the power tool 104 and the external device 108 is limited to select information. In other words, in the advertisement state, the wireless communication controller 250 outputs an advertisement message to the external device 108. The advertisement message includes identification information regarding the tool identity, remaining capacity of the back-up power source 252 (determined, for example, with voltage sensor 261), and other limited amount of power tool information. The advertisement message also identifies the product as being from a particular manufacturer or brand via a unique binary identification UBID. The unique binary identification UBID identifies the type of power tool and also provides a unique identifier for the particular power tool (e.g., a serial number), as discussed in more detail below. Therefore, even when operating in the advertisement state, the external device 108 can identify the power tool 104 and determine that the power tool 104 is within a communication range of the external device 108 (e.g., locate the power tool), but further data between the external device 108 and the power tool 104 is not exchanged.

When the wireless communication controller 250 operates in the connectable state, full wireless communication between the power tool 104 and the external device 108 is enabled. From the connectable state, the wireless communication controller 250 can establish a communication link (e.g., pair) with the external device 108 to obtain and export tool usage data, maintenance data, mode information, drive device information, and the like from the power tool 104 (e.g., the power tool controller 226). The exported information can be used by tool users or owners to log data related to a particular power tool 104 or to specific job activities. The exported and logged data can indicate when work was accomplished and that work was accomplished to specification. The logged data can also provide a chronological record of work that was performed, track duration of tool usage, and the like. While paired with the external device 108, the wireless communication controller 250 also imports (i.e., receives) information from the external device 108 into the power tool 104 such as, for example, configuration data, operation thresholds, maintenance thresholds, mode configurations, programming for the power tool 104, and the like.

In both the advertisement mode and the connectable mode, the power tool periodically broadcasts an identification signal. The identification signal includes the unique binary identifier (UBID) for the power tool 104, allowing the external device 108 to identify the type of tool and the particular instance of that tool. As is discussed below, because of the efficient and reduced size of the UBID code, these periodic broadcasts of the identification signal consume only a small amount of power thereby extending the life of the back-up power source 252 (e.g., when the power tool 104 is in the advertisement state) and of the battery pack 215 (e.g., when the power tool 104 is in the connectable state). In some embodiments, the identification signal may also include an indication of whether the power tool 104 is in the advertisement state or in the connectable state, as well as other properties and/or conditions of the power tool 104. In some embodiments, the identification signal may be significantly more reduced in size (e.g., by including less information) when the power tool 104 is in the advertisement state than when the power tool 104 is in the connectable state. Additionally or alternatively, the wireless communication controller 250, instead of periodically broadcasting the identification signal, may be configured to respond to a ping signal from the external device 108.

The memory 232 stores various identifying information of the power tool 104 including the unique binary identifier (UBID), an ASCII serial number, an ASCII nickname, and a decimal catalog number. The UBID both uniquely identifies the type of tool and provides a unique serial number for each power tool 104. The UBID is five bytes total, with two bytes dedicated to the type of tool and three bytes dedicated to the serial number of the tool. For instance, the first two bytes may identify the type of tool as hammer drill model number 1234, impact driver model number 2345, or circular saw model number 3456. The next three bytes store the unique serial number for each specific tool. The ASCII serial number is a thirteen ASCII character code that uniquely identifies the tool 104. In some embodiments, the ASCII serial number is both stored in the memory 232 and written (e.g. physically etched or printed) on a nameplate located on the power tool 104. The catalog number is a decimal code with, for example, six digits. The ASCII nickname may be limited to a certain number of characters, such as twenty ASCII characters. The UBID, serial number, and catalog number are set and stored in the memory 232 at the manufacturer and are intended to be permanent. At the time of manufacture, a default nickname may also be provided to each power tool 104 (e.g., "impact driver"). However, the ASCII nickname may be over-written by a user via the external device 108. TABLE I lists a few types of identifiers with examples. Each of these identifiers is also stored on the server 112 and associated with one another. For instance, the UBID may serve as an index to a database that includes (and associates the UBID with) the other three identifiers.

TABLE I

| Identifier | Data Type | Example |
| --- | --- | --- |
| UBID | Binary (example expressed in hexadecimal) | 0x02, 05, A5, F2, 01 |
| ASCII Serial Number | ASCII | 229B401331590 |
| Catalog Number | Decimal | 9070-20 |
| ASCII Nickname | ASCII | Joe's 3rd Drill |

The five-byte UBID is significantly smaller than the thirteen-byte ASCII serial number, but both uniquely identifies the type of tool and each particular tool. The power tool 104 generally uses the UBID to identify itself to the external device 108 via the wireless communication controller 250. Since the UBID has fewer bytes, the amount of data needed to be transmitted for each broadcast of the identifier is reduced relative to transmitting the longer ASCII serial number. With less data being transmitted, the wireless communication controller 250 uses less power.

Additional or alternative techniques for uniquely identifying the power tool 104 are used in some embodiments. For instance, in addition to or instead of the above-noted identifiers, the memory 232 stores an Internet Protocol (IP) address, a media access control (MAC) address, and/or subscriber identity module (SIM) address to uniquely identify the power tool 104. Each of these identifiers (including those from TABLE I) may be stored on both the power tool 104 and the server 112 and are associated with one another. Thus, the power tool 104 can be named and identified in multiple ways that are globally unique, and cross referenced with other identifiers that are personally unique or meaningful for users. In some embodiments, a radio frequency identification (RFID) tag is incorporated in or on the power tool 104 in addition to the wireless communication controller 250. The RFID tag includes one or more of the noted identifiers of the power tool 104, and the external device 108 is operable to scan and read the identifier(s) from a memory of the RFID tag to identify the associated power tool 104.

Figure 4:
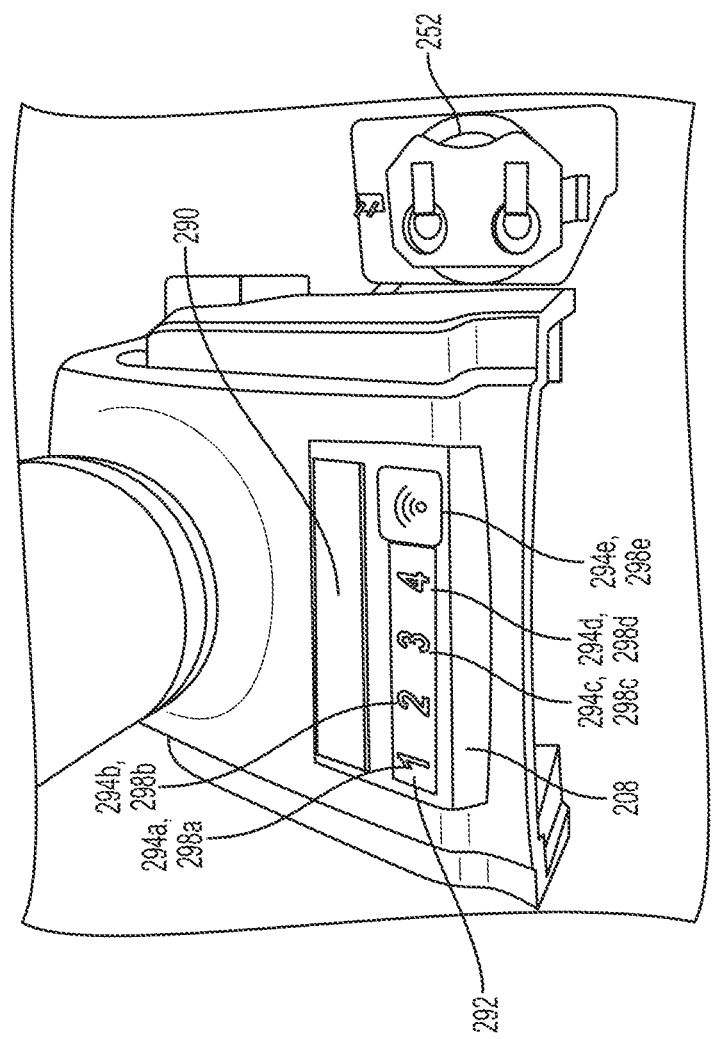
FIG. 4 illustrates a mode pad of the power tool.

FIG. 4 illustrates a more detailed view of the mode pad 208. The mode pad 208 is a user interface on the foot of the tool 104 that allows the power tool 104 to switch between different operating modes. The mode pad 208 includes the mode selection switch 290 and mode indicator LEDs block 292 having mode indicators 294a-e, each mode indicator 294a-e including one of LEDs 296a-e (see FIG. 3A) and an associated one of indicating symbols 298a-e (e.g., "1", "2", "3", "4", and a radio wave symbol). When an LED 296 is enabled, the associated indicating symbol 298 is illuminated. For instance, when LED 296a is enabled, the "1" (indicating symbol 298a) is illuminated.

The power tool 104 has five selectable modes (one, two, three, four, and adaptive), each associated with a different one of the mode indicators 294a-e. The mode selection switch 290 is a pushbutton that cycles through the five selectable modes upon each press (e.g., mode 1, 2, 3, 4, adaptive, 1, 2, and so on). The adaptive mode is represented by the indicating symbol 298e (the radio wave symbol). In the adaptive mode, the user is able to configure the power tool 104 via the external device 108, as is described in further detail below. In other embodiments, the power tool 104 has more or fewer modes, and the mode selection switch 290 may be a different type of switch such as, for example, a slide switch, a rotary switch, or the like.

Figure 5:
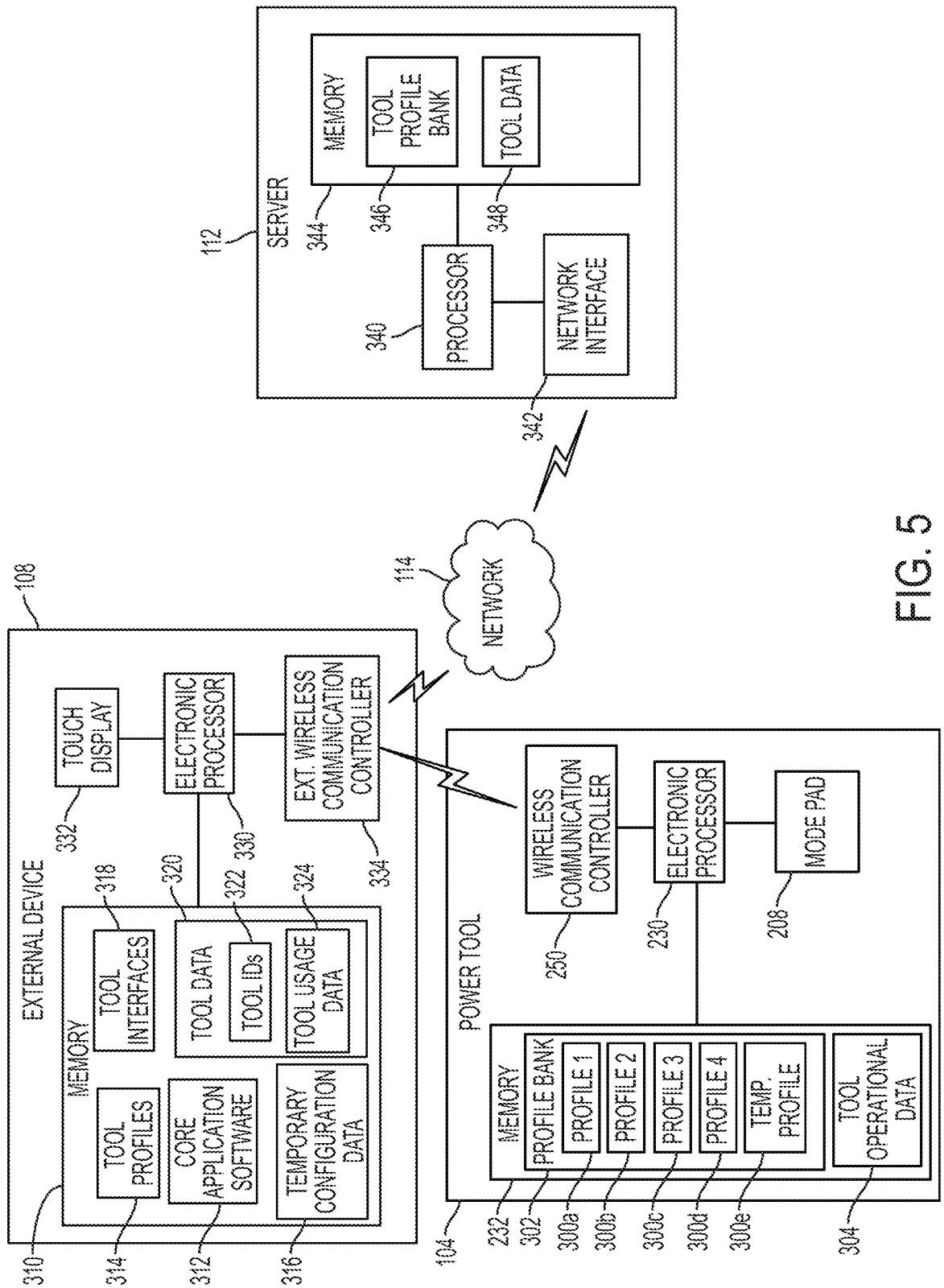
FIG. 5 illustrates a schematic diagram of the communication system including the power tool.

With reference to FIG. 5, modes one, two, three, and four are each associated with a mode profile configuration data block (a "mode profile") 300a-d, respectively, saved in the memory 232 in a (mode) profile bank 302. Each mode profile 300 includes configuration data that defines the operation of the tool 104 when activated by the user (e.g., upon depressing the trigger 212). For instance, a particular mode profile 300 may specify the motor speed, when to stop the motor, the duration and intensity of the work light 217, among other operational characteristics. The adaptive mode is associated with a temporary mode profile 300e saved in the memory 232. Also stored in the memory 232 is tool operational data 304, which includes, for example, information regarding the usage of the power tool 104 (e.g., obtained via the sensors 218), information regarding the maintenance of the power tool 104, power tool trigger event information (e.g., whether and when the trigger is depressed and the amount of depression).

The external device 108 includes a memory 310 storing core application software 312, tool mode profiles 314, temporary configuration data 316, tool interfaces 318, tool data 320 including received tool identifiers 322 and received tool usage data 324 (e.g., tool operational data). The external device 108 further includes an electronic processor 330, a touch screen display 332, and an external wireless communication controller 334. The electronic processor 330 and memory 310 may be part of a controller having similar components as the power tool controller 226. The touch screen display 332 allows the external device 108 to output visual data to a user and receive user inputs. Although not illustrated, the external device 108 may include further user input devices (e.g., buttons, dials, toggle switches, and a microphone for voice control) and further user outputs (e.g., speakers and tactile feedback elements). Additionally, in some instances, the external device 108 has a display without touch screen input capability and receives user input via other input devices, such as buttons, dials, and toggle switches. The external device 108 communicates wirelessly with the wireless communication controller 250 via the external wireless communication controller 334, e.g., using a Bluetooth® or Wi-Fi® protocol. The external wireless communication controller 334 further communicates with the server 112 over the network 114. The external wireless communication controller 334 includes at least one transceiver to enable wireless communications between the external device 108 and the wireless communication controller 250 of the power tool 104 or the server 112 through the network 114. In some instances, the external wireless communication controller 334 includes two separate wireless communication controllers, one for communicating with the wireless communication controller 250 (e.g., using Bluetooth® or Wi-Fi® communications) and one for communicating through the network 114 (e.g., using Wi-Fi or cellular communications).

The server 112 includes a processor 340 that communicates with the external device 108 over the network 114 using a network interface 342. The communication link between the network interface 342, the network 114, and the external wireless communication controller 334 may include various wired and wireless communication pathways, various network components, and various communication protocols. The server 112 further includes a memory 344 including a tool profile bank 346 and tool data 348.

Returning to the external device 108, the core application software 312 is executed by the electronic processor 330 to generate a graphical user interface (GUI) on the touch screen display 332 enabling the user to interact with the power tool 104 and server 112. In some embodiments, a user may access a repository of software applications (e.g., an "app store" or "app marketplace") using the external device 108 to locate and download the core application software 312, which may be referred to as an "app." In some embodiments, the tool mode profiles 314, tool interfaces 318, or both may be bundled with the core application software 312 such that, for instance, downloading the "app" includes downloading the core application software 312, tool mode profiles 314, and tool interfaces 318. In some embodiments, the app is obtained using other techniques, such as downloading from a website using a web browser on the external device 108. As will become apparent from the description below, at least in some embodiments, the app on the external device 108 provides a user with a single entry point for controlling, accessing, and/or interacting with a multitude of different types of tools. This approach contrasts with, for instance, having a unique app for each type of tool or for small groupings of related types of tools.

Figure 6:
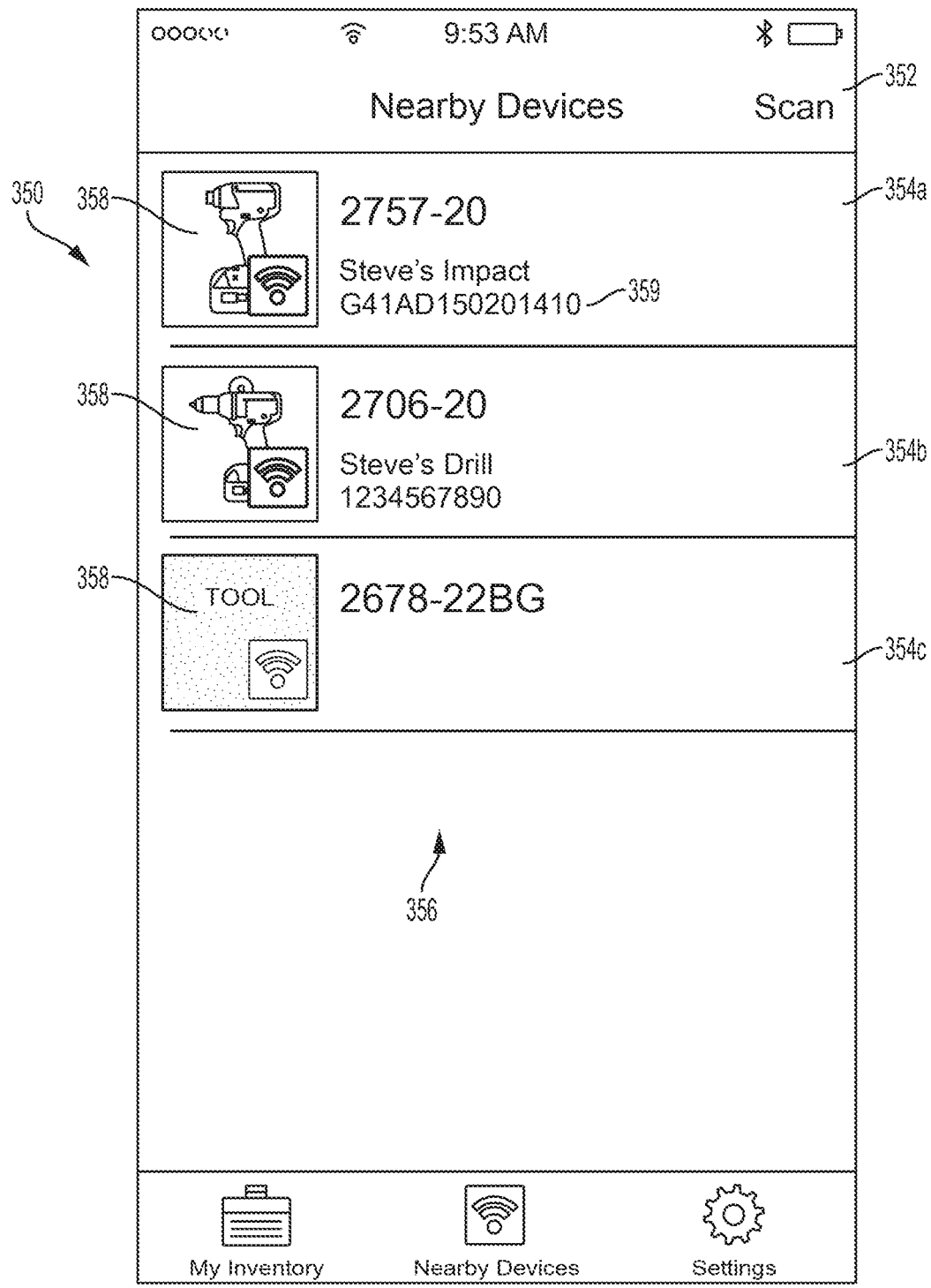

FIG. 6 illustrates a nearby devices screen 350 of the GUI on the touch screen display 332. The nearby devices screen 350 is used to identify and communicatively pair with power tools 104 within wireless communication range of the external device 108 (e.g., local power tools). For instance, in response to a user selecting the "scan" input 352, the external wireless communication controller 334 scans a radio wave communication spectrum used by the power tools 104 and identifies any power tools 104 within range that are advertising (e.g., broadcasting their UBID and other limited information). The identified power tools 104 that are advertising are then listed on the nearby devices screen 350. As shown in FIG. 6, in response to a scan, three power tools 104 that are advertising (advertising tools 354a-c) are listed in the identified tool list 356. In some embodiments, if a power tool 104 is already communicatively paired with a different external device, the power tool 104 is not advertising and, as such, is not listed in the identified tool list 356 even though the power tool 104 may be nearby (within wireless communication range of) the external device 108.

The advertising tools 354 may be in either an advertising state or a connectable state, depending on whether a charged power tool battery pack 215 is coupled to the respective tool. More particularly, when a charged power tool battery pack 215 is coupled to a power tool 104, the power tool 104 is in the connectable state and has essentially full communication capabilities. In contrast, when no battery pack or a discharged battery pack 215 is coupled to the power tool 104, the power tool 104 is in the advertising state and is generally limited to broadcasting an advertisement message that includes its UBID, an indication that a charged power tool battery pack 215 is not present, and the state of charge of the back-up power source 252. In some embodiments, further information is provided by the power tool 104 to the external device 108 in the advertising state, although this additional data transmission may increase power usage and reduce the life of the back-up power source 252.

The external device 108 provides a visual state indication 358 in the identified tool list 356 of whether an advertising tool 354 is in the connectable state or the advertising state. For instance, the advertising tool 354a and 354b are in the connectable state, while the advertising tool 354c is in the advertising state. The external device 108 is operable to pair with advertising tools 354 that are in the connectable state, but not those advertising tools 354 that are in the advertising state. When one of the advertising tools 354 in the connectable state is paired with the external device 108, the tool is in the connected state.

The UBID received from the advertising tools 354 is used by the external device 108 to identify the tool type of each advertising tool 354. The external device 108 converts the first two bytes of the UBID to decimal and displays on the identified tool list 356 the tool type by listing the catalog number (e.g., "2757-20" and "7206-20"). In some instances, a table of tool types is included in the external device 108 indexable by the UBID (e.g., the first two bytes), allowing the external device 108 to display the tool type in another form or language (e.g., "impact driver" or "circular saw").

Additionally, UBIDs received from advertising tools 354 in response to a scan are used to obtain further information about the tool, if available. For instance, the UBID is sent to the server 112 and used as an index or search term for a database of tool information that is part of the tool data 348. For instance, the database may store and respond to the external device 108 with the ASCII nickname, other tool identifiers of Table I, and an icon. The external device 108, in turn, displays the ASCII nickname, ASCII serial number, and icon. As shown in the nearby devices screen 350, the advertising tool 354a and 354b include the ASCII nickname, serial number 359, and icon. In some instances, the advertising tools 354 provide the further tool identifiers listed in Table I to the external device 108, rather than the external device 108 obtaining the information from the server 112. In some instances, the external device 108 includes a cache of tool information stored in tool data 320 for power tools 104 previously paired with by the external device, and which is indexable by the UBID. The cached tool information may include the icon and other identifiers listed in Table I. In some instances, the advertising tool 354c does not include an ASCII nickname and serial number in the identified tool list 356 because the advertising tool 354c is in an advertising state and (a) the additional identifiers are not transmitted to the external device 108 while in the advertising state and (b) the external device 108 has not yet obtained the additional identifiers from the server 112 or the additional identifiers are not available on the server 112.

From the nearby devices screen 350, a user can select one of the advertising tools 354 from the identified tool list 356 to communicatively pair with the selected advertising tool 354. Each type of power tool 104 with which the external device 108 can communicate includes an associated tool graphical user interface (tool interface) stored in the tool interfaces 318. Once a communicative pairing occurs, the core application software 312 accesses the tool interfaces 318 (e.g., using the UBID) to obtain the applicable tool interface for the type of tool that is paired. The touch screen 332 then shows the applicable tool interface. A tool interface includes a series of screens enabling a user to obtain tool operational data, configure the tool, or both. While some screens and options of a tool interface are common to multiple tool interfaces of different tool types, generally, each tool interface includes screens and options particular to the associated type of tool. The power tool 104 has limited space for user input buttons, triggers, switches, and dials. However, the external device 108 and touch screen 332 provide a user the ability to map additional functionality and configurations to the power tool 104 to change the operation of the tool 104. Thus, in effect, the external device 108 provides an extended user interface for the power tool 104, providing further customization and configuration of the power tool 104 than otherwise possible or desirable through physical user interface components on the tool. Examples further explaining aspects and benefits of the extended user interface are found below.

Figure 7:
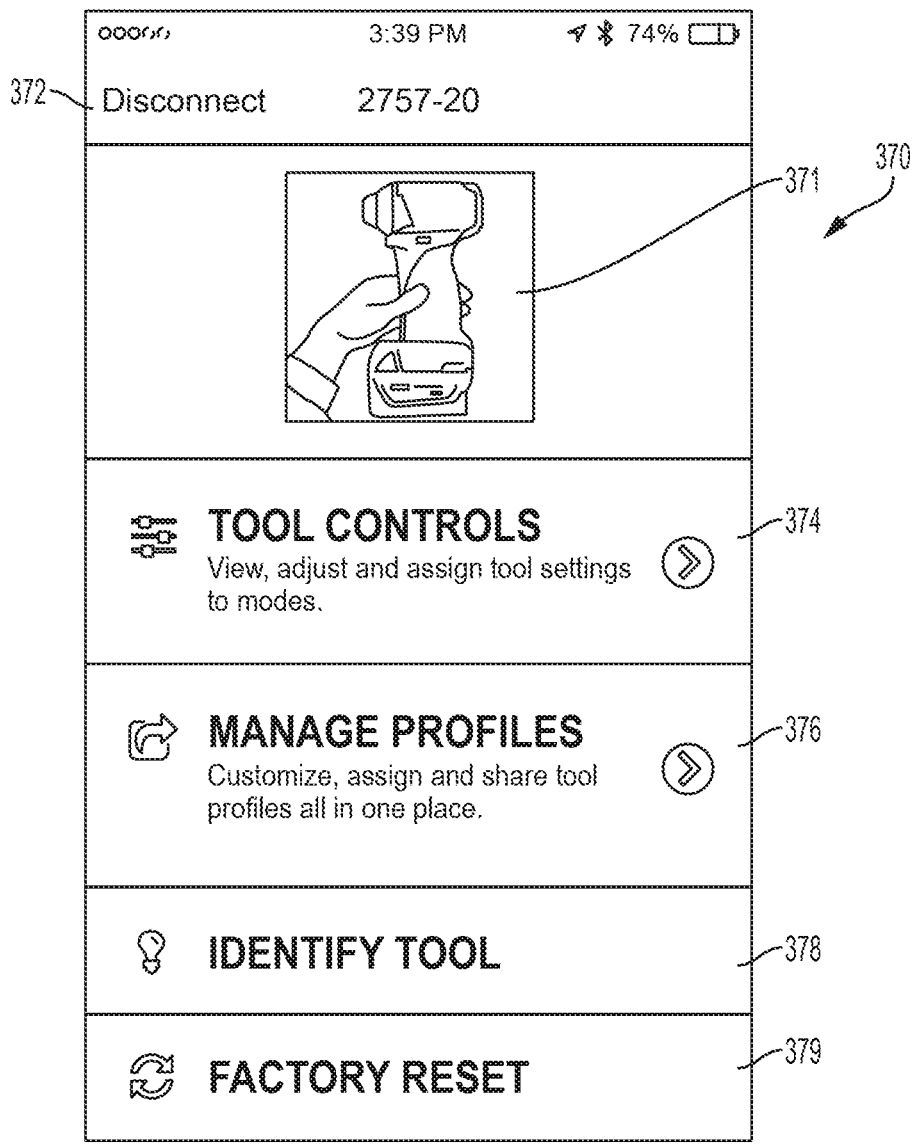

FIG. 7 illustrates a home screen 370 of the tool interface when the power tool 104 is an impact driver. The home screen 370 includes an icon 371 for the particular paired powered tool 104, which may be the same as the icon shown in the list 356. The home screen 370 also includes a disconnect input 372 enabling the user to break the communicative pairing between the external device 108 and the paired power tool 104. The home screen 370 further includes four selectable options: tool controls 374, manage profiles 376, identify tool 378, and factory reset 379. Selecting identify tool 378 sends a command to the paired power tool 104 requesting that the paired power tool 104 provide a user-perceptible indication, such as flashing a work light 217, a light of the indicator 220, flashing LEDs 296, making an audible beep using a speaker of the indicators 220, and/or using the motor 214 to vibrate the tool. The user can then identify the particular tool communicating with the external device 108.

Selecting tool controls 374 causes a control screen of the tool interface to be shown, such as the control screen 380 of FIGS. 8A-B, which includes a top portion 380a and a bottom portion 380b. Generally, the control screen shown depends on the particular type of mode profile. In other words, generally, each type of mode profile has a specific control screen. Each control screen has certain customizable parameters that, taken together, form a mode profile. The particular control screen shown on the external device 108 upon selecting the tool controls 374 is the currently selected profile of the power tool 104 (e.g., one of the mode profiles 300a-e). To this end, upon selection of the tool controls 374, the external device 108 requests and receives the currently selected one of the mode profiles 300a-e from the power tool 104. The external device 108 recognizes the mode profile type of the selected one of the mode profiles 300a-e, generates the appropriate control screen for the mode profile type, and populates the various parameter settings according to settings from the received mode profile 300.

When in the adaptive mode, the currently selected profile that is shown on the control screen is the temporary mode profile 300e. Additionally, when the power tool 104 is in the adaptive mode, the power tool 104 is operated according to the temporary mode profile 300e. The source of profile data in the temporarily mode profile 300e (and what is being displayed on the control screen 380) varies. Initially, upon entering the adaptive mode via the (pushbutton) mode selection switch 290, the mode profile 300a (associated with mode 1) is copied into the temporary mode profile 300e of the power tool 104. Thus, after a user causes the power tool 104 to enter the adaptive mode using the pushbutton 290, the power tool 104 initially operates upon a trigger pull as if mode 1 (mode profile 300a) was currently selected. Additionally, as the control screen displays the mode profile saved as the temporarily mode profile 300e, the mode profile 300a that was just copied to the temporary mode profile 300e is shown on the control screen.

In some embodiments, another mode profile 300 (e.g., 300b-d) is copied into the temporary mode profile 300e upon first entering the adaptive mode and is provided (as the temporary mode profile 300e) to the external device 108 for populating the control screen 380. In still other embodiments, the control screen 380 shown upon selecting the tool controls 374 is a default control screen with default profile data for the particular type of tool, and the external device 108 does not first obtain profile data from the power tool 104. In these instances, the default mode profile is sent to the power tool 104 and saved as the temporary mode profile 300e.

Figure 9:
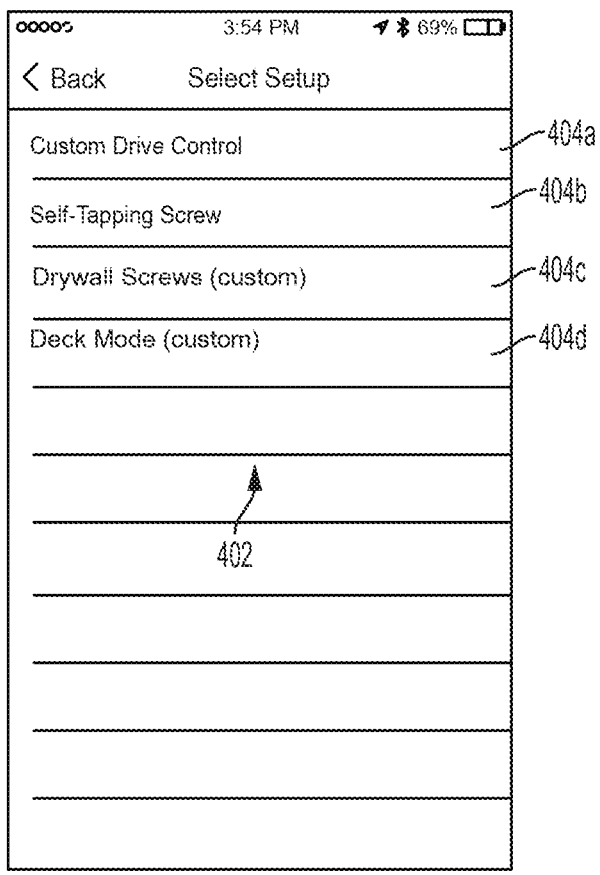

Further, assuming that the power tool 104 is in the adaptive mode, after the external device 108 initially loads the control screen (e.g., control screen 380) upon selecting the tool controls 374, the user may select a new source of profile data for the temporary file. For instance, upon selecting one of the mode profile buttons 400 (e.g., mode 1, mode 2, mode 3, or mode 4) the associated mode profile 300a-d is saved as the temporary mode profile 300e and sent to the external device 108 and populates the control screen (according to the mode profile type and mode profile parameters). Additionally, assuming the power tool 104 is in the adaptive mode, a user may select a mode profile type using the setup selector 401. Upon selecting the setup selector 401, a list of available profiles (profile list) 402 for the particular type of paired power tool 104 is shown (see, e.g., FIG. 9). The profile list 402 includes profiles 404 obtained from tool profiles 314 and/or from the tool profile bank 346 over the network 114. These listed profiles 404 include default profiles (custom drive control profile 404a and self-tapping screw profile 404b) and custom profiles previously generated and saved by a user (e.g., drywall screws profile 404c and deck mode 404d), as is described in more detail below. Upon selecting one of the tool profiles 404, the selected profile 404 and its default parameters are illustrated on the control screen 380 of the external device 108 and the profile 404 as currently configured is sent to the power tool 104 and saved as the temporary mode profile 300e. Accordingly, upon a further trigger pull, the power tool 104 will operate according to the selected one of the tool profiles 404.

When the adaptive mode is currently selected on the power tool 104, as indicated by the indicating symbol 298e (FIG. 4), the user is able to configure (e.g., change some of the parameters of the temporary mode profile 300e) the power tool 104 using the control screen 380. When the power tool 104 is in one of the other four tool modes, as indicated by one of the indicating symbols 298a-d, the power tool 104 is not currently configurable via the control screen 380. For instance, in FIG. 10, a control screen 381 is illustrated when the power tool is not currently in the adaptive mode. Here, the control screen 381 is similar to the control screen 380, but includes a message 382 indicating that the tool is not in the adaptive mode and a wireless symbol 384 is shown greyed-out as a further indication that the power tool is not in the adaptive mode. Accordingly, when the power tool 104 is not in the adaptive mode and a user selects one of the mode profile buttons 400, the power tool 104 provides the mode profile 300 of the associated mode selected by the user, but does not overwrite the temporary mode profile 300e with the mode profile. Thus, the mode profiles 300 of the power tool 104 are not updated when the power tool 104 is not in the adaptive mode.

Referring back to FIGS. 8A-B, when the power tool 104 is in the adaptive mode and the user selects the tool controls 374 on the home screen, the user is able to configure profile data of the power tool 104 using a control screen of the tool interface. For instance, via the control screen 380, the user is able to configure the current profile data of the temporary mode profile 300e of the power tool 104. As illustrated, the user is able to adjust the maximum speed via the speed text box 390 or the speed slider 391; enable/disable the custom drive control using the toggle 392; alter the trigger ramp up parameter via slider 393; adjust the work light duration with slider 394a, work light text box 394b, and "always on" toggle 394c; and adjust the work light intensity via the work light brightness options 396. Upon enabling the toggle 392, the torque level control elements become active and are no longer greyed-out, such that a user can adjust the torque level using the slider 397 or torque text box 398.

In some embodiments, the external device 108 and power tool 104 enable live updating of the temporary mode profile 300e. When live updating, the temporary mode profile 300e of the power tool 104 is updated as changes to the parameters are made on the control screen 380 without requiring a subsequent saving step or actuation being taken by the user on the GUI of the external device 108 or on the power tool. In other words, when live updating, the external device 108 updates the temporary mode profile 300e on the power tool 104 in response to receiving a user input changing one of the parameters, rather than in response to a user input saving the temporary mode profile 300e. For instance, with respect to FIG. 8A, the speed of the power tool 104 is set to 850 revolutions per minute (RPM). When live updating, if a user slides the speed slider 391 to the right by dragging his/her finger across the speed slider 391 and then removing his/her finger from the touch screen 332 of the external device 108 upon reaching a maximum speed of 1500 RPM, the external device 108 will send the newly selected maximum speed (1500 RPM) to the power tool 104 to update the temporary mode profile 300e when the user's finger is removed from the screen, without requiring a further depression of a button or other actuation by the user. Live updating is applicable to the other parameters on the control screen 380 as well, such as the custom drive control toggle, the torque level, trigger ramp, and work light parameters. Live updating enables rapid customization of the power tool 104 so that a user may test and adjust various profile parameters quickly with fewer key presses. In contrast to live updating, in some embodiments, after sliding the speed slider 391 to 1500 RPM, the user must press a save button (e.g., save button 408) to effect the update of the maximum speed parameter on the temporary mode profile 300e.

Figure 11:
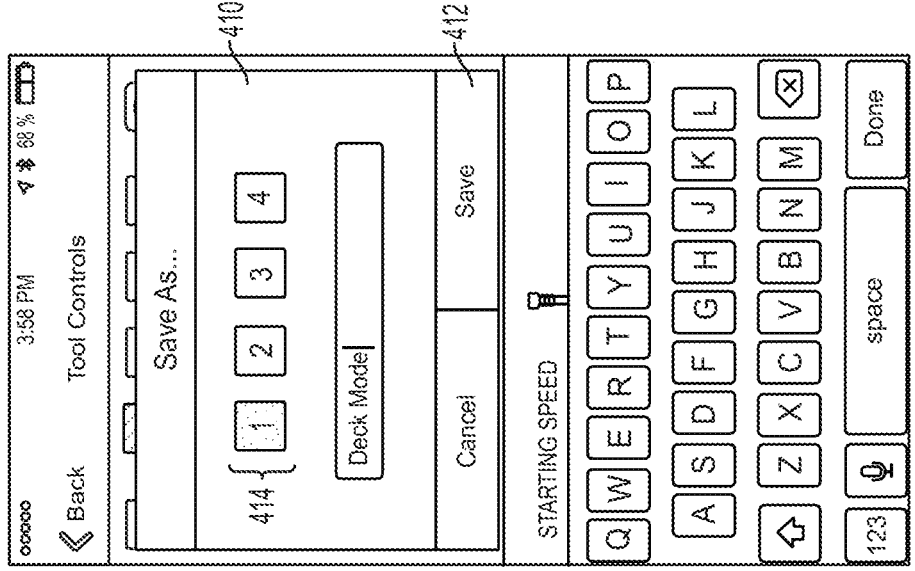
Figure 10:
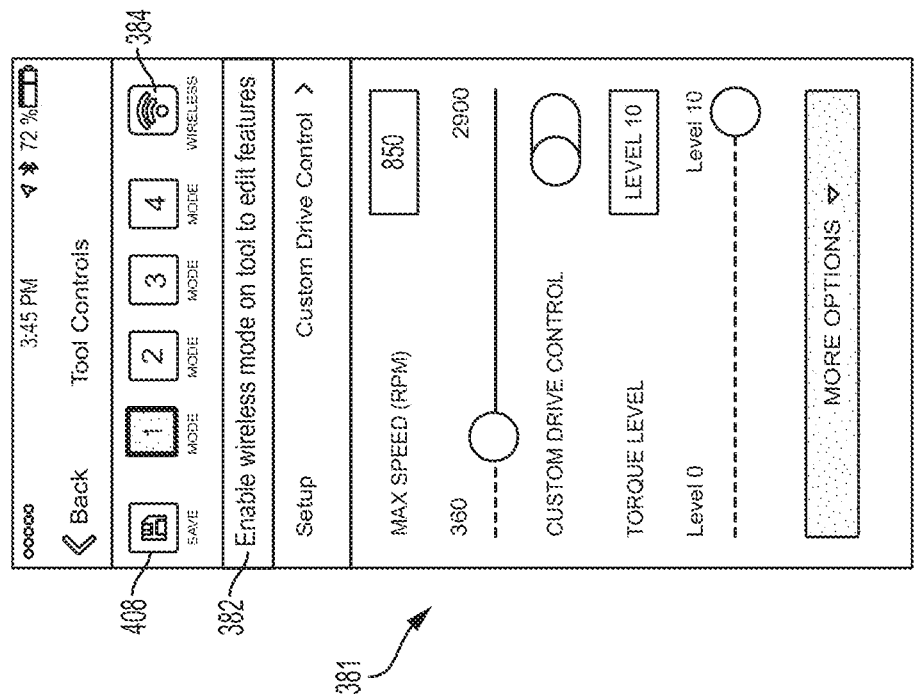

A user is also able to save a mode profile set via a control screen (e.g., the control screen 380) to the power tool 104. More particularly, the user is able to overwrite one of the mode profiles 300a-d in the profile bank 302 with the mode profile as specified on a control screen. To save the mode profile generated by the user via the control screen 308, the user selects the save button 408 (FIG. 10). As shown in FIG. 11, pressing the save button 408 causes the core application software 312 to generate a save prompt 410 requesting the user to name the created mode profile and specify which of the mode profiles 300a-d to overwrite with the created mode profile. In response to the user input, the external device 108 sends the generated mode profile to the power tool 104. The electronic processor 230 of the power tool 104 receives the generated mode profile and overwrites the mode profiles 300 in the profile bank 302 specified for overwriting by the user with the generated mode profile. For example, in FIG. 11, the user has named the generated mode profile "Deck Mode" and specified that the electronic processor 230 overwrite mode profile 300a (associated with mode "1") with the generated "Deck Mode" mode profile. In some embodiments, the user can elect to overwrite more than one mode profile 300a-e with the generated mode profile by selecting multiple of the mode labels 414 before selecting the save button 412. In some embodiments, the user can elect to not overwrite any of the mode profiles 300a-e with the generated mode profile by not selecting any of the mode labels 414 before selecting the save button 412. In such embodiments, the generated mode profile is saved in the tool profile bank 346 on the server 112, but not on the power tool 104. Overwriting a profile (old profile) with another profile (new profile) may include, for example, storing the new profile at the location in memory that was storing the old profile, thereby erasing the old profile and replacing it in memory with the new profile, or may include storing the new profile at another location in memory and updating a profile pointer to point to the address in memory having the new profile instead of the address in memory having the old profile.

In some embodiments, if a user exits the adaptive mode of the power tool 104 or selects a different mode profile button 400 without first saving the generated mode profile to the power tool 104, the mode profile showing on the control screen 380 is lost. In other words, upon selecting one of the mode profile buttons 400 (e.g., mode 1, mode 2, mode 3, or mode 4) the associated mode profile 300a-d is saved to the temporary mode profile 300e, overwriting the unsaved mode profile generated by the user via the control screen. In addition to saving the associated mode profile 300a-d to the temporary mode profile 300e, as noted above, the associated mode profile 300a-d is provided to the external device 108 and populates the control screen (according to the mode profile type and mode profile parameters).

In some embodiments, if the user attempts to exit the adaptive mode of the power tool 104 or selects a different mode profile button 400 without first saving the generated mode profile to the power tool 104, the core application software 312 automatically generates the save prompt 410, which requests that the user save the created mode profile or confirm that the user wishes to discard the changes to the created mode profile. In such embodiments, a user can confirm that no saving of the created mode profile is desired by pressing the cancel button or by pressing a separate button (not shown) that specifies, for example, "Continue without saving." By automatically generating the save prompt 410 upon detection that the user wishes to exit the adaptive mode, the core application software 312 prevents the user from accidentally exiting the adaptive mode without saving the created mode profile.

In addition to sending the generated mode profile to the power tool 104 in response to saving the generated mode profile via save button 412, the external device 108 sends the generated mode profile to the server 112 via the network 114 for saving in the tool profile bank 346. In some instances, the generated mode profile is also stored locally on the external device 108 within the tool profiles 314 upon selecting the save button 412. In the power tool 104, server 112, and external device 108, the profile name entered by the user on save prompt 410 is saved with the generated mode profile. In some embodiments, rather than the actual profile name, a unique hash of the profile name is saved with the generated mode profile.

The profiles in the tool profile bank 346 of the server 112 may be saved according to a user identifier. For instance, a user may enter a user identifier (bob_smith) and password via the touch screen 332 when initially accessing the GUI of the core application software 312. The external device 108 may provide the user identifier to the server 112 along with sending the generated mode profile for saving in the tool profile bank 346. Accordingly, the mode profiles generated and saved by a user are associated with the user in the tool profile bank 346. For instance, each saved mode profile may have data including a name (e.g., "Deck Mode"), a mode profile type (e.g., custom drive control—impact or self-tapping screw), a list of tools to which the mode profile applies (e.g., impact driver and impact wrench), a creation date (e.g., Apr. 11, 2015), a revision date (e.g., May 11, 2015), and an associated user (e.g., bob_smith). Thus, when a user selects the setup selector 401 (FIG. 8A), the external device 108 provides the user name (e.g., bob_smith) and the tool type (e.g., impact driver) to the server 112, which obtains the mode profiles in the tool profile bank 346 associated with the provided user name and tool type, and provides these mode profiles back to the external device 108 for display on the mode profile list 402. Accordingly, only those mode profiles that are compatible with a particular paired power tool 104 are shown on the mode profile list 402.

Referring back to FIG. 9, the drywall screws (custom) profile 404c, deck mode (custom) profile 404d, and custom drive control profile 404a are the same mode profile type, but are unique instances of the mode profile type (e.g., because some of the values associated with the parameters of profile type have different values). The self-tapping screw profile 404b is a different mode profile type than the mode profiles 404a, 404c, and 404d. Profile types and components of a mode profile are discussed in more detail below.

By saving the generated mode profiles to the server 112 and associating them with a user, with the external device 108, a user can save a generated mode profile for a first power tool 104 and later access the saved mode profile for loading onto a second power tool 104. Further, if the mode profile is modified while paired with the second power tool 104, the system will notify the user the next time the external device 108 is paired with the first power tool 104 and obtains the old version of the mode profile.

Figure 12:
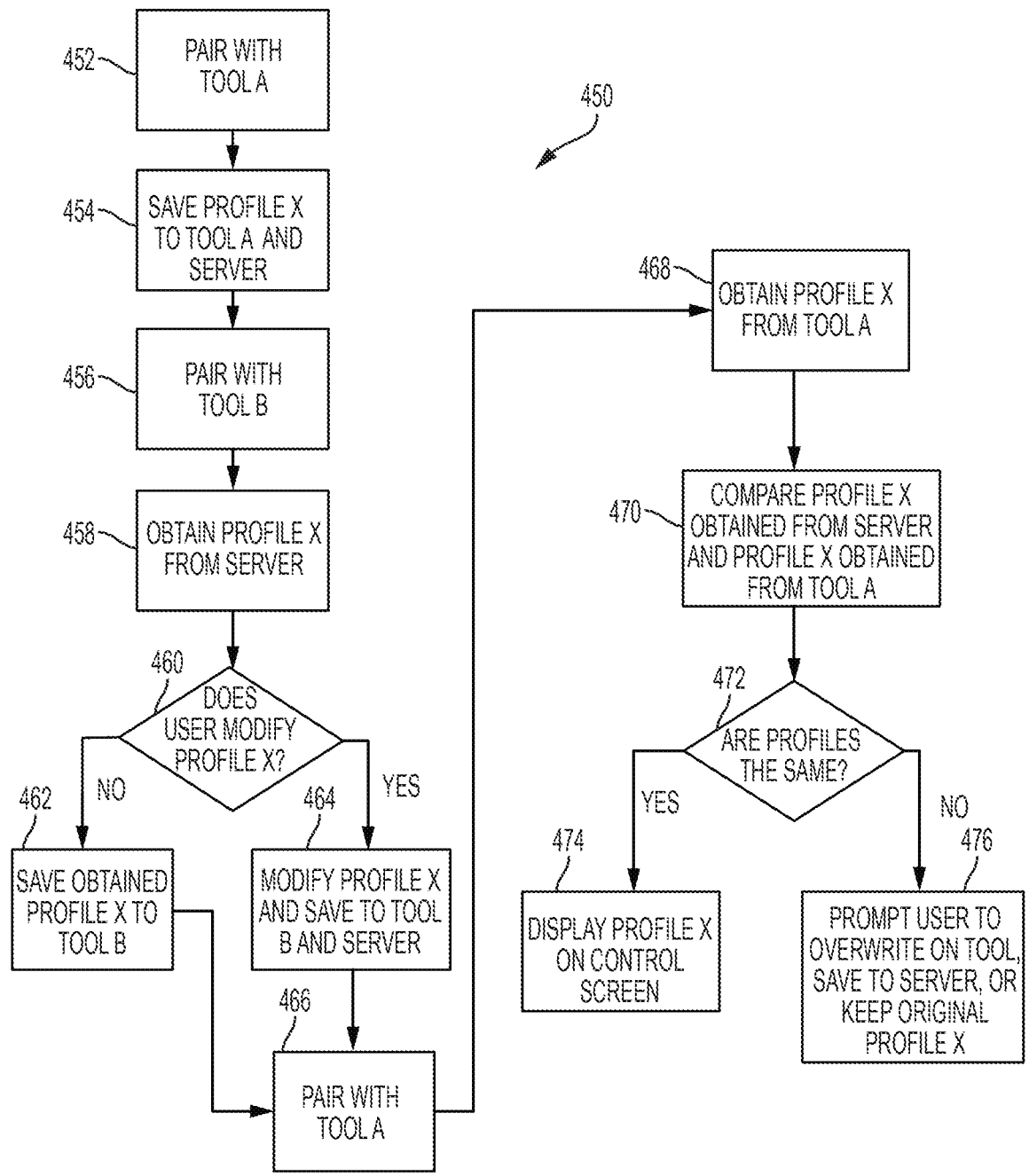
FIG. 12 illustrates a flow chart for saving profile data of the power tool.

The method 450, illustrated in FIG. 12, provides further detail on this process. Various aspects of the method 450, such as obtaining and displaying a mode profile or saving a mode profile to a tool or server, can be carried out through user input to the GUI of the external device 108 using techniques and systems described above. In step 452, the external device 108 pairs with tool A, an instance of the power tool 104. With the external device 108, the user generates and saves to the tool a mode profile X (e.g., "Deck Mode"), and the mode profile X is also saved on the server 112 in the tool profile bank 346 in step 454. The external device 108 later disconnects from tool A and, in step 456, pairs with tool B, which is the same type of tool as tool A (e.g., an impact driver). In step 458, the external device 108 obtains mode profiles from the tool profile bank 346 associated with the user and appropriate for the tool type of tool B, which includes the mode profile X. In step 460, the external device 108 determines whether parameter modifications are received from the user for the mode profile X. If modifications are not received, the external device 108, based on user input, stores the mode profile X to the tool B (step 462). If modifications are received, in step 464, the mode profile X is modified to form a modified version of mode profile X, and the modified version of mode profile X is saved to the tool B and to the tool profile bank 346. In the tool profile bank 346, the previously stored mode profile X is overwritten with the modified version of the mode profile X, unless the modified version of the mode profile X is assigned a new name by the external device 108 based on user input (e.g., on save prompt 410).

Thereafter, the external device 108 disconnects from the tool B. In step 466, the external device 108 again pairs with the tool A. In step 468, the external device 108 obtains (original) mode profile X from the tool A, e.g., using mode profile buttons 400 as described above. In step 470, upon receipt of the (original) mode profile X, the external device 108 obtains a copy of the mode profile X saved in the tool profile bank 346 (modified mode profile X) and compares the modified mode profile X from the server 112 to the original mode profile X from the tool A. The comparison may include, for instance, a comparison of the revision date of the mode profiles or may include a comparison of the various parameters set for the mode profiles. In step 472, if the modified mode profile X is determined to be the same as the original mode profile X (i.e., no modifications in steps 460-464), the external device proceeds to step 474 and displays mode profile X on a control screen of the external device. In step 472, if the modified mode profile X is determined to be different than the original mode profile X, the external device 108 proceeds to step 476 and prompts the user to indicate the discrepancy (e.g., on the touch screen 332). In other words, the external device 108, at step 476, generates an indication to the user that the original mode profile X and the modified mode profile X are not identical. The prompt (or indication) asks whether the user wishes to overwrite the original mode profile X on the tool A with the modified mode profile X from the server 112. In response to a user selection, the external device 108 will either overwrite the original mode profile X on the tool A with the modified mode profile X, will prompt the user to provide the original mode profile X with a new name, or the external device 108 will essentially ignore the discrepancy and allow the original mode profile X profile to be displayed on a control screen of tool interface 318 of the external device 108 (for potential modification by the user).

Although this method 450 is described as using the same external device 108, a user can use different external devices 108 when pairing with tool A and tool B, particularly because the mode profiles are saved in a tool profile bank 346, which is separate from the external devices 108.

Figure 13:
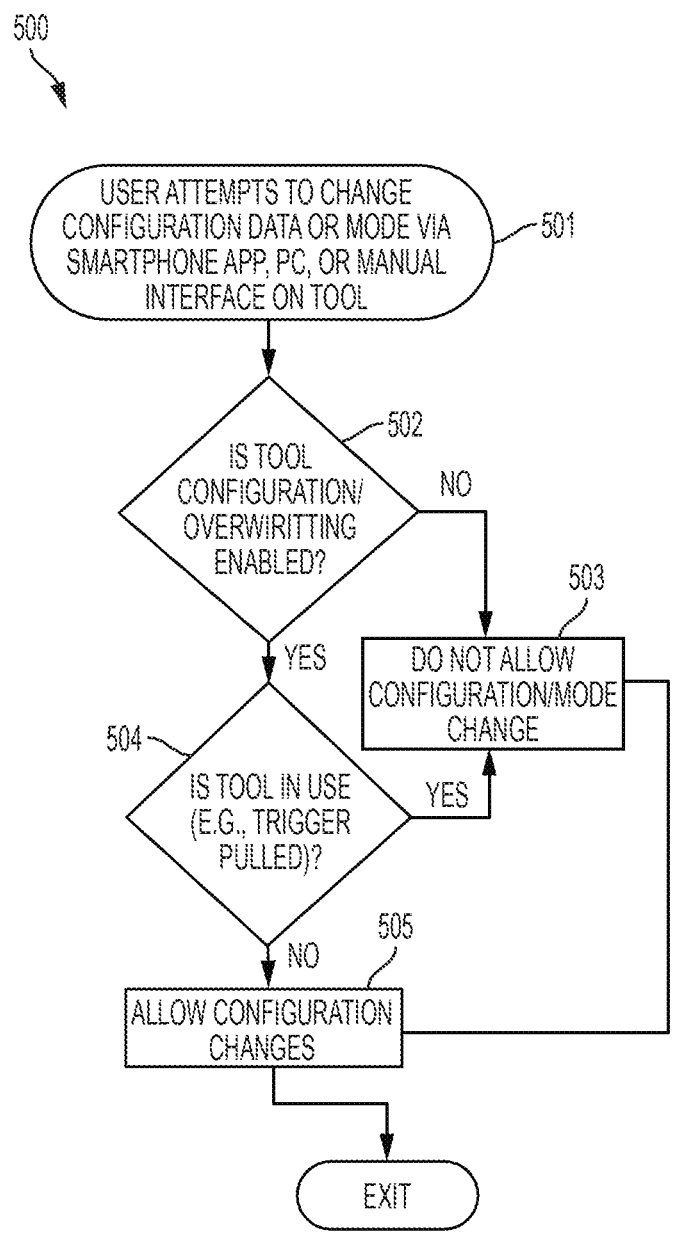
FIG. 13 illustrates a flow chart for locking out mode configuration of the power tool.

FIG. 13 illustrates an exemplary flow chart 500 of the method of a locking out mode configuration implemented by the power tool 104 (e.g., by firmware executing on the controller 226). The locking out mode configuration is implemented to prevent the external device 108 from overwriting data on the power tool 104 when the power tool 104 is not in the adaptive mode or when the power tool 104 is in operation. First, in step 501, a user attempts to overwrite data of the mode profiles 300 through the external device 108. The power tool 104 then determines whether the power tool 104 is configured to enable overwriting of data (step 502). In other words, the power tool 104 determines whether the power tool 104 is in the adaptive mode. As noted above, in some embodiments, the external device 108 cannot overwrite data of the mode profiles 300 unless the power tool 104 is in the adaptive mode (see FIG. 10). Therefore, when the power tool 104 (e.g., the electronic processor 230) determines that the power tool 104 is not in the adaptive mode, the electronic processor 230 (e.g., a hardware or firmware based interlock) prevents changes made to the power tool configuration and/or the mode profiles 300 (step 503). This aspect prevents a potentially malicious individual, separate from the user currently operating the power tool 104, from adjusting tool parameters of the power tool 104 unless the user places the power tool 104 in the adaptive mode. Thus, a user of the power tool 104 can prevent others from adjusting parameters by operating the power tool 104 in one of the other four modes. When the power tool 104 is in the adaptive mode, the power tool 104 (e.g., the electronic processor 230) proceeds to determine whether the power tool 104 is currently in use or operating (step 504). When the power tool 104 is in operation, the hardware or firmware based interlock (implemented, for example, by the electronic processor 230) prevents the electronic processor 230 from writing to the profile bank 302 (step 503). The electronic processor 230 may detect that the power tool 104 is in operation based on depression of the trigger 212 or outputs from Hall sensors indicating motor spinning. When the power tool 104 is not in operation, and is in the adaptive mode, the electronic processor 230 (e.g., the hardware or firmware based interlock) allows data on the power tool 104 to be overwritten by data from the external device 108 (step 505). Thus, even when the power tool 104 is in the adaptive mode, if the power tool 104 is currently operating, the electronic processor 230 will not update or write to the profile bank 302.

In some embodiments, the electronic processor 230 outputs to the external device 108, via the wireless communication controller 250, a signal indicative of whether the power tool 104 is currently operating. In turn, the external device 108 provides an indication to the user, such as through the wireless symbol 384 changing color (e.g., to red) or flashing and a message when the power tool 104 is currently operating. Moreover, the ability to update parameters via a control screen is prevented, similar to the control screen 381 of FIG. 1, when the external device 108 receives an indication that the power tool 104 is currently operating.

Figure 14:
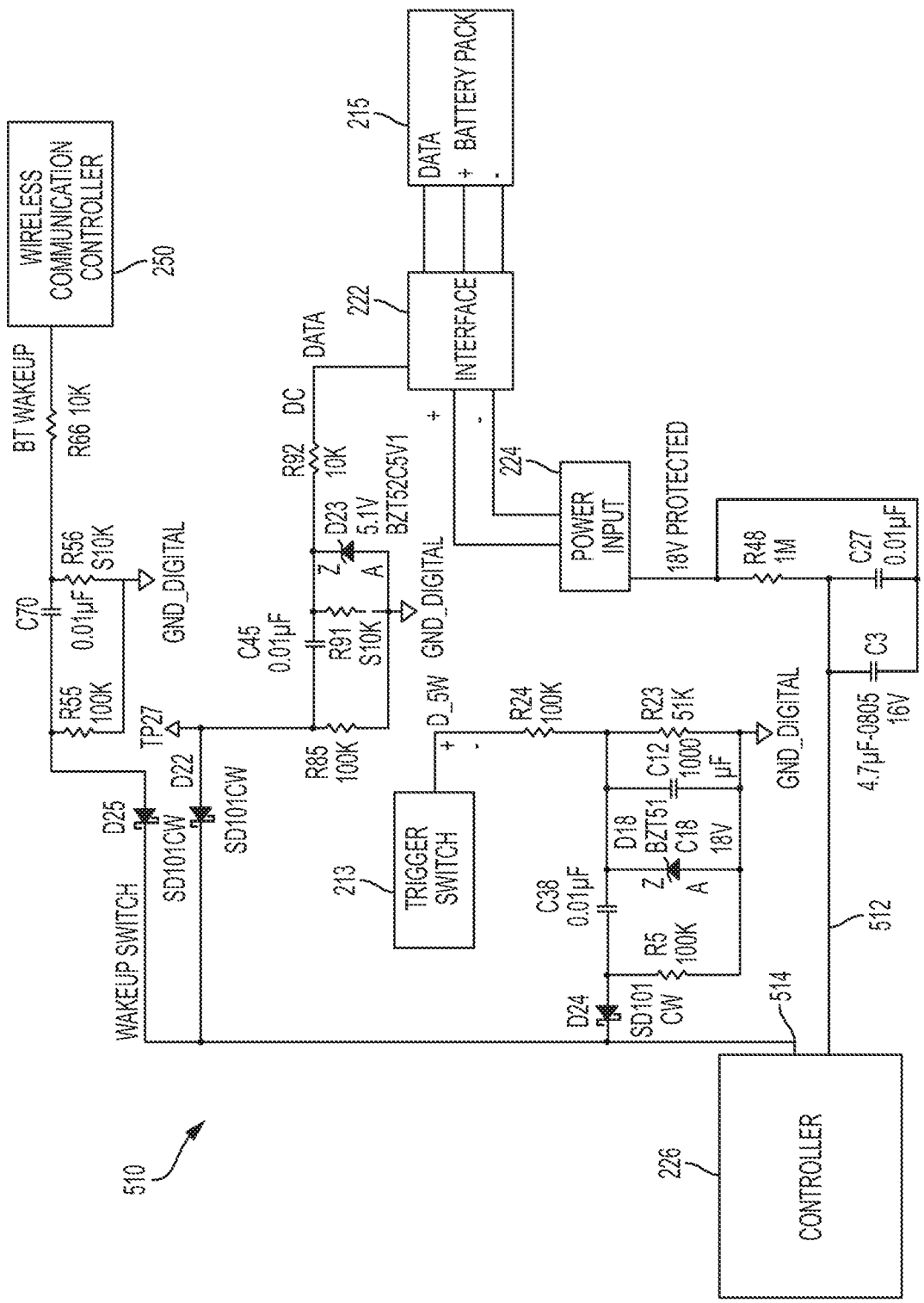
FIG. 14 illustrates a wakeup circuit of the power tool

Further, the external device 108 cannot overwrite data of the mode profiles 300 unless the controller 226 is awake and not in a low-power (sleep) mode. The power tool 104 includes a wakeup circuit and logic 510 as illustrated in FIG. 14, which allows four wakeup sources to awaken the controller 226: insertion/attachment of a main power source, such as the charged battery pack 215; depression of trigger 212; pairing of the power tool 104 with the external device 108; and a wakeup pulse from an attached battery pack 215, which is, for instance, generated by software executing on a controller of the battery pack 215 for various reasons (e.g., low charge). After a period of inactivity of the power tool 104, e.g., 60 seconds where none of the four awakening actions listed above occur, the controller 226 goes to a low-power (sleep) mode.

As shown in FIG. 14, the four sources of awakening signals originate from, for example, the trigger switch 213, the battery pack 215, and the wireless communication controller 250. The controller 226 has two wakeup pins 512 and 514. More particularly, attachment of a battery pack 215 results in a signal from the power input unit 224 being received by the wakeup pin 512. Wakeup pin 514 receives a wakeup signal from one of three sources: the trigger switch 213 (in response to depressing the trigger 212); the wireless communication controller 250 (in response to pairing with the external device 108); and a data output of the battery pack 215.

Returning to FIG. 7, selecting the factory reset 379 on the home screen 370 causes the external device 108 to obtain default mode profiles from the tool profiles 314 or from the tool profile bank 346 on the server 112, and provide the default profiles to the power tool 104, which then overwrites the profile bank 302 with the default mode profiles.

The home screen 370 may be similar in look and feel for all, many, or several of the tool interfaces 318, although the icon 371 may be customized for the specific tool interface based on the specific power tool with which the external device 108 is paired. Further, the options listed below the icon may add an "obtain data" option that enables the user to select and obtain operational data from the tool for display on the external device 108 and/or sending to the server 112 for storage as part of the tool data 348. Additionally, in instances where a particular tool is not intended to be configured by the external device 108, the tool controls 374 and manage profiles 376 options may be not included on the home screen 370.

In some embodiments, an adaptive mode switch separate from the mode selection switch 290 is provided on the power tool 104. For instance, LED 296e (FIG. 3A) may be a combined LED-pushbutton switch whereby, upon first pressing the combined LED-pushbutton switch, the power tool 104 enters the adaptive mode and, upon a second pressing of the switch, the power tool 104 returns to the mode that it was in before first pressing (e.g., mode 1). In this case, the pushbutton 290 may cycle through modes 1-4, but not the adaptive mode. Furthermore, certain combinations of trigger pulls and/or placement of the forward/reverse selector 219 into a particular position (e.g., neutral) may cause the power tool 104 to enter and exit the adaptive mode.

Returning to the concept of mode profiles (e.g., profiles 300), a mode profile 300 includes one or more features, and each of the one or more features includes one or more parameters. For instance, returning to FIGS. 8A-B, the mode profile illustrated is the custom drive control profile, which has the following features: trigger speed control map settings (see max speed (RPM)), impact detection with shutdown (disabled in FIG. 8A via toggle 392), soft start settings (see trigger ramp up), and work light settings (see work light duration and brightness). Each of these features includes parameters. For instance, the trigger speed control map settings feature includes a parameter set to 850 RPM.

Figures 15A, 15B:
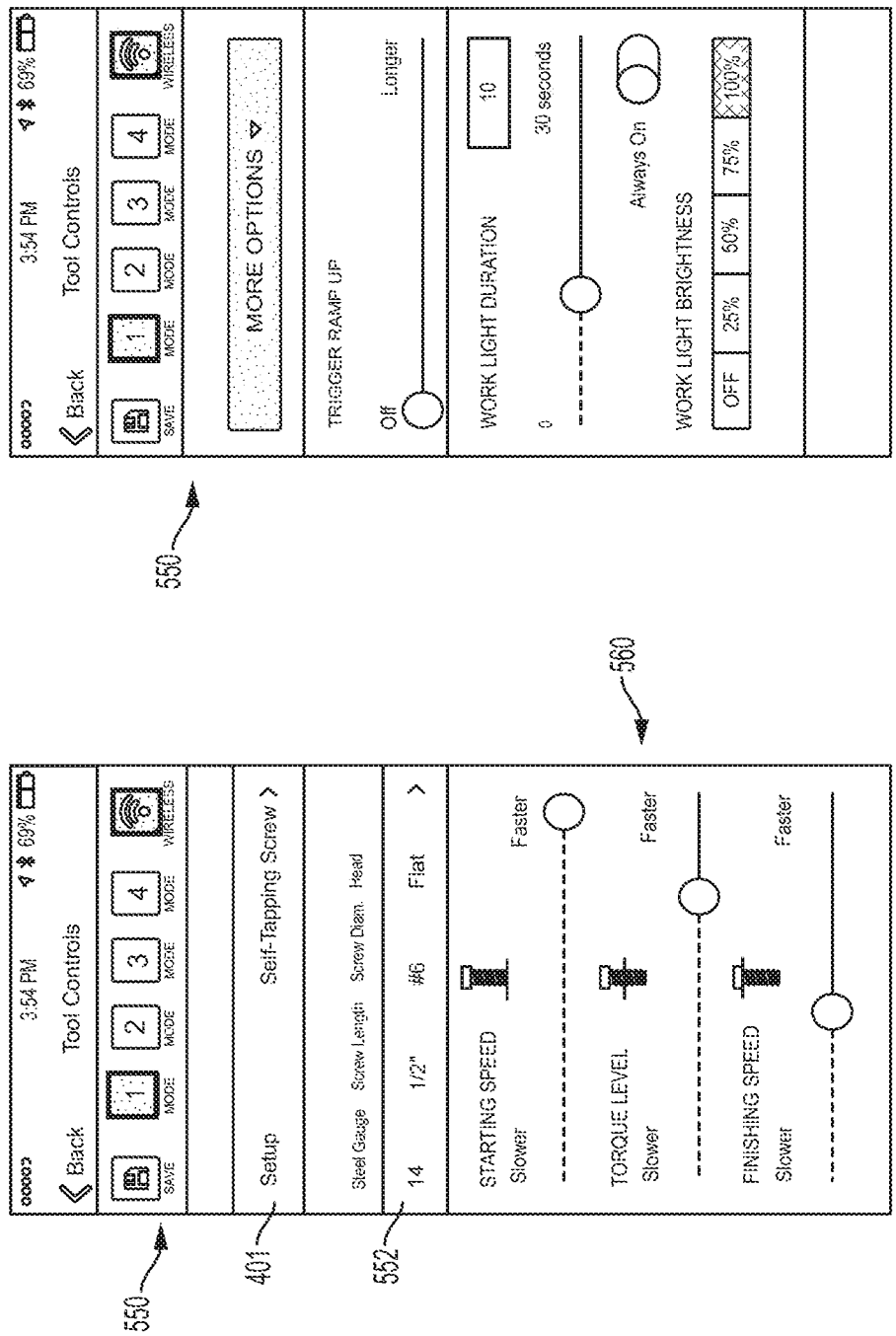
FIGS. 15A-D illustrate further exemplary screenshots of the user interface of the external device of the communication system.

The particular features available for customization on a control screen of the external device 108 varies based on mode profile type. For instance, the custom drive control profile of FIGS. 8A-B have the four features noted above, while a self-tapping screw profile, as illustrated in FIGS. 15A-B includes a different list of features on its control screen 550 including: self-drilling screw; soft start; and work light.

Additionally, different tool types have different available features based on, for example, the primary function of the power tool. For example, in Table II below, example features for an impact driver and a hammer drill/driver are listed.

TABLE II

Example Features

| Example Features Available for Impact Driver | Example Features Available for Hammer Drill/Driver |
| --- | --- |
| Self-Drilling Screw | Self-Drilling Screw |
| Work Light | Work Light |
| Soft Start | Soft Start |
| Trigger Speed Control Map | Trigger Speed Control Map |
| Constant Speed (Closed-Loop Control) | Constant Speed (Closed-Loop Control) |
| Variable Speed (Closed-Loop Control) | Variable Speed (Closed-Loop Control) |
| Pulsing Speed (Closed-Loop Control) | Pulsing Speed (Closed-Loop Control) |
| Impact Detection with Shutdown | Constant Pulsing |
| Impact Detection with Speed Change | Electronic Clutch Map |
| No Impact | |

The features for a particular mode profile are selected such that the features are compatible and do not conflict with one another. The tool profiles 314 on the external device 108 include (a) default mode profiles for each tool type that have particular groupings of features that are compatible and (b) at least one sandbox profile that presents all or several features available for a particular tool, including features that are incompatible with one another. Examples of two types of default profiles include the custom drive control profile (FIGS. 8A-B) and the self-tapping screw profile (FIGS. 15A-B), as each of these mode profile types lists a subset of the total available features for the power tool 104, and the listed features are compatible.

In contrast, a sandbox profile for the impact driver may include each of the features available for an impact driver, e.g., as listed in Table II above. Here, some features listed conflict with other features listed. For example, the self-drilling screw feature is incompatible with the no impact feature, the impact detection with shutdown feature, and the impact detection with speed change feature. The self-drilling screw feature, in part, includes (a) driving a fastener until tool current exceeds a specified value, then changing the maximum tool speed to a lower speed, (b) driving until the tool detects an impact (of the hammer to the anvil), then changing the maximum speed to an even lower speed until the trigger 212 is released. The no impact feature includes controlling the power tool 104 to drive its output unit without generating impacts, which conflicts with the self-drilling screw feature that relies on impacts occurring in the control algorithm. Additionally, the impact detection with shutdown and the impact detection with speed change features alter the operation of the power tool 104 upon a certain number of impacts being detected. However, each of these features controls the tool 104 differently upon impacts occurring than the self-drilling screw feature. Accordingly, these features are incompatible.

When the sandbox profile is selected and its associated control screen is displayed, the external device 108 prevents a user from selecting conflicting features. For instance, each available feature in the sandbox profile may be listed on a scrollable control screen, similar to how the features of the custom drive control profile in FIGS. 8A-B, but with additional features listed. Each feature may have an enable/disable toggle switch (not shown), similar to the custom drive control toggle 392. When a user enables a toggle switch for a particular feature, the other features available in the sandbox profile that are incompatible with the enabled feature are greyed-out to prevent user manipulation via the GUI and, if previously enabled, disabled (e.g., the associated toggle switch is placed in the disable position). Accordingly, while the sandbox profile makes available features that would be incompatible if enabled together, the control screen for the sandbox profile prevents a user from generating a mode profile having conflicting (e.g., incompatible) features.

Table III below lists fifteen exemplary features, providing a feature identifier, a feature name, a list of applicable tools with which the feature may be used, and a list of incompatible features that conflict with the particular feature. For instance, the constant speed feature has a feature identifier "2," has a feature name "constant speed," works on impact drivers, impact wrenches, standard drill/drivers, and hammer drills/drivers. Further, the constant speed feature is incompatible with the features having feature IDs 1, 3, 5, 7, 9, 10, 11, 12, 13, 14, and 15 (i.e., the impact self-drilling screw feature, the variable bounded speed feature, the speed pulse feature, and so on). The constant speed feature, however, is compatible with features having feature IDs 4, 6, and 8 (i.e., the work light settings feature, impact counting with shutdown feature, and soft start settings feature). The details of the features and the particular features in Table III are exemplary, and in other embodiments, more or less features may be available to more or less power tools.

TABLE III

| Feature ID | Feature Name | Applicable Tools | Incompatible Features |
|---|---|---|---|
| 1 | Impact Self-Drilling Screw | Impact Driver | 2, 3, 5, 7, 9, 10, 11, 12, 13, 14, 15 |
| 2 | Constant Speed | Impact Driver Impact Wrench Hammer Drill/Driver Standard Drill/Driver | 1, 3, 5, 7, 9, 10, 11, 12, 13, 14, 15 |
| 3 | Variable Bounded Speed | Impact Driver Impact Wrench Hammer Drill/Driver Standard Drill/Driver | 1, 2, 5, 10, 11, 12, 13, 15 |
| 4 | Work light Settings | Impact Driver Impact Wrench Hammer Drill/Driver Standard Drill/Driver | none |
| 5 | Speed Pulse | Impact Driver Impact Wrench Hammer Drill/Driver Standard Drill/Driver | 1, 2, 3, 7, 9, 10, 11, 12, 13, 14, 15 |
| 6 | Impact Counting with Shutdown | Impact Driver Impact Wrench | 7, 9, 13, 14 |
| 7 | No Impact | Impact Driver Impact Wrench | 1, 2, 5, 6, 10, 12, 13 |
| 8 | Soft Start Settings | Impact Driver Impact Wrench Hammer Drill/Driver Standard Drill/Driver | none |
| 9 | E-Clutch | Hammer Drill/Driver Standard Drill/Driver | 1, 2, 5, 6, 14 |
| 10 | Impacting Up/Down Shift | Impact Driver Impact Wrench | 1, 2, 3, 5, 7, 9, 11, 12, 13, 15 |
| 11 | Variable Bounded PWM | Impact Driver Impact Wrench | 1, 2, 3, 5, 10, 12, 13, 15 |
| 12 | PWM Pulse | Hammer Drill/Driver Standard Drill/Driver | 1, 2, 3, 5, 7, 10, 11, 13, 15 |
| 13 | Drill Self-Drilling Screw | Hammer Drill/Driver Standard Drill/Driver | 1, 2, 3, 5, 7, 10, 11, 12, 15 |
| 14 | Clutch Collar Range | Hammer Drill/Driver Standard Drill/Driver | 1, 2, 5, 6, 9 |
| 15 | Variable Bounded PWM with Two Speeds (Mechanical) | Hammer Drill/Driver Standard Drill/Driver | 1, 2, 3, 5, 10, 11, 12, 13 |

A mode profile, such as one of the mode profiles 300, includes configuration data specifying enabled features and the parameters thereof. For instance, each feature is assigned an identifying code (e.g., a two-byte binary ID). For a particular feature, a certain number of bytes accompanies the identifying code to specify the parameters of that feature. For instance, the impact counting with shutdown feature may be specified by a two-byte binary ID (e.g., 0x01) and concatenated with two bytes that specify the number of impacts to occur before shutdown (e.g., 0x0F to specify 15 impacts). The identifying code and parameter code, together, form an encoded feature. An encoded mode profile includes a concatenation of one or more encoded features. The encoded mode profile is saved in the profile bank 302 as one of the mode profiles 300a. Firmware on the controller 226 is operable to decode an encoded profile and control the power tool 104 according to the features and parameters specified by the encoded mode profile.

The power tool 104 further includes a compatibility check module, e.g., in firmware stored on the memory 232 and executed by the electronic processor 230. At the time of receiving a new mode profile from the external device 108 for saving in the profile bank 302, the compatibility check module confirms that each feature within the new mode profile is compatible with the other features in the mode profile and/or that each feature within the new mode profile is not incompatible with the other features in the mode profile. In some instances, the compatibility check module confirms the compatibility of a mode profile's features upon each trigger pull when that mode profile is the currently selected mode profile. To carry out the compatibility check, the firmware may include a list of compatible and/or incompatible features stored in, for instance, a table similar to Table III above, and the electronic processor 230 is operable to perform comparisons with the table data to determine whether the features are compatible or incompatible. The compatibility check module provides an additional layer of security to protect against a maliciously generated or corrupted mode profile.

The control screens of the tool interfaces 318 also place bounds on the values that a user can enter for a particular parameter. For instance, in FIG. 8A, the maximum speed cannot be set above 2900 RPM or below 360 RPM. The power tool 104 further includes a boundary check module, e.g., in firmware stored on the memory 232 and executed by the electronic processor 230. At the time of receiving a new mode profile from the external device 108 for saving in the profile bank 302, the boundary check module confirms that each parameter of each feature is within maximum and minimum boundaries or is otherwise a valid value for the particular parameter. For instance, the boundary check module confirms that the maximum speed set for the custom drive control profile is within the range of 360 RPM to 2900 RPM. In some instances, the boundary check module confirms the parameter values of the features of the power tool's current mode profile are within acceptable boundaries upon each trigger pull. In other embodiments, the boundary check module confirms the parameter values of the features of the power tool's mode profile when the mode profile is saved to the power tool 104. To carry out the boundary check, the firmware may include a list of parameters for each feature and the applicable maximum and minimum boundaries stored in, for instance, a table, and the electronic processor 230 is operable to perform comparisons with the table data to determine whether the parameter values are within the acceptable boundaries. The boundary check module provides an additional layer of security to protect against a maliciously generated or corrupted mode profiles, features, and parameter values.

Upon the compatibility check module determining that a mode profile has incompatible features, the controller 226 is operable to output an alert message to the external device 108 that indicates the error, which may be displayed in text on the touch screen 332, drive indicators 220, LEDs 296a-e, vibrating a motor, or a combination thereof may be used to alert the user that the mode profile includes incompatible features. Similarly, upon the boundary check module determining that a parameter value is outside of an acceptable range, the controller 226 is operable to output an alert message to the external device 108 that indicates the error (which may be displayed in text on the touch screen 332, drive indicators 220, LEDs 296a-e, vibrating a motor, or a combination thereof may be used to alert the user of having a parameter value above its maximum value and/or below its minimum value.

In some instances, enabling a first feature changes one or more boundary values of a second feature. For instance, the no impact feature, when enabled, alters the maximum speed parameter of the variable bounded PWM feature. The no impact feature operates to stop operation of the impact tool (e.g., impact driver or impact wrench) as a driving operation nears an impact blow (e.g., between hammer and anvil), but before the impact occurs. For instance, the controller 226 monitors motor or battery current using the current sensor of sensors 218 and, when the current reaches a threshold, the controller 226 quickly reduces and then stops the speed of the motor 214. For instance, the controller 226 will change the maximum percent trigger pull to a reduced percentage (e.g., between 15-20%) to slow the motor 214, and shortly thereafter (e.g., in 0.1-0.5 seconds), stop driving the motor 214. In the variable bounded PWM feature, the user selects a maximum speed for non-impacting operation and a maximum speed for impacting operation. For instance, when unloaded, the tool 104 will operate according to the amount trigger pull (indicated by trigger switch 213) up to a maximum speed as indicated by the user for non-impacting operation. Once impacting begins (e.g., as determined by the controller 226 detecting a change in acceleration, amount of instantaneous current or change in current, microphone, or accelerometer), the tool 104 will operate according to the amount trigger pull (indicated by trigger switch 213) up to a maximum speed as indicated by the user for impacting operation. If the controller 226 determines that impacting has not occurred for a certain time period, e.g., 200-300 milliseconds (ms), the tool 104 will again limit the maximum speed for non-impacting operation specified by the user.

As noted above, the no impact feature, when enabled, alters the maximum speed parameter of the variable bounded PWM feature. More particularly, when the no impact feature is selected, the control screens of the tool interfaces 318 also will change the upper boundary of the maximum speed selectable for the variable bounded PWM feature. For instance, the maximum speed is may be limited to 70-75 RPM for the variable bounded PWM feature when the no impact feature is enabled. Reducing the maximum speed upper boundary can improve the performance of the no impact feature by limiting the maximum speed and reducing the likelihood of impacting.

Figures 15C, 15D:
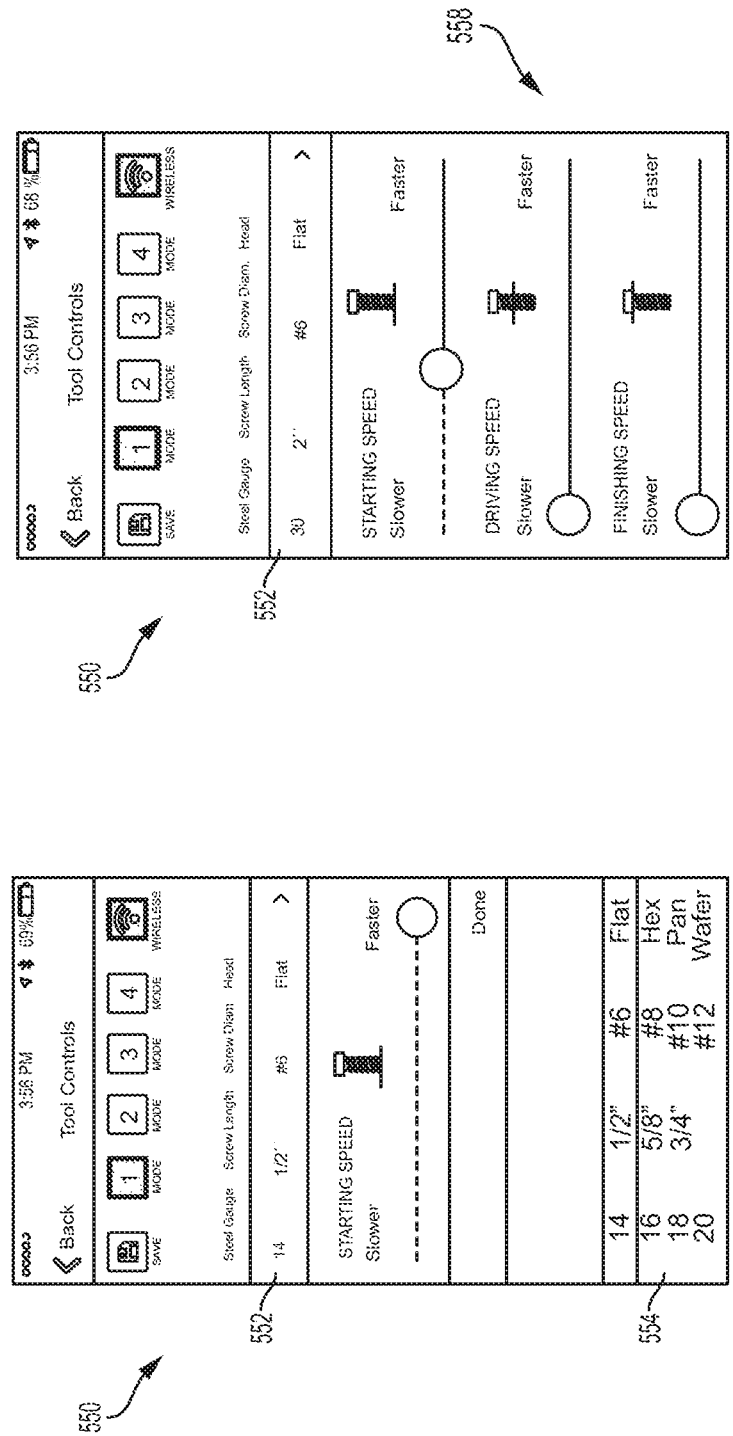

On some control screens of tool interfaces 318, a parameter assist block is provided. The parameter assist block includes work factor inputs that allow a user to specify details of the workpiece on which the power tool will operate (e.g., material type, thickness, and/or hardness), details on fasteners to be driven by the power tool (e.g., material type, screw length, screw diameter, screw type, and/or head type), and/or details on an output unit of the power tool (e.g., saw blade type, number of saw blade teeth, drill bit type, and/or drill bit length). For instance, the self-tapping screw profile control screen 550 includes a parameter assist block 552, as shown in FIGS. 15A-B. The parameter assist block 552 includes work factor inputs that allow a user to specify the steel gauge, the screw length, the screw diameter, and the screw head type. For instance, by selected the parameter assist block 552, a parameter assist screen 554 is generated as shown in FIG. 15C. On the parameter assist screen 554, the user can specify each of the work factor inputs by cycling through values using the touch screen 332. Upon selecting "done" to indicate completing entry of the work factor inputs, the external device 108 adjusts parameters of the feature or profile. For instance, the values of the parameters 558 in FIG. 15D have been adjusted by the parameter assist block 552 relative to the parameters 560 of FIG. 15A.

As shown in FIG. 15A, the parameters 558 include three user adjustable parameters of the same parameter type (motor speed) that are applicable at different stages (or zones) of a single tool operation (fastening). More specifically, for the self-tapping screw profile, a user is operable to specify on the control screen 550 a starting motor speed during the starting stage of a fastening operation, a driving speed during an intermediate stage of the fastening operation, and a finishing speed during a final/finishing stage of the fastening operation. The controller 226 determines when the different stages of the fastening operation occur and are transitioned between. For instance, at the beginning of a fastening operation for the tool 104 implementing the self-tapping screw profile, the controller 226 drives the motor 214 at the user-selected starting speed. After the controller 226 determines that the motor or battery current exceeds a current threshold, the controller 226 begins driving the motor 214 at the user-selected driving speed. While in the intermediate/driving stage, when the controller 226 detects an impact blow, the controller 226 begins driving the motor 214 at the user-selected finishing speed. In some embodiments, in the various stages of the self-tapping screw profiles, the controller 226 drives the motor 214 at the user-selected speeds regardless of the amount depression of the trigger 212, as long as the trigger 212 is at least partially depressed. In other words, the speed of the motor 214 does not vary based on the amount of depression of the trigger 212. In other embodiments, the user-selected speeds in the self-tapping screw profile are treated as maximum speed values. Accordingly, in these embodiments, the speed of the motor 214 varies based on the amount of depression of the trigger 212, but the controller 226 ensures that the motor 214 does not exceed the user-selected speeds for the various stages.

Different parameter assist blocks are provided for different mode profile types, and each parameter assist block may include work factor inputs appropriate to the particular mode profile type. For instance, a speed control profile for driving fasteners includes the trigger speed control map feature, which allows a user to specify the minimum and maximum speed parameter values of the power tool 104, whose speed varies between a minimum and maximum speed based on the position of the trigger 212. The speed control profile may include a parameter assist block that receives as work factor inputs the material type (e.g., wood, steel, or concrete), the screw head type (e.g., standard, Phillips, or square), screw diameter (e.g., #6, #8, or #10) and the screw length (e.g., 1 in., 2 in. or 3 in.). The parameter assist block will adjust the maximum and minimum speed parameter values based on the work factor inputs.

Figure 16:
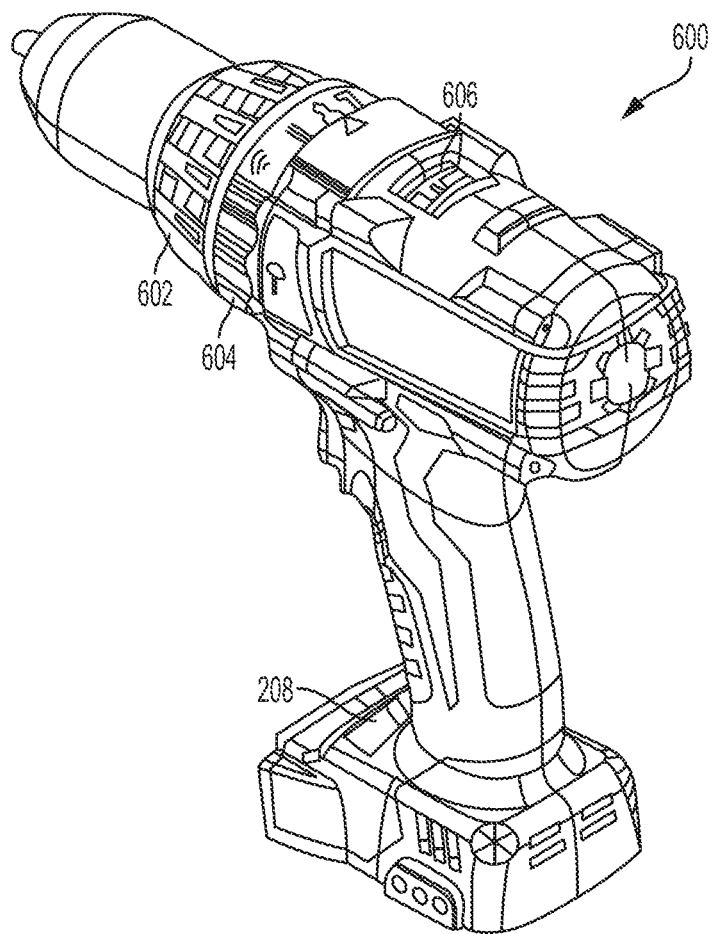
FIG. 16 illustrates a hammer drill/driver of the communication system.

FIG. 16 illustrates a hammer drill/driver 600, which is another example of the power tool 104 that communicates with the external device 108. The hammer drill/driver 600 includes a clutch ring 602, a mode selector ring 604, the mode pad 208 (see FIG. 4), and a high-low speed (gear ratio) selector 606. The mode selector ring 604 includes four positions: drill mode, hammer drill mode, clutching drive mode, and adaptive mode. When the mode selector ring 604 is positioned to select the drill mode, hammer drill mode, or clutching drive mode, the hammer drill 600 essentially operates as a traditional hammer drill/driver in selected one of the three modes. However, when the mode selector ring 604 is positioned to indicate the adaptive mode, the mode pad 208 is activated and operates similar to that which is described above for the power tool 104. That is, the hammer drill has a profile bank 302 that is configurable using the external device 108.

FIGS. 17A-B illustrates a mode profile type applicable to the hammer drill/driver 600, a custom drive control (hammer drill/driver) profile having a control screen 620. This profile includes the electronic clutch map feature, which allows a user to specify clutching parameters. For instance, when the adaptive button is selected (FIG. 17A), the user can specify clutch ring maximum and minimum settings and, when the fixed button is selected (FIG. 17B), the user can specify a particular torque setting at which point the hammer drill/driver 600 will begin clutching. The mode profile further includes a trigger speed control map feature that allows the user to separately specify the maximum speed for the low speed setting and the high speed setting. The user can elect whether the hammer drill/driver is in the low speed setting or high speed setting based on the position of the high-low speed selector 606. The custom drive control (hammer drill/driver) profile is applicable to the hammer drill/driver 600, but not the impact driver 104, because features offered on this mode profile (e.g., electronic clutch map feature) are not applicable to the impact driver 104, which doesn't have an electronic clutch capability.

Enabling the electronic clutch feature, in which the user specifies an approximate torque value at which the hammer drill/driver 600 should begin clutching and stop driving, changes one or more boundary values of a soft start feature. In the soft start feature, when the trigger 212 is pulled, the controller 226 will start driving the motor 214 and gradually increase the speed of the motor 214 to the desired speed indicated by the trigger switch 213 over a user-entered time period (e.g., entered via the GUI of the external device 108). On the hammer drill/driver 600, the minimum and maximum boundaries for the time period of the soft start feature may be 20 ms and 5000 ms, respectively. When the torque value specified by the user for the hammer drill/driver 600 is set above a certain value (e.g., 70 in-lbs.), the control screens of the tool interfaces 318 will increase the minimum boundary of the soft start (e.g., from 20 ms to 100 ms). This change in the minimum boundary will help reduce torque overshoot and improve the electronic clutch performance. Additionally, when the torque value specified by the user for the hammer drill/driver 600 is set below a certain value (e.g., 70 in-lbs.), the control screens of the tool interfaces 318 will increase the minimum boundary of the soft start (e.g., from 20 ms to 1000 ms). This increase further reduces the likelihood of torque overshoot, particularly when driving in delicate applications.

The boundary values for certain features may also vary depending on the tool on which the feature is implemented. For instance, while the standard soft start time period boundaries may be 20 ms and 5000 ms for the hammer drill/driver 600, on an impact driver without an electronic clutch or the electronic clutch feature, the minimum and maximum boundaries for the time period of the soft start feature may be 100 ms and 5000 ms, respectively.

As noted above, various other features are available for selection by a user for configuring a power tool 104 or hammer drill/driver 600. For instance, the trigger speed control map feature enables a user to indicate a maximum motor speed, minimum motor speed, or both for the motor 214 based on depression of the trigger 212. For instance, a user may indicate via a control screen of a tool profile 314 a maximum and/or minimum speed parameter value (see, e.g., FIG. 8A). These selected parameter values are provided to the tool as part of a mode profile 300, and they map to a particular pulse width modulated (PWM) duty cycle. Accordingly, if a user depresses the trigger 212 by a first (minimum) amount, the controller 226 generates a PWM signal with a first (lower) duty cycle for driving the FET switching 216 and driving the motor 214 the minimum speed. If the user fully depresses the trigger 212 by a second (maximum) amount, the controller 226 generates a PWM signal with a second (higher) duty cycle for driving the FET switching 216 and driving the motor 214 the maximum speed. The duty cycle may vary linearly between the minimum and maximum values based on the depression amount of the trigger 212. This trigger speed control map feature uses an open-loop control technique.

Closed loop variable speed control is another available feature where the user can specify a maximum and/or minimum speed for the motor 214. The closed loop variable speed feature is similar to the trigger speed control map feature, except that the controller 226 monitors Hall sensor output form the sensors 218 to determine the actual speed of the motor 214 to provide closed loop feedback. The controller 226, in turn, will increase or decrease the PWM signal duty cycle to the FET switching 216 to achieve the desired motor speed.

Closed loop constant speed control is another feature that uses Hall sensor output for closed loop feedback. In the closed loop constant speed control feature, the user specifies a desired speed (e.g., via a control screen of a tool profile 314), and the motor 214 is controlled with closed loop feedback to be at the specified speed when the trigger 212 is depressed, regardless of the amount of depression.

The pulsing speed feature receives two user selected speeds for the motor 214 via a control screen of a tool profile 314. In some instances, the user may also select an oscillation rate (e.g., frequency or time period). Upon the user depressing the trigger 212, the controller 226 will drive the motor 214, oscillating between the user-specified two speeds at a default oscillation rate or an oscillation rate indicated by the user. In some instances, the controller 226 drives the motor 214 at the specified speeds using open loop control, for example, with PWM signals having predetermined duty cycles expected to provide the desired speeds. In other instances, the controller 226 drives the motor 214 using closed loop feedback where the duty cycle of the PWM signal driving the FET switching 216 is adjusted to maintain the desired speeds based on motor speed feedback (e.g., from the Hall sensors of sensors 218). While outputs from the Hall sensors are provided as an example technique for determining motor speed in this and other embodiments, in some embodiments, other motor speed detection techniques are used, such as monitoring back electromotive force (EMF). The open loop implementation may be referred to as the PWM pulse feature, while the close loop implementation may be referred to as the constant pulse feature.

The impact detection with shutdown feature receives a user-specified number of impacts. During operation, upon a trigger pull, the controller 226 drives the motor 214 until the earlier of the user releasing the trigger 212 and the controller 226 detecting that the specified number of impacts occurred. The controller 226 may detect impacts as mentioned above, e.g., based on a change in acceleration or current, and may use an impact counter that the controller 226 increments upon each detected impact. Once the impact counter reaches the threshold indicated by the user, the controller 226 stops driving the motor 214. In preparation for the next operation, the impact counter may be reset when the user releases the trigger 212.

Impact detection with speed change feature receives a user-specified speed and direction. When unloaded and until the first impact is detected by the controller 226, the controller 226 drives the motor 214 normally, varying the speed according to trigger pull, up to the maximum set speed. If the motor 214 is rotating in the user-specified direction (e.g., forward), upon the controller 226 detecting an impact, the controller 226 drives the motor 214 up to the maximum of the use-specified speed. For instance, if the user has the trigger 212 fully depressed when the impact is detected, the speed of the motor 214 will change (e.g., reduce) to the user-specified speed. If impacts are no longer detected for a certain period of time (e.g., 200-300 ms), the controller 226 returns to the original operation where the user-specified speed is no longer the maximum speed for the motor 214.

The self-tapping screw (drill) profile includes a feature for driving self-tapping screws that does not use impact detection. More specifically, for the self-tapping screw (drill) profile, a user specifies, on a control screen of a profile 314, an initial speed and a finishing speed. In some instances, the user is also able to specify a transition level. During operation, the controller 226 controls the motor 214 to start at the initial speed and to transition to the finishing speed upon detecting that the current of the motor 214 or battery pack 215 exceeds a certain threshold. The threshold may be a predetermined value or a value selected by the external device 108 dependent on the transition level indicated by the user. For instance, the user may specify a low sensitivity level whereby the controller 226 would switch from the initial speed to the finishing speed after a higher level of current than if the user specified a high sensitivity level. The transition levels may be on a sliding scale (e.g., between 1 and 10 or 1 and 100), and the associated current threshold may vary proportionally to the scale. As with the self-tapping screw profile with three stages described above with respect to FIG. 15A, in some embodiments, in the two stages of the self-tapping screw (drill) profiles, the controller 226 drives the motor 214 at the user-selected speeds regardless of the amount of depression of the trigger 212, as long as the trigger 212 is at least partially depressed. In other embodiments, the motor speed varies based on the amount that the trigger 212 is depressed, and the user-selected speeds are treated as maximum speed values.

Further mode profiles types are available to the power tools 104. For instance, for impact drivers (see, e.g., FIG. 2) and impact wrenches, further mode profile types include a tapping profile, a concrete anchor profile, a finish work profile, a groove-joint coupling profile, a breakaway profile, and a finish control profile. Moreover, for the hammer drill/driver 600, further mode profiles types include a metal drilling profile, and a speed pulse profile. As noted above, for each mode profile, a unique control screen of the associated tool interface 318 may be provided on the GUI of the external device 108. Additionally, the power tool 104 may have options that are adjustable across a plurality of mode profiles, such as a customized gear ratio change option, as will be described in more detail below. Such options may also have a unique control screen of the associated tool interface 318 on the GUI of the external device 108. Based on the parameters of the above-mentioned mode profiles and options, the controller 226 generates particular control signals to the FETs through the switching network 216 to achieve the desired direction of rotation, number of rotations, speed of rotation, and/or maximum speed of rotation of the motor 214.

Figure 18:
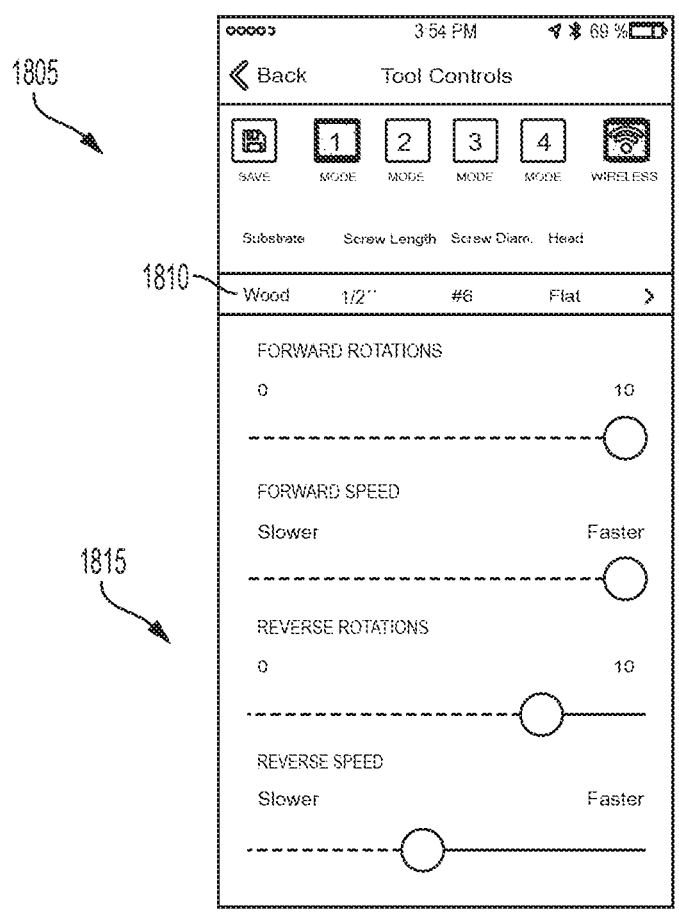
FIG. 18 illustrates a further exemplary screenshot of the user interface of the external device of the communication system.

The tapping profile allows the power tool 104, upon pull of the trigger 212, to automatically drive forward and in reverse (i.e., a first predetermined amount of rotations forward and a second predetermined amount of rotations in reverse) repeatedly until release of the trigger 212. The power tool 104 can be used to tap a screw when the power tool 104 is driven in such a manner. As shown in FIG. 18 on a control screen 1805 of the GUI, the tapping profile includes a parameter assist block 1810 for receiving, from the user, one or more of a screw type, a screw length, a screw diameter, and a type of substrate into which the screw will be driven. In response to the external device 108 receiving user inputs in the parameter assist block 1810, the external device 108 adjusts parameters 1815 of the tapping profile (e.g., a number of forward rotations, a number of reverse rotations, a forward speed at which forward rotations are to occur, and a reverse speed at which reverse rotations are to occur). The external device 108 may adjust the parameters 1815 using a look-up table that includes parameter values corresponding to the user inputs in the parameter assist block 1810. If desired, the user is able to further adjust each parameter 1815 (e.g., using a slider, or another type of actuator, on the GUI as shown in FIG. 18). The power tool 104 receives the tapping profile including the specified parameters, for instance, in response to a user selecting to save the tapping profile on the external device 108 as described above with respect to FIG. 11.

The concrete anchor profile control screen is similar to the control screen 550 of FIGS. 15A-B and allows a user to specify a starting speed, driving speed, and finishing speed, as well as the trigger ramp up and work light parameters. However, the concrete anchor profile control screen has a parameter assist block with different work factor inputs than the control screen 550. In particular, the concrete anchor profile control screen has one or more of the following work factor inputs including an anchor type (e.g., wedge or drop-in), an anchor length, an anchor diameter, and concrete strength (e.g., in pounds per square inch (PSI)). In response to the external device 108 receiving user inputs specifying each of the one or more work factor inputs, the external device 108 adjusts the starting speed, driving speed, and finishing speed parameters. The user is then able to further adjust each parameter, if desired (e.g., using a slider on the GUI). The power tool 104 receives the concrete anchor profile including the specified parameters, for instance, in response to a user save action on the external device 108 as described above.

Similar to the self-tapping screw profile, the power tool 104 implementing the concrete anchor profile determines when to start and transition between the different stages of the fastening operation. For instance, at the beginning of a fastening operation for the tool 104 implementing the concrete anchor profile, the controller 226 drives the motor 214 at the user-specified starting speed. After the controller 226 determines that the motor or battery current exceeds a current threshold, the controller 226 begins driving the motor 214 at the user-specified driving speed. While in the intermediate/driving stage, when the controller 226 detects an impact blow, the controller 226 begins driving the motor 214 at the user-selected finishing speed. In some embodiments, the controller 226 may also change from the intermediate/driving speed stage to the finishing stage based on detected current exceeding another current threshold.

In some embodiments, in the various stages of the self-tapping screw profiles, the controller 226 drives the motor 214 at the user-selected speeds regardless of the amount depression of the trigger 212, as long as the trigger 212 is at least partially depressed. In other words, the speed of the motor 214 does not vary based on the amount of depression of the trigger 212. In other embodiments, the user-selected speeds in the self-tapping screw profile are treated as maximum speed values. Accordingly, in these embodiments, the speed of the motor 214 varies based on the amount of depression of the trigger 212, but the controller 226 ensures that the motor 214 does not exceed the user-selected speeds for the various stages. In some embodiments, while in the starting speed stage, the amount of depression of the trigger 212 varies the motor speed, but, while in the driving speed and finishing speed stages, the speed of the motor 214 does not vary based on the amount of depression of the trigger 212.

Use of the concrete anchor profile can improve repeatability from one concrete anchor to the next, and reduce breaking of anchors caused by applying too much torque or driving with too much speed.

The finish work profile, also referred to as the trim work profile, is used for more delicate fastening operations. In a first version of the finish work profile, the user specifies the maximum speed of the motor 214. The controller 226 drives the motor 214 in response to a trigger 212 at a speed that does not exceed the maximum speed specified, and stops the motor 214 when a certain pre-impact current threshold is reached. The pre-impact current threshold is a motor current level before which an impact will occur, which can be determined through testing. In other words, as long as the motor current is below the pre-impact current threshold, the power tool 104 is expected to drive without impacting. However, if the motor current exceeds the pre-impact current threshold, impacting would be likely to occur. Additionally, the probability of impacting starting increases as the difference between the motor current and the pre-impact current threshold increases. Thus, the controller 226 will cease driving the motor 214 before a torque output level is reached at which impacting will occur, providing a more delicate driving torque that will reduce damage to detail, finishing, or trim work. In another version of the finish work profile, rather than stopping the motor 214 at a pre-impact current threshold, the controller 226 ceases driving the motor 214 after a certain number of impacts is detected by the controller 226. The number of impacts may be specified by the user via a control screen on the external device 108, along with the maximum speed of the motor. The finish work profile may use the no impact feature noted above in Table II.

Figure 19:
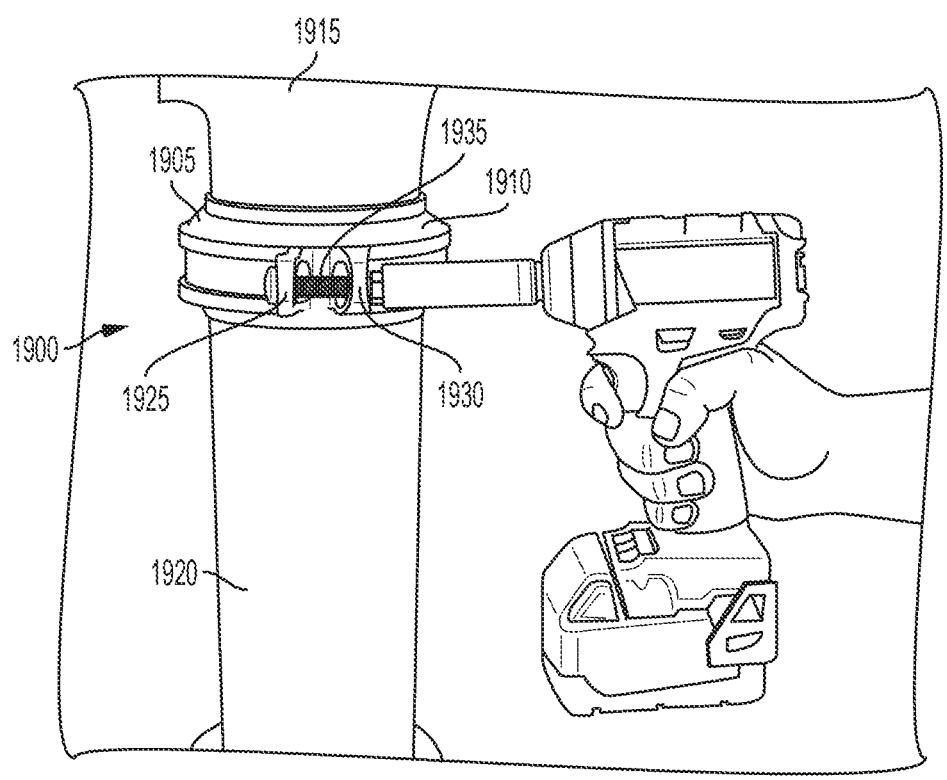
FIG. 19 is a side view of an exemplary groove-joint coupling.

The groove-joint coupling profile is used for tightening a groove-joint coupling that joins, for instance, grooved end pipes. As shown in FIG. 19, a groove-joint coupling 1900 generally includes two semi-circle portions (e.g., a first semi-circle portion 1905 and a second semi-circle portion 1910) that, when joined together, form a ring around the interface of two pipes (e.g., a first pipe 1915 and a second pipe 1920). The coupling may also include a gasket between (a) the formed outer ring and (b) the pipes 1915, 1920 to seal the interface of the two pipes 1915, 1920. The two semi-circle portions 1905, 1910 may each include flanged ends 1925, 1930, respectively. FIG. 19 is a side view of an exemplary groove joint coupling that shows one flanged end 1925, 1930 of each semi-circle portion 1905, 1910, while the other flanged end of each semi-circuit portion 1905, 1910 is on the opposite side hidden from view. Each flanged end 1925, 1930 includes a through-hole. The flanged ends 1925, 1930 of the semi-circle portions 1905, 1910 meet and the through-holes are aligned to receive a threaded bolt 1935. A nut is tightened on each end of the threaded bolt 1935, bringing the flanged ends 1925, 1930 together, forming the ring, and compressing or securing the gasket in position to seal the interface of the pipes 1915, 1920. As shown in FIG. 19, the bolt 1935 is inserted through the visible flanged ends 1925, 1930 and the power tool tightens a nut on an end of the inserted bolt 1935.

As noted, a nut and bolt coupling is located on two, opposing sides of the groove-joint coupling 1900. When tightening the nuts on the groove-joint coupling, a user generally alternates between the nut and bolt coupling on a first side of the groove-joint coupling and the nut and bolt coupling on a second side of the groove-joint coupling. Alternating sides allows even coupling and ensures a functioning seal, preventing one side from being over-tightened and the other side form being under tightened.

The groove-joint coupling profile includes a parameter assist block for receiving, from the user, a coupling type (e.g., steel) and a coupling size (e.g., 2 inch, 4 inch, or 6 inch diameter) as work factor inputs of the groove-joint coupling. In response to the external device 108 receiving user inputs specifying each of the one or more work factor inputs, the external device 108 adjusts the maximum speed and the number of impacts parameters. The user is then able to further adjust each parameter, if desired. The power tool 104 receives the groove joint coupling profile including the specified parameters, for instance, in response to a user save action on the external device 108 as described above with respect to FIG. 11.

In operation, in response to a pull of the trigger 212, the controller 226 drives the motor 214 at a speed dependent on the amount of trigger depression up to the maximum speed set by the maximum speed parameter. The controller 226 continues to drive the motor until the controller 226 detects that the specified number of impacts has occurred. Once the number of impacts has occurred, the controller 226 ceases driving of the motor 214, and the user alternates to the other side of the groove-joint coupling. In practice, the user may alternate momentarily driving each nut of the groove-joint coupling until a lightly snug fit is achieved. In other words, the user gets the nut-bolt tightening operation started, but releases the trigger before the specified number of impacts is reached. After getting the coupling started, the user then proceeds to hold the trigger down on the first side until the number of impacts is reached, and then complete the tightening operation by switching to the second side and driving the nut until the number of impacts is reached. The groove-joint coupling profile may use the impact counting with shutdown feature noted above in Table II.

Figure 20:
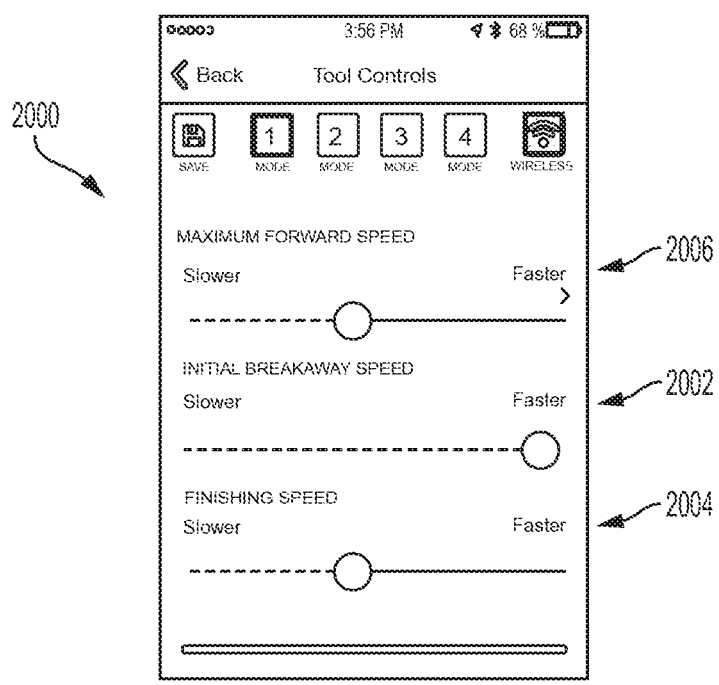
FIG. 20 illustrates a further exemplary screenshot of the user interface of the external device of the communication system.

The breakaway profile is used for removing fasteners from a workpiece and removing nuts from bolts. The profile allows the power tool 104 to begin with high speed and power, and to automatically reduce motor speed to provide the user greater control for ending the fastener/nut removal and to prevent loss of a nut or fastener at the end of the operation when it is removed. As shown in FIG. 20, the external device 108 generates a control screen 2000 to customize the breakaway profile. For example, the control screen 2000 for the breakaway profile receives user input indicating one or more of an initial breakaway speed 2002, a finishing speed 2004, and a transition parameter (e.g., number of impacts or a time period). In the illustrated embodiment, the control screen 2000 also includes a maximum forward speed parameter 2006. The power tool 104 receives the breakaway profile including the specified parameters 2002, 2004, 2006, and more, if applicable, for instance, in response to a user save action on the external device 108 as described above with respect to FIG. 11. If desired, the parameters 2002, 2004, 2006, (and the transition parameter) can be adjusted by the user (i.e., using a slider on the GUI). These parameters will be explained in greater detail below.

In some embodiments, the power tool 104 implementing the breakaway profile begins operation having a maximum motor speed as specified by the initial breakaway speed 2002. After the number of impacts occur or after the time period elapses, as specified by the transition parameter, the controller 226 reduces the speed of the motor 214 to the finishing speed 2004. In another embodiment, the power tool 104 implementing the breakaway profile also begins operation having a maximum motor speed as specified by the initial breakaway speed 2002. However, the power tool 104 continues operating with the maximum motor speed setting until impacts cease being detected. When no impact is detected for a certain amount of time, the power tool 104 transitions to the finishing speed 2004.

Figure 21:
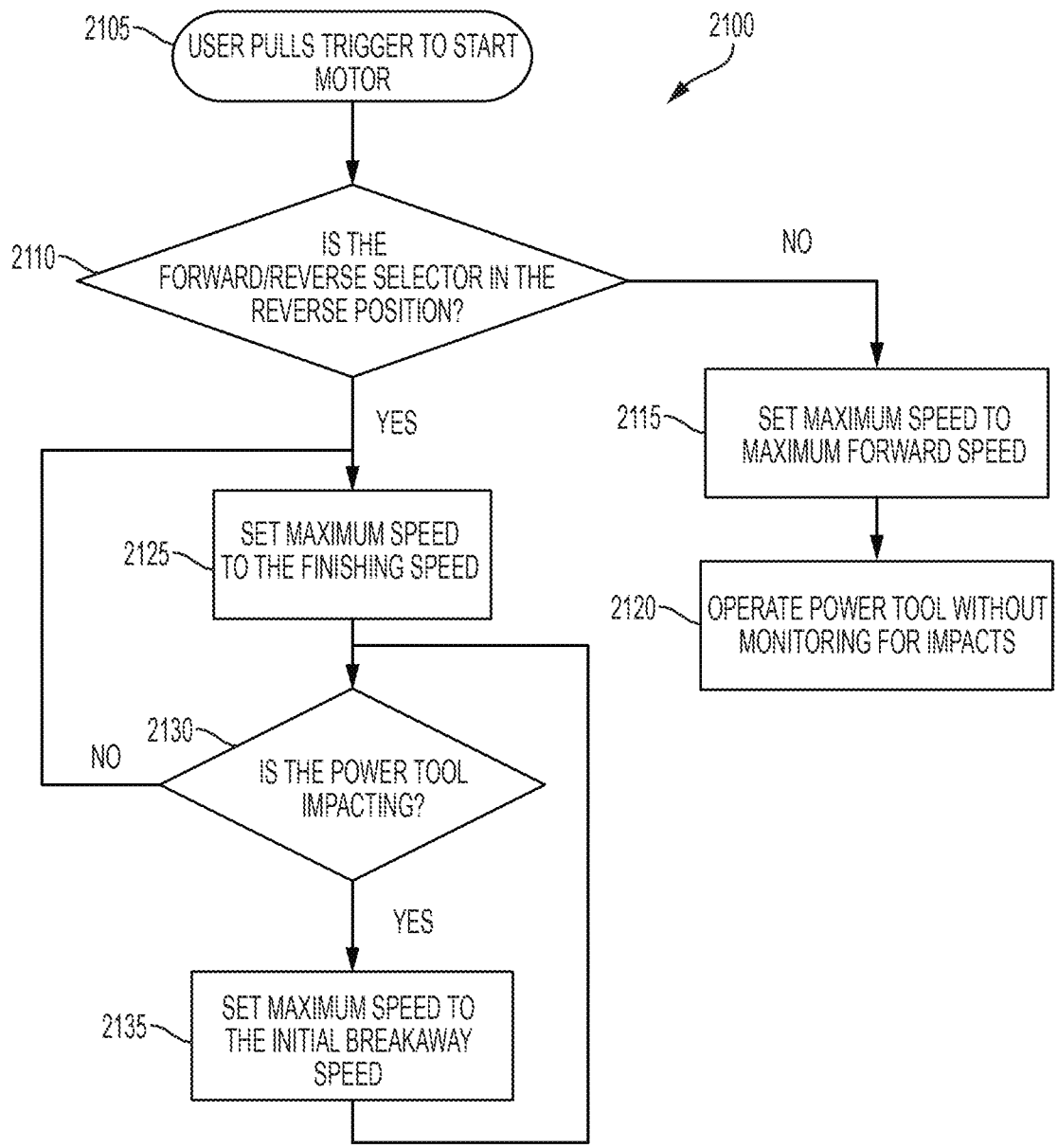
FIG. 21 illustrates a flowchart of an exemplary implementation of a breakaway profile on the power tool.

In some embodiments, the power tool 104 implementing the breakaway profile operates differently depending on the position of the forward/reverse selector 219 on the power tool 104. FIG. 21 illustrates a method 2100 of implementing the breakaway profile in such a way. At block 2105, the user pulls the trigger 212. Upon trigger pull, at block 2110, the controller 226 determines whether the forward/reverse selector 219 is in the reverse position. When the forward/reverse selector 219 is in the forward position, at block 2115, the controller 226 sets the maximum speed of the motor 214 to the maximum forward speed. At block 2120, the power tool 104 operates without monitoring for impacts. The power tool 104 continues to operate in this manner until the user releases the trigger 212.

When the forward/reverse selector 219 is in the reverse position, at block 2125, the controller 226 sets the maximum speed of the motor 214 to the finishing speed. The power tool 104 then operates while monitoring for impacts. At block 2130, the controller 226 determines whether the power tool 104 is impacting (i.e., whether impacts are occurring), as will be discussed in greater detail below. When the power tool 104 is not impacting, the maximum speed of the motor 214 remains at the finishing speed. When the power tool 104 is impacting, at block 2135, the controller 226 sets the maximum speed of the motor 214 to the initial breakaway speed. Note that when using the power tool 104 to remove nuts, fasteners, etc., the power tool 104 may begin impacting almost immediately upon the user pulling the trigger 212. In such situations, the maximum motor speed is almost immediately set to the initial breakaway speed. After the maximum speed of the motor 214 is set to the initial breakaway speed, the method 2100 proceeds back to block 2130 so the controller 226 may continue to monitor whether impacts are occurring. When the nut, fastener, etc. that is being removed becomes loose, the power tool 104 will stop impacting. At block 2130, when the controller 226 determines that impacts are no longer occurring, the controller 226 proceeds to block 2125 and sets the maximum speed of the motor 214 to the finishing speed. The power tool 104 continues to operate in this manner until the user releases the trigger 212.

To detect impacts, the controller 226 may detect changes in motor acceleration that occur upon each impact. Accordingly, the controller 226 may detect that impacts have ceased when no change in motor acceleration indicative of an impact has occurred for a certain amount of time.

As motor speed increases, changes in motor acceleration due to impacts reduce in size and are more difficult to detect. Accordingly, in some embodiments, the controller 226 uses different impact detection techniques depending on the motor speed. When the motor speed is below a certain (e.g., predetermined) speed threshold, the controller 226 monitors the motor acceleration to detect impacts, and the controller 226 may detect that impacts have ceased when no change in acceleration indicative of an impact has occurred for a certain amount of time. When the motor speed is above the certain speed threshold, the controller 226 considers that impacts are occurring when the motor current is above a certain (impact threshold) level. In these embodiments, the controller 226 may infer the number of impacts that have occurred based on the amount of time that the motor current has been above the impact threshold level and the motor speed has been above the speed threshold. The number of impacts may be inferred using a predetermined impacts-per-millisecond value, which may vary depending on the motor speed and motor current. When the motor is operating at speeds above the speed threshold, the controller 226 may detect that impacts have ceased when the current drops below the impact threshold level.

The metal drilling profile is used for drilling into a metal workpiece using the hammer drill/driver 600, or another power tool. The metal drilling profile allows the hammer drill/driver 600 to operate at an appropriate speed to drill a hole with a drill bit or hole saw in the metal workpiece without unnecessarily wearing out the drill bit or hole saw and to reduce the difficulty in controlling the tool. For example, it can be beneficial to drive the motor of the hammer drill/driver 600 at a slower speed for a hole saw than for a twisted bit. The metal drilling profile includes a parameter assist block for receiving, from the user, work factor inputs including one or more of an accessory type (e.g., hole saw or twist bit), a material type (e.g., galvanized steel, aluminum, stainless steel), and a material thickness or gauge. In response to the external device 108 receiving user inputs specifying each of the one or more work factor inputs, the external device 108 adjusts the maximum driving speed of the hammer drill/driver 600. The user is then able to further adjust the maximum driving speed, if desired (e.g., using a slider on the GUI). The hammer drill/driver 600 receives the metal drilling profile including the specified parameter, for instance, in response to a user save action on the external device 108 as described above with respect to FIG. 11. Thereafter, in response to a trigger pull, the hammer drill/driver 600 limits the maximum speed to the specified level. The metal drilling profile uses, for instance, the variable bounded speed feature described above with respect to Table II.

The speed pulse profile is a variation of the metal drilling profile in that the speed pulse profile is also used to configure a power tool for drilling in metal. The speed pulse profile includes a parameter assist block for receiving, from the user, work factor inputs including one or more of an accessory type (e.g., hole saw or twist bit), a material type (e.g., galvanized steel, aluminum, stainless steel), and a material thickness or gauge. In response to the external device 108 receiving user inputs specifying each of the one or more work factor inputs, the external device 108 adjusts a low speed parameter, a high speed parameter, and a pulse duration parameter (e.g., in milliseconds). The user is then able to further adjust these parameters, if desired (e.g., using a slider on the GUI). The hammer drill/driver 600 receives the speed pulse profile including the specified parameters, for instance, in response to a user save action on the external device 108 as described above with respect to FIG. 11.

In operation, in response to a trigger pull, the hammer drill/driver 600 alternates between momentarily driving the motor of the hammer drill/driver 600 at the low speed and the high speed specified by the user. The amount of time that the motor is driven at the high speed before switching to the low speed, and vice versa, is the pulse duration parameter specified by the user. The speed pulse profile uses, for instance, the pulsing speed feature described above with respect to Table II.

A finish control profile may also be implemented by the power tool 104. The finish control profile allows the power tool 104 to begin operation at a maximum initial speed and to reduce the maximum speed to a maximum finishing speed after the user pulses the trigger (i.e., releases and re-presses the trigger in less than a predetermined time period). As described above, setting the maximum speed allows the power tool 104 to operate according to the amount of trigger pull (indicated by trigger switch 213) up to the maximum speed. The finish control profile assists in precisely driving a fastener into a workpiece. More particularly, when nearing completion of a fastening operation, correctly timing release of the trigger 212 so that the fastener is properly driven can be challenging, especially at high speeds. If the trigger 212 is depressed too long, the fastener may be driven too far into the workpiece or over-torqued, which could result in the fastener head breaking off. If the trigger 212 is released too soon, the fastener may extend out from the workpiece. Precisely controlling speed of the motor 214 of the power tool 104 may prevent the fastener from being overdriven or under driven.

Figure 22:
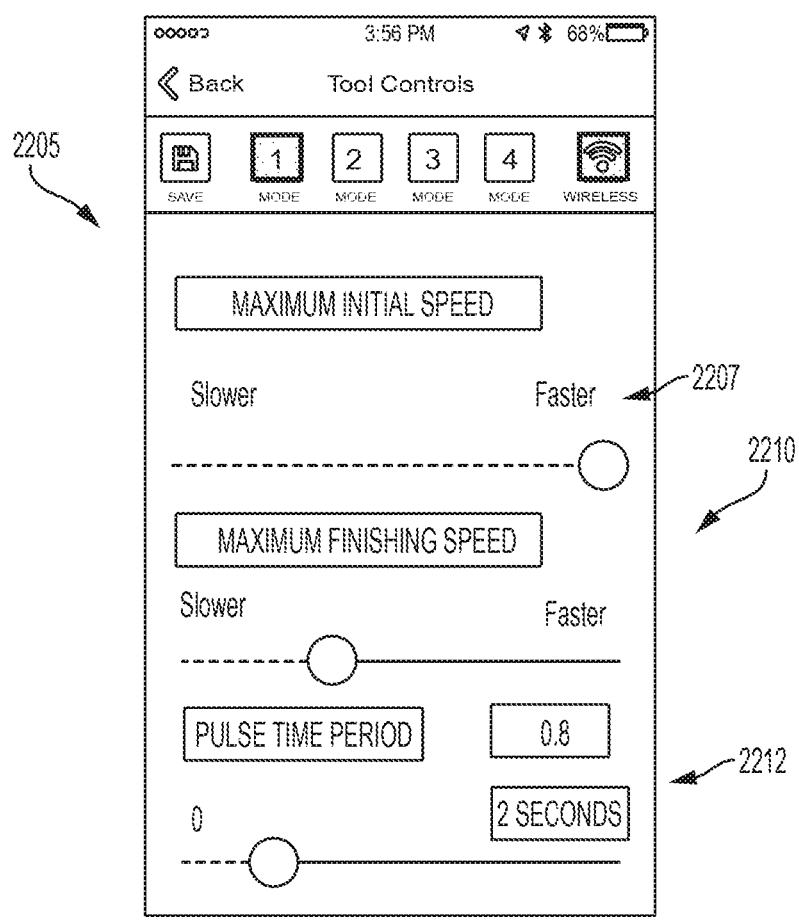
FIG. 22 illustrates a further exemplary screenshot of the user interface of the external device of the communication system.

The external device 108 generates a control screen 2205 for allowing a user to customize the finish control profile. As shown in FIG. 22, the control screen 2205 for the finish control profile is configured to receive, from the user, one or more of the maximum initial speed 2207, the maximum finishing speed 2210, and a pulse time period 2212. The power tool 104 receives the finish control profile including the specified parameters, for instance, in response to a user save action on the external device 108 as described above with respect to FIG. 11. As shown on the control screen 2205 of the GUI in FIG. 22, in some embodiments, parameters 2207, 2210, 2212 are configurable by the user, and if desired, the parameters 2210 can be adjusted by the user (i.e., using a slider on the GUI).

Figure 23:
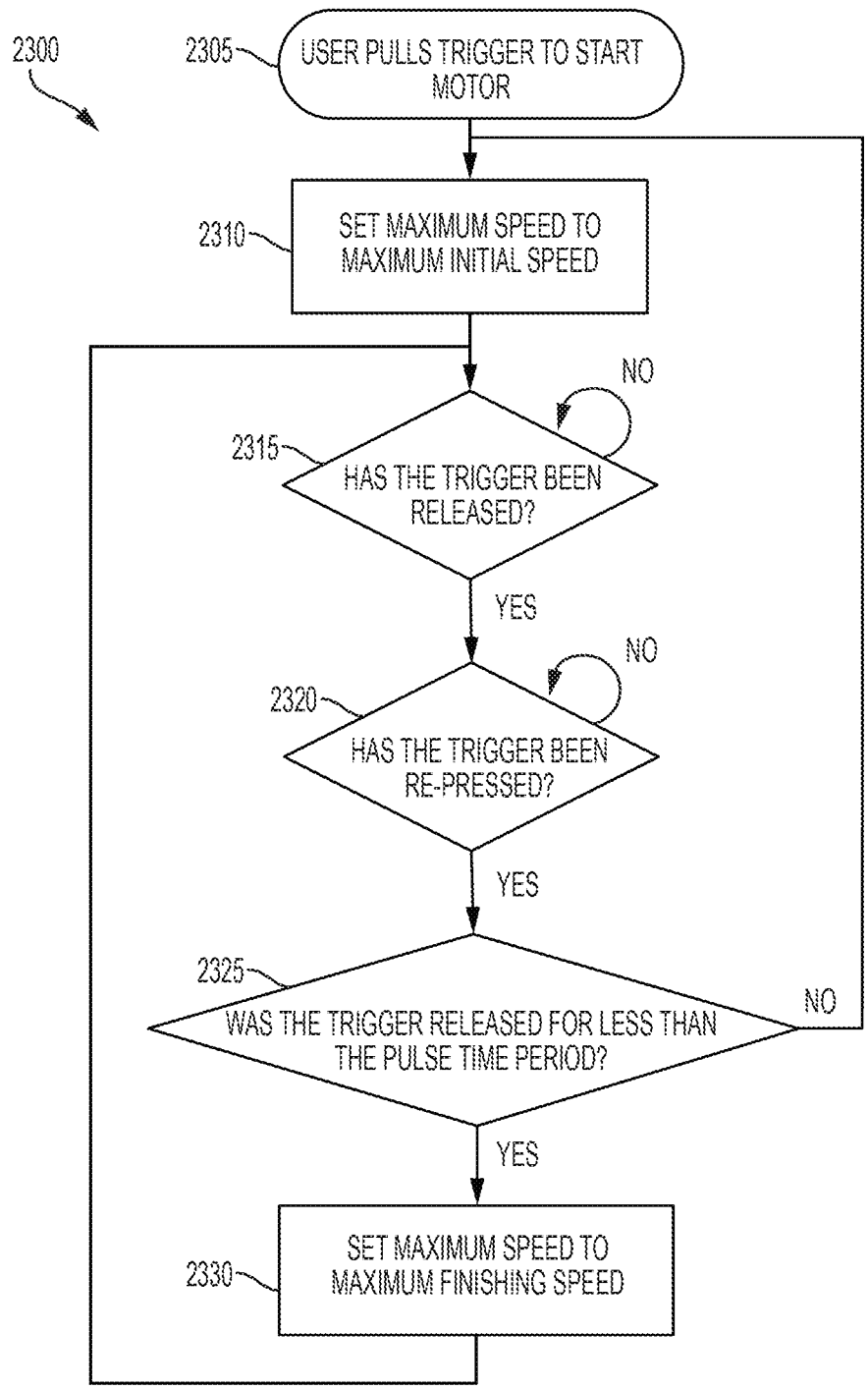
FIG. 23 illustrates a flowchart of an exemplary implementation of a finish control profile on the power tool.

FIG. 23 illustrates a flowchart of a method 2300 of implementing the finish control profile on the power tool 104. At block 2305, the user pulls the trigger 212 to start operation of the power tool 104. At block 2310, the controller 226 sets the maximum speed of the motor 214 to the maximum initial speed. At block 2315, the controller 226 determines whether the trigger 212 has been released. When the controller 226 determines that the trigger 212 has not yet been released, the power tool 104 continues to monitor the trigger 212 and operate with the maximum speed set to the maximum initial speed until the user releases the trigger 212. When the controller 226 determines that the trigger 212 has been released, the controller 226 begins a timer, and at block 2320, the controller 226 determines whether the trigger 212 has been re-pressed. When the controller 226 determines that the trigger 212 has been re-pressed, at block 2325, the controller 226 compares the timer value to the pulse time period and determines whether the trigger 212 was released for less than the pulse time period (i.e., whether the trigger 212 was pulsed by the user).

When the controller 226 determines that the trigger 212 was released for less than the pulse time period (i.e., pulsed by the user), at block 2330, the controller 226 sets the maximum speed of the motor 214 to the maximum finishing speed. The method 2300 then proceeds to block 2315 to continue to monitor the trigger 212. On the other hand, when the controller 226 determines that the trigger 212 was not released for less than the pulse time period (i.e., not pulsed by the user), the controller 226 proceeds to block 2310 where the controller 226 sets the maximum speed of the motor 214 to the maximum initial speed. Thus, when the maximum speed is set at the maximum finishing speed and the trigger 212 is released for longer than the pulse time period, the controller 226 will reset the maximum speed of the motor 214 to the maximum initial speed.

As mentioned above, the customized gear ratio change option may also be implemented on the power tool 104. This option may be used in conjunction with a plurality of profiles. In particular, the features of the customized gear ratio change option may apply regardless of what profile the power tool 104 is operating in. The power tool 104 includes a multiple speed gearbox that allows the motor 214 to provide different levels of torque and speeds to the output device 210. The multiple speed gearbox is coupled to and driven by an output rotor shaft of the motor 214. An output side of the multiple speed gearbox is coupled to and drives the output device 210. An actuator can shift between gears of the multiple speed gearbox to provide higher torque (lower speed) or lower torque (higher speed) depending on the situation in which the power tool 104 is operating.

Figure 24:
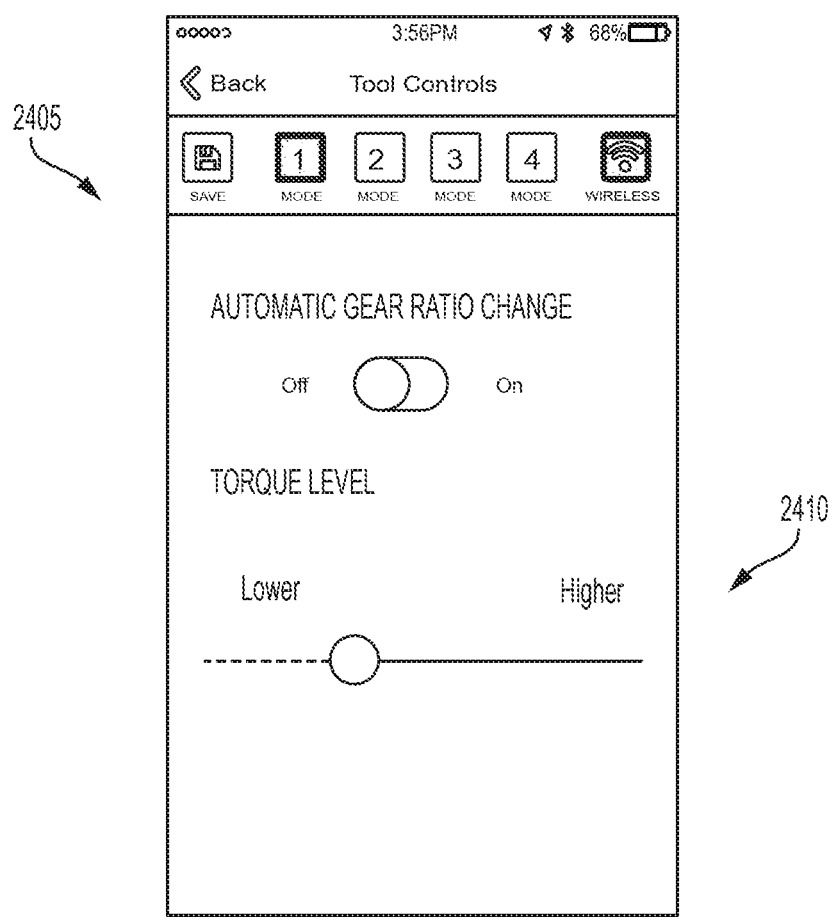
FIG. 24 illustrates a further exemplary screenshot of the user interface of the external device of the communication system.
Figure 25:
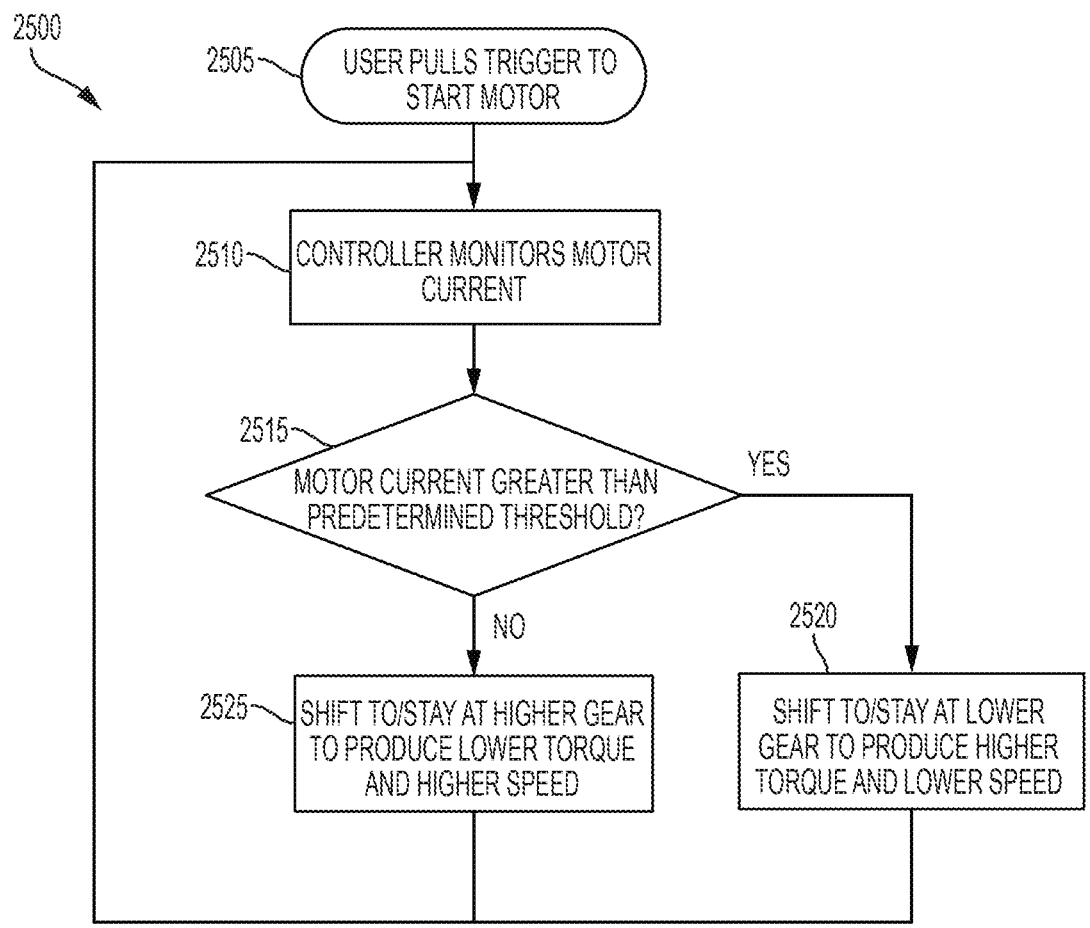
FIG. 25 illustrates a flowchart of an exemplary implementation of a gear ratio change option on the power tool.

The user can select whether the power tool 104 implements automatic gear ratio change or manual gear ratio change during operation. Such a selection can be made using a control screen 2405 on the GUI (as shown in FIG. 24) or by making a selection with a button or switch on the power tool 104. FIG. 25 illustrates a flowchart of a method 2500 of implementing the customized gear ratio change option on the power tool 104. At block 2505 the user pulls the trigger 212 to start operation of the power tool 104. At block 2505, the gear ratio of the multiple speed gearbox may be set to a default gear ratio or may be left at the gear ratio at which the power tool was most recently operated. At block 2510, the controller 226 monitors the current drawn by the motor 214. As a nut, fastener, etc. is tightened or a workpiece is drilled, the current drawn by the motor 214 increases.

At block 2515, the controller 226 determines whether the motor current is greater than a first predetermined threshold. When the motor current is greater than the first predetermined threshold, at block 2520, the controller 226 will control the actuator to automatically shift the multiple speed gearbox to a lower gear to provide more torque. When the multiple speed gearbox is already in the lower gear, the controller 226 controls the actuator such that the multiple speed gearbox remains in the lower gear. Similarly, at block 2515, when the current drawn by the motor 214 is below the first predetermined threshold, the controller 226 proceeds to block 2525 and controls the actuator to automatically shift the multiple speed gearbox to a higher gear, which drives the output shaft faster, but with less torque. When the multiple speed gearbox is already in the higher gear, the controller 226 controls the actuator such that the multiple speed gearbox remains in the higher gear. In some embodiments, more than one predetermined threshold may be implemented. The additional thresholds enable the controller 226 to shift the multiple speed gearbox between more than two gear ratios to change the torque provided to the output device 210 with more granularity.

On the other hand, when the automatic gear ratio is not selected, the controller 226 will not automatically shift the multiple speed gearbox based on the current drawn by the motor 214. Rather, the multiple speed gearbox will remain in the same gear for the entirety of the operation of the power tool 104. Thus, the power tool 104 will provide the same torque to the output device 210 throughout the entirety of the operation of the power tool 104. As shown in FIG. 24, parameters 2410 are configurable by the user. The user may manually adjust the torque level provided by the power tool 104 when automatic gear ratio change is not selected. As described above, this manual setting could be accomplished on the control screen 2405 of the GUI or on the power tool 104 using a button or switch. Based on the manual setting of the torque level by the user, the controller 226 can shift the multiple speed gearbox to utilize the gears that will most closely produce the torque level selected by the user. For example, in applications where high torque is always desired, the user can turn off the automatic gear ratio change and manually set the highest torque level that the power tool 104 can provide.

Many parameters of the profiles described above were explained to be configurable by the user on the control screen of a GUI of the external device 108. However, in some embodiments, the parameters may be adjusted on the power tool 104 itself in addition to or in conjunction with being configurable on the external device 108. For example, buttons, switches, or a display screen may be present on the power tool to allow the user to configure the parameters of the profiles described above. Furthermore, in some embodiments, the profiles may be pre-programmed on the power tool 104 and may be selected using buttons, switches, and/or a display screen on the power tool 104.

In some embodiments, non-power tool devices communicate with the external device 108 via the app-generated GUI in the system 100. For instance, lighting in a building or worksite may have a power circuit with communication capabilities, similar to the wireless communication controller 250. The external device 108 is operable to connect or pair with the wireless communication controller 250. The external device 108 receives an identifier from the power circuit and is thus able to identify the type of device (e.g., lighting). The GUI of the external device 108 then loads a mode profile of the profiles 314 for the identified type of device, which presents a control screen to the user such that the user can control the lighting via the power circuit (e.g., on, off, dim/brightness control, and sleep timer (turn off after set time)).

The external device 108 is further operable to connect to other non-power tool devices (e.g., radios and tool boxes), the type of which are identified by the external device 108. In response, the app-generated GUI provides an appropriate control screen from profiles 314 for the user. In some instances, the communication capabilities of the non-power tool devices are not integrated at the time of manufacture but, rather, are added by a user. For instance, a user may add an RFID tag or communication circuit to non-powered equipment (e.g., a ladder, work bench, or tool box) or to powered devices without built-in capabilities (e.g., earlier model power tools, power tools of a different manufacturer). The RFID tag or communications circuit is, for instance, programmed by a user to store a unique identifier for the attached device/equipment using the external device 108. In turn, the external device 108 can communicate with and receive an identifier of the attached device/equipment. In response, the external device 108 determines the type of device/equipment and provides an appropriate control screen from profiles 314 on the app-generated GUI. While the communication circuit or RFID tag may not be integrated into the functionality of the device to which it is attached, the circuit or tag may include controllable elements itself. For instance, the circuit or tag may include an indicator (e.g., light, speaker, or vibration motor) that the external device 108 can request be activated to help identify the attached device, similar in function to selecting the identify tool button 378 described above with respect to FIG.

7. In one example, the control screen of the GUI on the external device 108 may display the identity of the device/equipment (obtains from the RFID tag or communication circuit), provide a button for updating the device/equipment information stored on the tag or circuit, and provide an identify button to cause the tag or circuit to activate an indicator.

Figure 26:
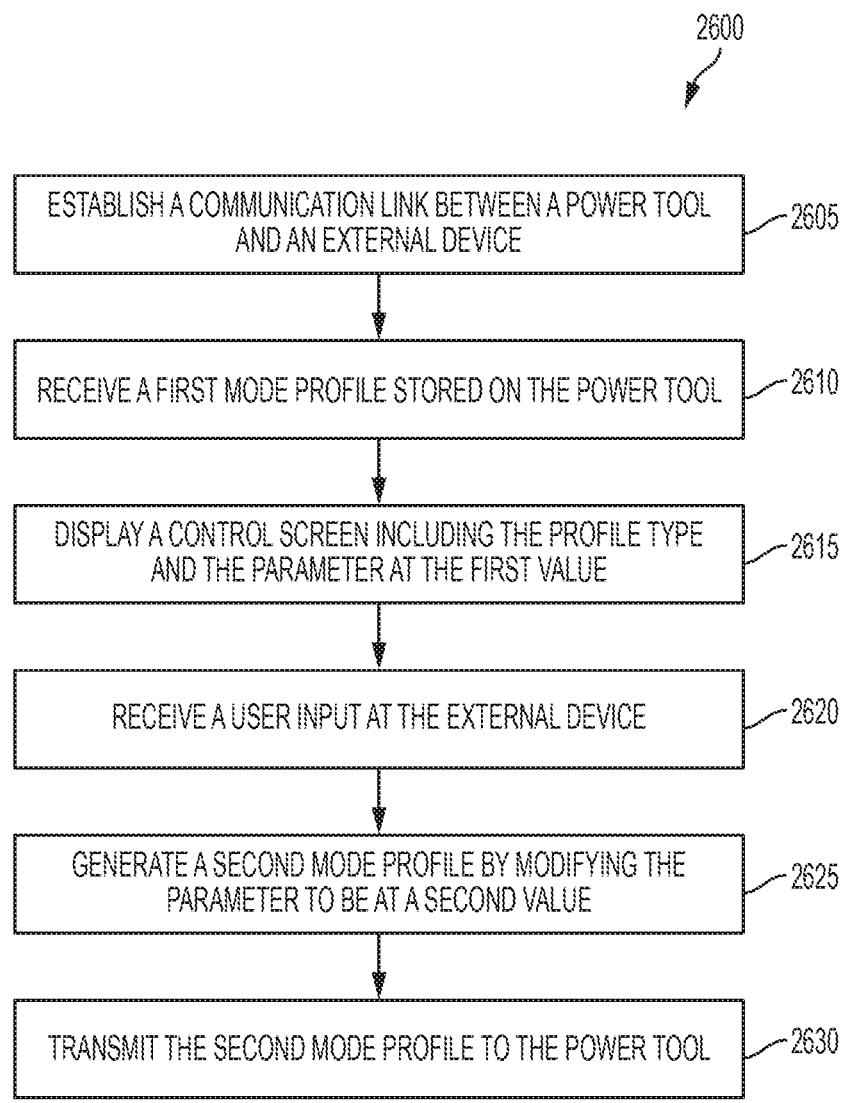
FIG. 26 illustrates a flowchart of a method of programming a power tool from a perspective of an external device of the communication system of FIG. 1.

FIG. 26 is a flowchart illustrating a method 2600 of programming a power tool 104 as discussed above. In step 2605, the external device 108 and the power tool 104 establish a communication link using the transceiver of the external device 108 and the wireless communication controller 250 of the power tool 104. Establishing such a communication link is discussed above, for example, with respect to FIGS. 5 and 6 and the discussion of switching from the connectable state of the power tool 104 to the connected state of the power tool 104. In step 2610, the external device 108 receives, with the transceiver, a first mode profile that is stored on the power tool 104 (e.g., in the mode profile bank 302) at step 2610. Receiving different mode profiles from the power tool 104 is described above, for example, with respect to FIGS. 8A-B. As also discussed above with respect to FIGS. 8A-B, the mode profile received by the external device 108 (and used to populate the control screen 380) is defined by a profile type and a first value associated with a parameter for executing the profile type. As an example, a custom drive control profile (FIGS. 8A-B) may be of a first profile type, while a self-tapping screw profile (FIGS. 15A-B) may be of another.

In step 2615, the external device 108 displays a control screen. For example, as shown in FIGS. 8A-B, the external device 108 displays the control screen 380, and the control screen 380 is associated with a profile type and has a parameter at a first value. The external device 108 is configured to receive a user input through the control screen (step 2620), and generates a second mode profile by modifying the parameter to be at a second value in response to receiving the user input (step 2625). As discussed above, the user input may include editing textboxes (e.g., the textboxes 390, 398, and 394b of FIGS. 8A-B), moving sliders (e.g., sliders 391, 397, 393, and 394a of FIGS. 8A-B), and/or actuating switches (e.g., switches 394c and 396 of FIGS. 8A-B), and/or interacting with other user interface components on the control screen 380. Additionally, generating a second mode profile is discussed above with respect to saving a new mode profile as shown in, for example, FIG. 11. In step 2630, the external device 108 transmits the second mode profile to the power tool 104. The external device 108 transmits the second mode profile to the power tool 104 to enable the power tool 104 to operate according to the second mode profile, as discussed above with respect to, for example, FIG. 11.

The method of programming the power tool 104 discussed above may also include establishing a communication link between a second power tool (e.g., a separate power tool than the first power tool 104) and the external device 108. Once the communication link is established with the second power tool, the external device 108 may receive the first mode profile from the second power tool, for example, because it had been previously stored on the second power tool. The external device 108 may then receive the second mode profile from the remote server 112. For example, the external device 108 may send an identifier for the first mode profile obtained from the second power tool to the remote server 112. The remote server 112 may respond with the second mode profile, which is an updated version of the first mode profile, because the first and second mode profiles have the same identifier (e.g., "Deck Mode"). Receiving a mode profile from a power tool and also receiving an updated version of the same mode profile is described above with respect to FIG. 12. The external device 108 then compares the first mode profile (e.g., from the second power tool) to the second mode profile (e.g., from the server 112), and generates an indication when the first mode profile and the second mode profile are different.

In some embodiments, the method 2600 of FIG. 26 also includes the external device 108, with its transceiver, receiving a third mode profile from the power tool. The third mode profile is of a different profile type than the first profile type and includes a second parameter that is different than the parameter of the first profile type. Receiving mode profiles of different types is discussed above, for example, with respect to FIGS. 8A-B as compared to FIGS. 15A-D. The external device 108 then displays a second control screen that includes the second profile type and the second parameter. The second control screen, because it displays the second profile type and the second parameter, is different than the first control screen. Such differences are illustrated in comparing FIGS. 8A-B with FIGS. 15A-D, which each display a different control screen with different parameters (e.g., max speed as compared to starting speed) due to the different profile types of the corresponding mode profiles.

The method of FIG. 26 may, in some embodiments, include the external device 108 receiving identification information from the power tool 104 that indicates a type of power tool corresponding to the power tool, as described above with respect to, for example, the periodic advertisement messages broadcasting a power tool's UBID. Additionally, the external device 108 displays a list of mode profiles based on the type of power tool, as discussed with respect to, for example, FIG. 9. The external device 108 then receives a selection of one of the mode profiles from the list, and transmits the selected one of the mode profiles to the power tool 104, as described above with respect to, for example, FIGS. 9 and 15A-D. Between the selection and transmission, the mode profile may be customized through the external device 108 receiving user input via a graphical user interface as described above.

Figure 27:
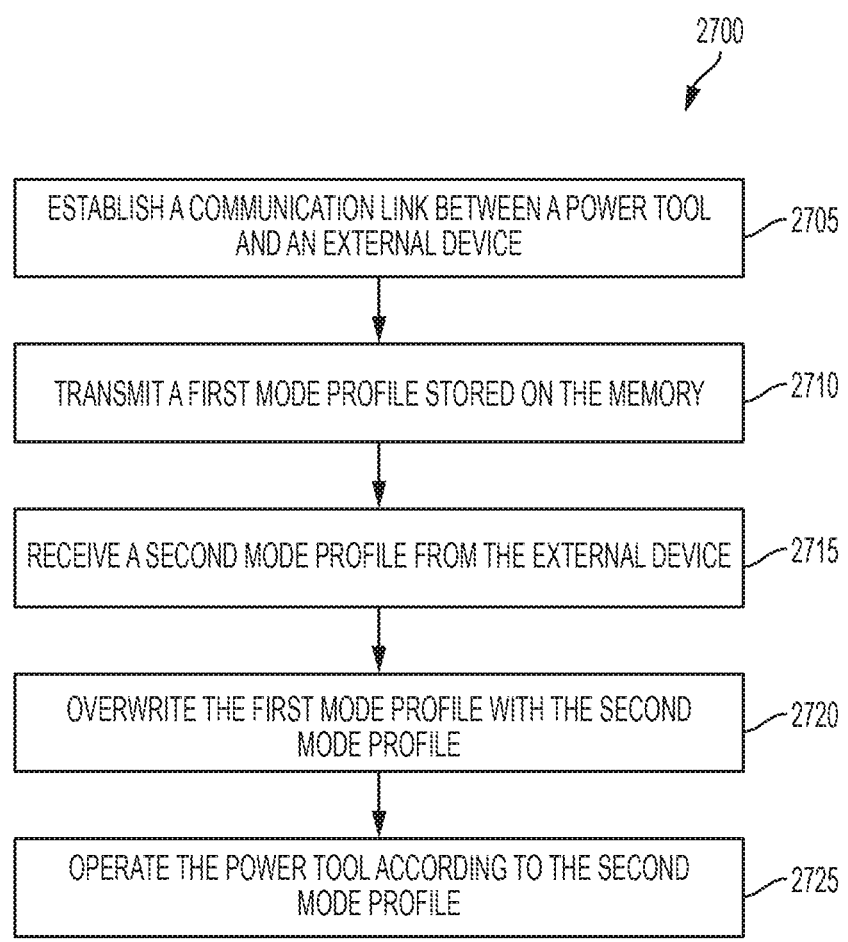
FIG. 27 illustrates a flowchart of the method of programming a power tool from a perspective of the power tool of the communication system of FIG. 1.

FIG. 27 illustrates a method 2700 of programming a power tool 104. As shown in FIG. 27, the method 2700 includes establishing a communication link between the power tool 104 and the external device 108 (step 2705), similar to step 2605 of FIG. 26. After establishing the communication link, the power tool 104 transmits, with its transceiver 254, a first mode profile stored on the memory of the power tool 104 (step 2710), as described with respect to FIGS. 8A-B. As discussed above with respect to FIGS. 8A-B and 9, each mode profile is defined at least by a profile type and a value associated with a parameter. Therefore, the first mode profile is defined by a first profile type and a first value associated with a parameter for executing the profile type. The power tool 104 then receives, from the external device 108, a second mode profile that is defined by the first profile type, but a second value associated with the parameter for executing the first profile type (step 2715). In some of the discussions above, the second mode profile may be described as a different instance of the first mode profile because both the first mode profile and the second mode profile share the same profile type. Receiving a modified mode profile at the power tool 104 is described above with respect to, for example, FIG. 11. After the power tool 104 receives the second mode profile, the power tool 104 overwrites the first mode profile with the second mode profile in memory 232 (step 2720). The power tool 104 may then operate according to the second mode profile (e.g., the new mode profile) at step 2725.

In some embodiments, the method 2700 of FIG. 27 also includes receiving a user input via the mode selection switch 290, and entering an adaptive mode of the power tool 104 in response to the user input, as discussed above with respect to FIGS. 4 and 8A-B. Additionally, in some embodiments, when the power tool 104 is in the adaptive mode, the method 2700 also includes receiving, at the power tool 104, the second mode profile (or a modified mode profile) in response to a user input at the external device 108, described as "live updating" above with respect to FIGS. 8A-B, such that the power tool 104 receives the modified or updated mode profiles as soon as the mode profile is modified.

In some embodiments, when the power tool 104 is in the adaptive mode, the power tool 104 transmits a temporary mode profile (e.g., temporary mode profile 300e) associated with the adaptive mode to the external device 108, as discussed above with respect to, for example, the profile bank 302 shown in FIG. 5 and the control screens of FIGS. 8A-B. The power tool 104 then receives a message from the external device 108 indicating that a mode button 400 corresponding to, for example, the first mode of the power tool 104 (e.g., mode "1") has been selected by the user. In response to receiving the message from the external device 108, the power tool 104 overwrites the temporary mode profile 300e with the mode profile 300a corresponding to the first mode of the power tool 104, and sends the updated temporary mode profile 300e to the external device 108 for populating the control screen 380 accordingly, as shown in FIGS. 8A-B and discussed above.

Thus, the invention provides, among other things, a power tool that communicates with an external device for configuring the power tool and obtaining data from the power tool. Various features and advantages of the invention are set forth in the following claims.

What is claimed is:

1. A method of programming a power tool, the method comprising:
    establishing, with a transceiver of an external device, a communication link between a power tool and the external device, the external device having the transceiver and an electronic processor;
    receiving, at the external device, a user selection of a mode profile button, the mode profile button corresponding to a first mode profile of a plurality of mode profiles stored on the power tool;
    transmitting, with the transceiver, a request to the power tool for the first mode profile stored on the power tool;
    receiving, with the transceiver and from the power tool, the first mode profile stored on the power tool based on the user selection, the first mode profile being defined by a profile type and a first value associated with a parameter to control performance of operation of the power tool;
    displaying, at the external device, a control screen including the profile type and the parameter at the first value;
    receiving a user input at the external device to modify the first mode profile;
    generating, in response to the user input, an updated first mode profile by modifying the parameter to be at a second value; and
    transmitting, with the transceiver, the updated first mode profile to the power tool.

2. The method of claim 1, further comprising:
    receiving, at the external device, a second user selection of a second mode profile button, the second mode profile button corresponding to a second mode profile of the plurality of mode profiles stored on the power tool;
    transmitting, with the transceiver, a second request to the power tool for the second mode profile stored on the power tool;
    receiving, with the transceiver and from the power tool, the second mode profile stored on the power tool based on the second user selection, the second mode profile being defined by (i) a second profile type that is different from the first profile type and (ii) a third value associated with a second parameter to control performance of operation of the power tool, wherein the second parameter is different than the first parameter;
    displaying, at the external device, a second control screen different than the first control screen and including the second profile type and the second parameter at the third value;
    receiving a second user input at the external device;
    generating, in response to the second user input, an updated second mode profile by modifying the second parameter to be at a fourth value; and
    transmitting, with the transceiver, the updated second mode profile to the power tool.

3. The method of claim 1, further comprising:
    receiving, at the external device, a second user input, the second user input indicating one of the mode profiles of the plurality of mode profiles stored on the power tool to be overwritten by the updated first mode profile;
    wherein transmitting the updated first mode profile to the power tool includes transmitting information corresponding to the one of the mode profiles that is to be overwritten by the updated first mode profile.

4. The method of claim 1, further comprising transmitting, from the external device, the updated first mode profile to a remote server communicatively coupled to the external device.

5. The method of claim 4, further comprising:
    establishing, with the transceiver, a second communication link between a second power tool and the external device;
    receiving, with the transceiver, a second mode profile stored on the second power tool;
    receiving, at the external device, the updated first mode profile from the remote server;
    comparing, with the electronic processor, the second mode profile with the updated first mode profile; and
    generating, with the electronic processor, an indication to a user when the second mode profile and the updated first mode profile are different.

6. The method of claim 1, wherein establishing the communication link between the power tool and the external device includes:
    wirelessly scanning, with the external device, for local power tools within a communication range of the transceiver;
    receiving, at the external device, identification information for each of the local power tools in response to wirelessly scanning within the communication range;
    displaying, at the external device, a list of the local power tools detected by the external device, the list including the power tool; and
    receiving, at the external device, a selection of the power tool from the list of local power tools.

7. The method of claim 1, further comprising
receiving, with the transceiver, identification information from the power tool, the identification information indicative of a type of power tool corresponding to the power tool;
displaying, at the external device, a list of mode profiles based on the type of power tool corresponding to the power tool;
receiving, at the external device, a selection of one of the mode profiles from the list of mode profiles; and
transmitting, with the transceiver, the selected one of the mode profiles from the list of mode profiles to the power tool.

8. The method of claim 1, further comprising:
receiving, at the external device, a second user selection of a reset actuator; and
transmitting, with the transceiver, a predetermined set of default mode profiles to the power tool in response to receiving the second user selection.

9. A method of programming a power tool, the method comprising:
establishing, with a transceiver of a power tool, a communication link between the power tool and an external device, the power tool including the transceiver, a memory, and an electronic processor;
receiving, with the transceiver, a request from the external device for a first mode profile of a plurality of mode profiles stored in the memory, the request being transmitted by the external device in response to a user selection received at the external device, the user selection being of a mode profile button corresponding to the first mode profile;
in response to receiving the request from the external device, transmitting, with the transceiver and to the external device, the first mode profile stored in the memory, the first mode profile being defined by a first profile type and a first value associated with a parameter to control performance of operation of the power tool, the first profile type and the first value being shown on a control screen displayed on the external device;
receiving, with the transceiver, an updated first mode profile from the external device, the updated first mode profile being defined by the first profile type and a second value associated with the parameter to control performance of operation of the power tool, the first value being modified to the second value by the external device in response to a user input received at the external device;
storing, in the memory and with the electronic processor, the updated first mode profile; and
operating, with the electronic processor, the power tool according to the updated first mode profile.

10. The method of claim 9, further comprising:
receiving, with the transceiver, a second request from the external device for a second mode profile of the plurality of mode profiles stored in the memory, the second request being transmitted by the external device in response to a second user selection being received at the external device, the second user selection being of a second mode profile button corresponding to the second mode profile;
in response to receiving the second request from the external device, transmitting, with the transceiver and to the external device, the second mode profile stored in the memory, the second mode profile being defined by (i) a second profile type that is different from the first profile type and (ii) a third value associated with a second parameter different than the first parameter and to control performance of operation of the power tool, the second profile type and the second value being shown on a second control screen displayed on the external device that is different than the first control screen;
receiving, with the transceiver, an updated second mode profile from the external device, the updated second mode profile being defined by the second profile type and a fourth value associated with the second parameter to control performance of operation of the power tool, the third value being modified to the fourth value by the external device in response to a user input received at the external device;
storing, in the memory and with the electronic processor, the updated second mode profile; and
operating, with the electronic processor, the power tool according to the updated second mode profile.

11. The method of claim 9, wherein receiving the updated first mode profile from the external device includes receiving, with the transceiver and from the external device, information corresponding to one of the mode profiles of the plurality of mode profiles stored in the memory that is to be overwritten by the updated first mode profile; and
wherein storing the updated first mode profile includes overwriting, in the memory and with the electronic processor, the one of the mode profiles to be overwritten with the updated first mode profile.

12. The method of claim 11, wherein the one of the mode profiles to be overwritten is associated with a second button of a mode selector of the power tool; and
wherein overwriting the one of the mode profiles to be overwritten with the updated first mode profile includes associating the second button with the updated first mode profile such that in response to the second button being actuated, the electronic processor is configured to operate the power tool according to the updated first mode profile when a trigger of the power tool is actuated.

13. The method of claim 9, wherein establishing the communication link includes:
broadcasting, with the transceiver, an identifier of the power tool periodically, the identifier indicating a power tool type of the power tool, and a unique identifier for the power tool; and
pairing, with the transceiver, the power tool with the external device when the power tool is within a communication range of the external device.

14. The method of claim 9, further comprising
receiving, via a mode selector of the power tool, a second user input; and
entering, with the electronic processor, an adaptive mode in which the power tool is programmed in response to the second user input;
wherein receiving the updated first mode profile includes receiving, with the transceiver, the updated first mode profile from the external device in response to the external device receiving the user input that modifies the first value to the second value when the power tool is in the adaptive mode.

15. A power tool device comprising:
a motor;
a wireless communication controller including a transceiver, the wireless communication controller configured to establish a communication link between the power tool device and an external device;

a memory configured to store a plurality of mode profiles for operating the motor; and an electronic processor coupled to the motor, the memory, and the wireless communication controller, the electronic processor configured to receive, with the transceiver, a request from the external device for a first mode profile of the plurality of mode profiles, the request being transmitted by the external device in response to a user selection received at the external device, the user selection being of a mode profile button corresponding to the first mode profile;

in response to receiving the request from the external device, transmit, with the transceiver and to the external device, the first mode profile stored in the memory, the first mode profile being defined by a first profile type and a first value associated with a parameter for controlling the motor, the first profile type and the first value being shown on a control screen displayed on the external device, receive, with the transceiver, an updated first mode profile from the external device, the updated first mode profile being defined by the first profile type and a second value associated with the parameter for controlling the motor, the first value being modified to the second value by the external device in response to a user input received at the external device, store, in the memory, the updated first mode profile, and control the motor to operate according to the updated first mode profile.

16. The power tool device of claim 15, wherein the electronic processor is further configured to:

receive, with the transceiver, a second request from the external device for a second mode profile of the plurality of mode profiles stored in the memory, the second request being transmitted by the external device in response to a second user selection being received at the external device, the second user selection being of a second mode profile button corresponding to the second mode profile;

in response to receiving the second request from the external device, transmit, with the transceiver and to the external device, the second mode profile stored in the memory, the second mode profile being defined by (i) a second profile type that is different from the first profile type and (ii) a third value associated with a second parameter different than the first parameter and to control performance of operation of the power tool device, the second profile type and the second value being shown on a second control screen displayed on the external device that is different than the first control screen;

receive, with the transceiver, an updated second mode profile from the external device, the updated second mode profile being defined by the second profile type and a fourth value associated with the second parameter to control performance of operation of the power tool device, the third value being modified to the fourth value by the external device in response to a user input received at the external device;

store, in the memory, the updated second mode profile; and control the motor to operate according to the updated second mode profile.

17. The power tool device of claim 15, wherein the electronic processor is further configured to receive, with the transceiver and from the external device, information corresponding to one of the mode profiles of the plurality of mode profiles stored in the memory that is to be overwritten by the updated first mode profile; and wherein the electronic processor is configured to store the updated first mode profile by overwriting, in the memory, the one of the mode profiles to be overwritten with the updated first mode profile.

18. The power tool device of claim 17, wherein the one of the mode profiles to be overwritten is associated with a second button of a mode selector of the power tool device; and wherein the electronic processor is configured to associate the second button with the updated first mode profile such that in response to the second button being actuated, the electronic processor is configured to control the motor to operate according to the updated first mode profile when a trigger of the power tool device is actuated.

19. The power tool device of claim 15, wherein the wireless communication controller is configured to establish the communication link by:

broadcasting, with the transceiver, an identifier of the power tool device periodically, the identifier indicating a power tool type of the power tool device, and a unique identifier for the power tool device; and pairing, with the transceiver, the power tool device with the external device when the power tool device is within a communication range of the external device.

20. The power tool device of claim 15, further comprising a mode selector coupled to the electronic processor, wherein the electronic processor is further configured to:

receive, via the mode selector, a second user input; and enter an adaptive mode in which the power tool device is programmed in response to the second user input;

receive, with the transceiver, the updated first mode profile from the external device in response to the external device receiving the user input that modifies the first value to the second value when the power tool device is in the adaptive mode.

* * * * *